United States Patent
Si et al.

(10) Patent No.: US 10,742,562 B2
(45) Date of Patent: Aug. 11, 2020

(54) METHOD AND APPARATUS FOR ADAPTIVE CONTROL OF CONTENTION WINDOW IN LAA

(71) Applicant: Samsung Electronics Co., Ltd, Suwon-si (KR)

(72) Inventors: Hongbo Si, Garland, TX (US); Boon Loong Ng, Plano, TX (US); Yingzhe Li, Austin, TX (US); Aris Papasakellariou, Houston, TX (US); Thomas David Novlan, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 15/207,291

(22) Filed: Jul. 11, 2016

(65) Prior Publication Data

US 2017/0019909 A1    Jan. 19, 2017

Related U.S. Application Data

(60) Provisional application No. 62/193,333, filed on Jul. 16, 2015, provisional application No. 62/199,368, (Continued)

(51) Int. Cl.
*H04W 72/10* (2009.01)
*H04L 12/807* (2013.01)
(Continued)

(52) U.S. Cl.
CPC ............ *H04L 47/27* (2013.01); *H04W 16/14* (2013.01); *H04W 72/02* (2013.01); *H04W 72/14* (2013.01);
(Continued)

(58) Field of Classification Search
CPC . H04W 72/0453; H04W 16/14; H04W 76/28; H04L 1/1854; H04L 5/0091; H04L 47/27; H04L 5/00
See application file for complete search history.

(56) References Cited

U.S. PATENT DOCUMENTS

| | | | | |
|---|---|---|---|---|
| 2012/0320782 A1* | 12/2012 | Seo | ........................ | H04L 1/1854 370/252 |
| 2013/0028124 A1* | 1/2013 | Horiuchi | ................ | H04L 1/1854 370/252 |

(Continued)

FOREIGN PATENT DOCUMENTS

WO    2014200951 A2    12/2014

OTHER PUBLICATIONS

3GPP TS 36.211 V12.4.0 (Dec. 2014) 3rd Generation Partnership Project;Technical Specification Group Radio Access Network; Evolved Universal Terrestrial Radio Access (E-UTRA); Physical channels and modulation(Release 12)—Dec. 2014—124 Pages.
(Continued)

*Primary Examiner* — Vinncelas Louis

(57) ABSTRACT

A method for listen-before-talk (LBT) operation by an eNodeB (eNB) in a wireless communication network is provided. The method includes triggering an LBT request to transmit, to a user equipment (UE), at least one of an uplink (UL) grant or downlink (DL) data for UL transmission over an licensed assisted access (LAA), determining an adaptive contention window (CW) size includes a predetermined minimum value and maximum value for transmitting the DL data and UL grant, performing DL data and UL grant LBT operations in accordance with the adaptive CW size, performing a UL grant LBT operation that includes a higher priority than the DL data regardless of a level of quality of service (QoS) of the DL data to transmit a UL grant message
(Continued)

to the UE, and multiplexing the UL grant with the DL data, and transmitting the multiplexed UL grant with the DL data transmission to the UE.

18 Claims, 30 Drawing Sheets

Related U.S. Application Data filed on Jul. 31, 2015, provisional application No. 62/204,811, filed on Aug. 13, 2015, provisional application No. 62/216,694, filed on Sep. 10, 2015, provisional application No. 62/238,342, filed on Oct. 7, 2015, provisional application No. 62/238,368, filed on Oct. 7, 2015, provisional application No. 62/291,754, filed on Feb. 5, 2016, provisional application No. 62/342,322, filed on May 27, 2016.

(51) Int. Cl.
```
H04W 76/28    (2018.01)
H04W 16/14    (2009.01)
H04W 72/02    (2009.01)
H04W 72/14    (2009.01)
H04W 72/04    (2009.01)
H04W 74/08    (2009.01)
H04L 5/00     (2006.01)
```

(52) U.S. Cl.
CPC ........... *H04W 76/28* (2018.02); *H04L 5/0053* (2013.01); *H04W 72/042* (2013.01); *H04W 72/0446* (2013.01); *H04W 74/0808* (2013.01)

(56) References Cited

U.S. PATENT DOCUMENTS

| | | | |
|---|---|---|---|
| 2013/0039231 A1* | 2/2013 | Wang | H04W 72/10 370/280 |
| 2013/0208645 A1 | 8/2013 | Feng et al. | |
| 2014/0341035 A1 | 11/2014 | Bhushan et al. | |
| 2014/0362780 A1 | 12/2014 | Malladi et al. | |
| 2016/0135189 A1* | 5/2016 | Chandrasekhar | H04W 72/0453 370/329 |
| 2016/0309516 A1* | 10/2016 | Wong | H04W 74/0833 |
| 2016/0366689 A1* | 12/2016 | Zhang | H04L 5/0091 |
| 2018/0175975 A1* | 6/2018 | Um | H04L 1/1816 |

OTHER PUBLICATIONS

3GPP TS 36.212 V12.3.0 (Dec. 2014) 3rd Generation Partnership Project;Technical Specification Group Radio Access Network; Evolved Universal Terrestrial Radio Access (E-UTRA); Multiplexing and channel coding(Release 12)—Dec. 2014—89 Pages.
3GPP TS 36.213 V12.4.0 (Dec. 2014) 3rd Generation Partnership Project;Technical Specification Group Radio Access Network; Evolved Universal Terrestrial Radio Access (E-UTRA); Physical layer procedures(Release 12) Dec. 2014—225 Pages.
3GPP TS 36.321 V12.4.0 (Dec. 2014); 3rd Generation Partnership Project; Technical Specification Radio Access Network; Evolved Universal Terrestrial Radio Access (E-UTRA); Medium Access Control (MAC) protocol specification (Release 12)—Dec. 2014—60 pages.
GPP TS 36.331 V12.4.0 (Dec. 2014); 3rd Generation Partnership Project; Technical Specification Radio Access Network; Evolved Universal Terrestrial Radio Access (E-UTRA); Radio Resource Control (RRC); Protocol specification (Release 12)—Dec. 2014—410 pages.
ETSI EN 301 893 V1.7.1 (Jun. 2012); Broadband Radio Access Networks (BRAN); 5 GHz high performance RLAN; Harmonized EN covering the essential requirements of Artical 3.2 of the R&TTE Directive—Jun. 2012—90 Pages.
3GPP TR 36.889 V1.0.0 (May 2015) 3rd Generation Partnership Project;Technical Specification Group Radio Access Network; Study on Licensed-Assisted Access to Unlicensed Spectrum (Release 13)—May 2015—286 Pages.
The International Searching Authority, "International Search Report," International Application No. PCT/KR2016/007596, dated Oct. 18, 2016, 4 pages, publisher The ISA/KR, International Application Division, Korean Intellectual Property Office, Daejeon, Republic of Korea.
Abhijeet Bhorkar et al., "Medium Access Design for LTE in Unlicensed Band," 8th International Wireless Distributed Networks Workshop on Cooperative and Heterogeneous Cellular Networks 2015, 2015, pp. 369-373, publisher IEEE, Piscataway, NJ.
Alcatel-Lucent, "LBT Enhancements for Licensed-Assisted Access," R1-144701, 3GPP TSG RAN WG1 Meeting #79, San Francisco, USA, Nov. 2014, 5 pages.
ZTE, "Analysis of LAA UL enhancement," R1-144830, 3GPP TSG RAN WG1 Meeting #79, San Francisco, USA, Nov. 2014, 5 pages.
Extended European Search Report regarding Application No. 16824716.1, dated Jun. 8, 2018, 9 pages.
Ericsson, "On Scheduling in LAA with Downlink and Uplink Transmissions", 3GPP TSG RAN WG1 Meeting #81, R1-153135, May 2015, 4 pages.
Ericsson, "Coexistence Evaluation Results for DL+UL LAA with Fast DL Control Channel LBT", 3GPP TSG RAN WG1 Meeting #81, R1-153124, May 2015, 6 pages.
Extended European Search Report regarding Application No. 20155936.6, dated May 7, 2020, 8 pages.
LG Electronics, "DL LBT operation with variable contention window size", 3GPP TSG RAN WG1 Meeting #81, R1-152732, May 2015, 6 pages.
Alcatel-Lucent Shanghai Bell et al., "LBT and Frame Structure Design for DL-Only LAA", 3GPP TSG RAN WG1 Meeting #81, R1-153385 (Revision of R1-152989), May 2015, 6 pages.

\* cited by examiner

P: PUSCH 1305
D: DTX 1310

FIGURE 13

CW is not changed

CW is doubled

P: PUSCH 1405
D: DTX 1410

FIGURE 14

METHOD AND APPARATUS FOR ADAPTIVE CONTROL OF CONTENTION WINDOW IN LAA

CROSS-REFERENCE TO RELATED APPLICATION(S) AND CLAIM OF PRIORITY

This application claims priority under 35 U.S.C. § 119(e) to:

U.S. Provisional Patent Application No. 62/193,333 filed Jul. 16, 2015 entitled METHOD AND APPARATUS FOR ADAPTIVE CONTROL OF CONTENTION WINDOW IN LAA;

U.S. Provisional Patent Application No. 62/199,368 filed Jul. 31, 2015 entitled METHODS AND APPARATUS FOR LTE MULTI-CARRIER OPERATIONS ON UNLICENSED SPECTRUM;

U.S. Provisional Patent Application No. 62/204,811 filed Aug. 13, 2015 entitled METHOD AND DESIGN FOR LAA UPLINK LISTEN-BEFORE-TALK AND SCHEDULING;

U.S. Provisional Patent Application No. 62/216,694 filed Sep. 10, 2015 entitled METHOD AND APPARATUS FOR ADAPTIVE CONTROL OF CONTENTION WINDOW IN LAA;

U.S. Provisional Patent Application No. 62/238,342 filed Oct. 7, 2015 entitled METHOD AND APPARATUS FOR ADAPTIVE CONTROL OF CONTENTION WINDOW IN LAA;

U.S. Provisional Patent Application No. 62/238,368 filed Oct. 7, 2015 entitled METHOD AND APPARATUS FOR HYBRID CONTROL OF CONTENTION WINDOW SIZE IN LAA.

U.S. Provisional Patent Application No. 62/291,754 filed Feb. 5, 2016 entitled METHOD AND DESIGN FOR LAA UPLINK LISTEN-BEFORE-TALK AND SCHEDULING; and U.S. Provisional Patent Application No. 62/342,322 filed May 27, 2016 entitled METHOD AND DESIGN FOR LAA UPLINK LISTEN-BEFORE-TALK AND SCHEDULING.

The above-identified provisional patent applications are hereby incorporated by reference in their entirety.

TECHNICAL FIELD

This disclosure relates generally to wireless communication systems. More specifically, this disclosure relates to method and apparatus for adaptive control of contention window in LAA.

BACKGROUND

A long term evolution (LTE) radio access technology (RAT) may be deployed on an unlicensed frequency spectrum, which is also known as licensed assisted access (LAA) or LTE unlicensed (LTE-U). One of possible deployment scenarios for the LAA is to deploy LAA carriers as a part of carrier aggregations, where an LAA carrier is aggregated with another carrier on a licensed frequency spectrum. In a conventional scheme, a carrier on a licensed frequency spectrum is assigned as a primary cell (PCell) and a carrier on an unlicensed frequency spectrum is assigned as a secondary cell (SCell) for a UE. Since there may be other RATs operating on the same unlicensed frequency spectrum as the LAA carrier, there is a need to enable co-existence of other RAT with LAA on an unlicensed frequency spectrum without undesirable interference between heterogeneous RATs.

SUMMARY

This disclosure provides methods and apparatus for adaptive control of the contention window size for licensed assisted access.

In one embodiment, a user equipment (UE) for listen-before-talk (LBT) operation in a wireless communication network is provided. The UE includes a transceiver configured to receive a multiplexed uplink (UL) grant with downlink (DL) data in the same single frequency (SF) from an eNodeB (eNB) on a licensed assisted access (LAA) and at least one processor configured to identify UL grant message and DL data from the multiplexed DL transmission.

In another embodiment, an eNodeB (eNB) for listen-before-talk (LBT) operation in a wireless communication network is provided. The eNB includes at least one processor configured to trigger an LBT request to transmit, to a user equipment (UE), at least one of an uplink (UL) grant or downlink (DL) data over a licensed assisted access (LAA), determine an adaptive contention window (CW) size comprising a predetermined minimum value and maximum value for transmitting the DL data and UL grant correspondingly, perform a DL data LBT operation and a UL grant LBT operation in accordance with the adaptive CW sizes, perform a UL grant LBT operation to transmit a UL grant message to the UE, wherein the UL grant LBT comprises a higher priority than the DL data regardless of a level of QoS of the DL data, and multiplex the UL grant with the DL data. The eNB further includes a transceiver configured to transmit the multiplexed UL grant with the DL data transmission to the UE.

In yet another embodiment, a method for listen-before-talk (LBT) operation by an eNodeB (eNB) in a wireless communication network is provided. The method includes triggering an LBT request to transmit, to a user equipment (UE), at least one of an uplink (UL) grant or downlink (DL) data over a licensed assisted access (LAA), determining adaptive contention window (CW) sizes comprising a predetermined minimum value and maximum value for transmitting the DL data and UL grant correspondingly, performing a DL data LBT operation and a UL grant LBT operation in accordance with the adaptive CW sizes, performing a UL grant LBT operation to transmit a UL grant message to the UE, wherein the UL grant LBT comprises a higher priority than the DL data regardless of a level of QoS of the DL data, multiplexing the UL grant with the DL data based on the DL data, and transmitting the multiplexed UL grant with the DL data transmission to the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 13 illustrates an example single discontinuous transmission (DTX)-only UE trigger for contention window increase according to embodiments of the present disclosure;

FIG. 14 illustrates an example thresholding trigger for contention window increase with $\theta=\frac{1}{3}$ according to embodiments of the present disclosure;

DETAILED DESCRIPTION

FIGS. 1 through 34, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v12.3.0, "E-UTRA, Physical channels and modulation" (REF1); 3GPP TS 36.212 v12.2.0, "E-UTRA, Multiplexing and Channel coding" (REF2); 3GPP TS 36.213 v12.3.0, "E-UTRA, Physical Layer Procedures" (REF3); 3GPP TS36.321, "E-UTRA, Medium Access Control (MAC) protocol specification" (REF4); 3GPP TS 36.331 v12.3.0, "E-UTRA, Radio Resource Control (RRC) Protocol Specification" (REF5); and ETSI EN 301 893 v1.7.0 (2012-06), Harmonized European Standard, "Broadband Radio Access Networks (BRAN); 5 GHz high performance RLAN (REF6); 3GPP TR 36.899 v1.0.0, TSG-RAN, "Study on Licensed-Assisted Access to Unlicensed Spectrum" (REF7).

Figure 1:
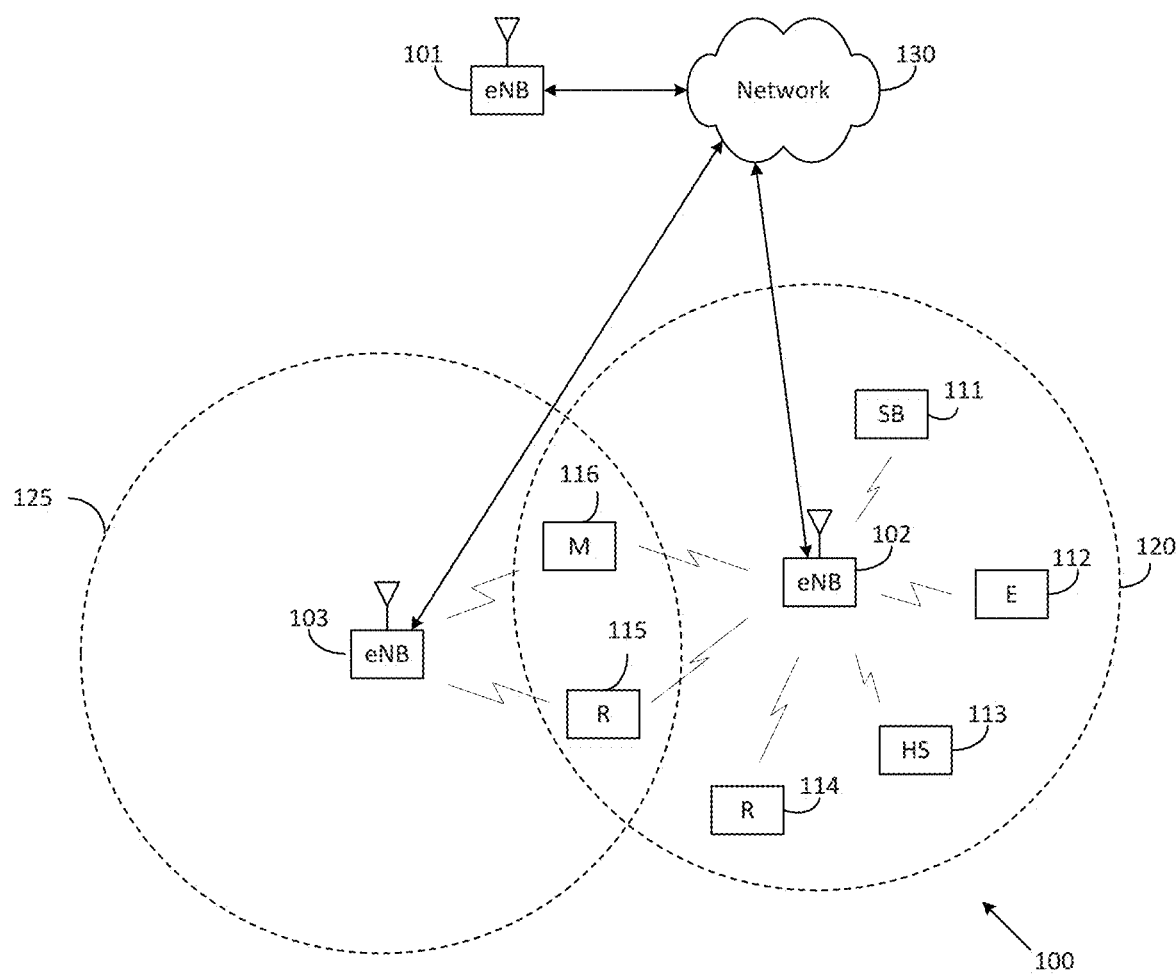
FIG. 1 illustrates an example wireless network according to embodiments of the present disclosure.
Figure 2:
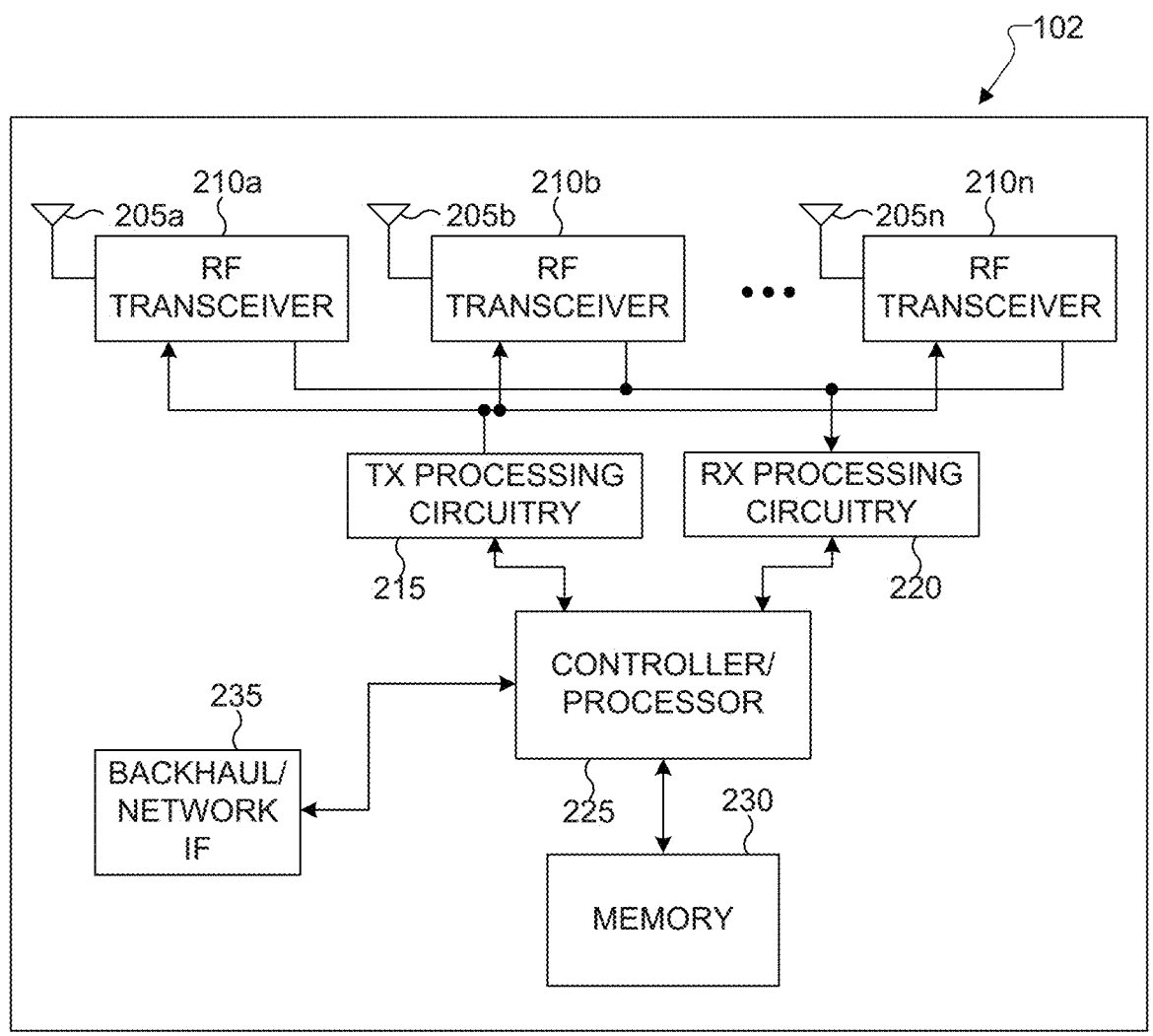
FIG. 2 illustrates an example eNodeB (eNB) according to embodiments of the present disclosure.
Figure 3:
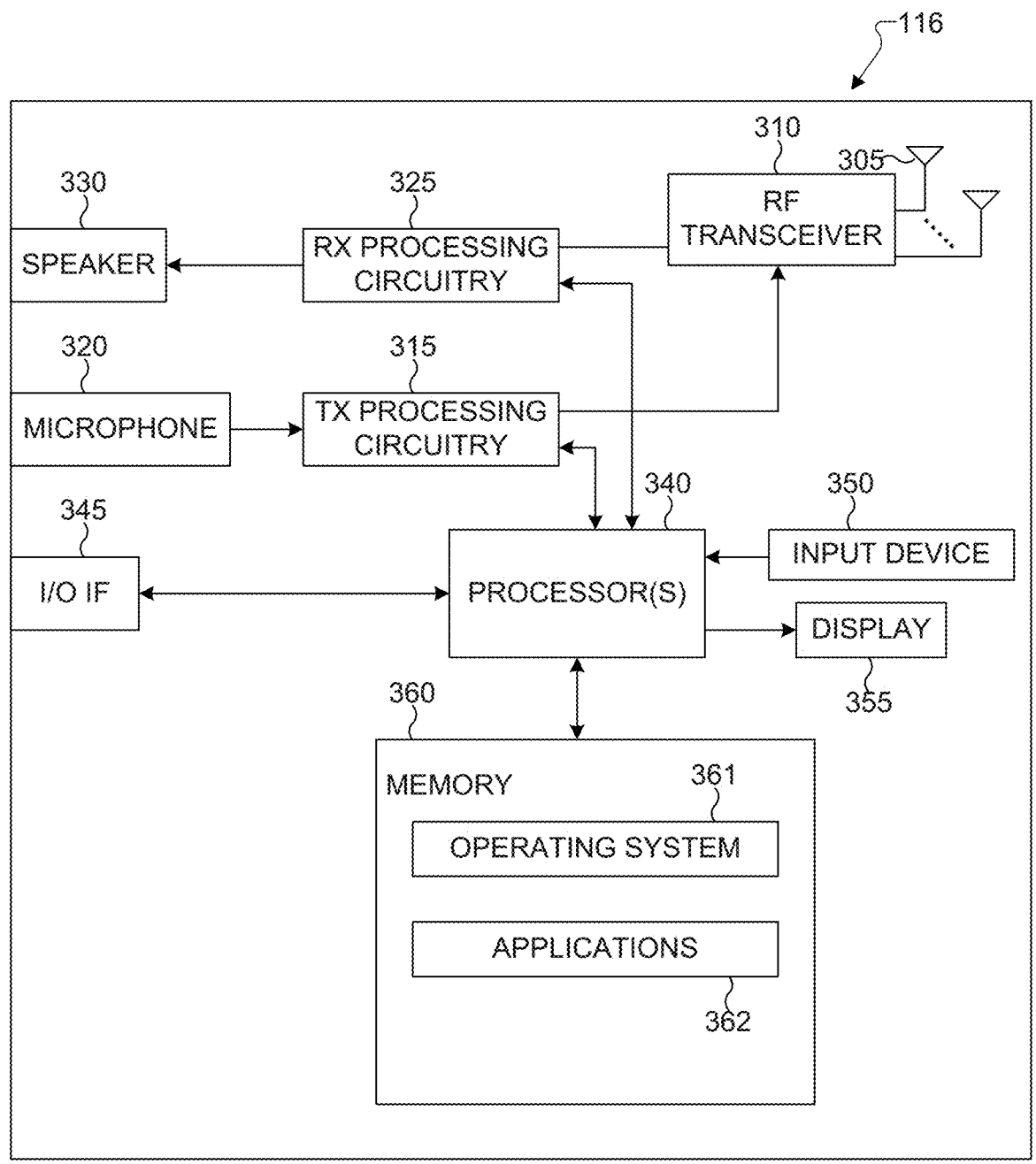
FIG. 3 illustrates an example user equipment (UE) according to embodiments of the present disclosure.

FIGS. 1-4B below describe various embodiments implemented in wireless communication systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless personal digital assistance (PDA), or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U(LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for processing of a received multiplexed UL grant with DL data from an eNodeB (eNB) 101-103 for UL transmission on a licensed assisted access (LAA).

In some embodiments, the UEs 111-116 receive, from the eNBs 101-103, an indication of a partial subframe configuration over an unlicensed spectrum in a licensed assisted access (LAA) cell. In addition, the UEs 111-116 receives multiplexed UL grant with DL data from an eNodeB (eNB) for UL transmission on a licensed assisted access (LAA), identify a UL grant message included in the UL grant and DL data and perform UL resource down-selection operation in resource blocks (RBs) included in at least one UL channel, wherein the transceiver is further configured to transmit UL data, to the eNB, based on the RBs that have been down-selected and information of the UL grant message.

In some embodiment, the UEs 111-116 determine feedback information and transmit, to the eNB, the feedback information based on the RBs that have been down-selected and the information of the UL grant message, wherein the feedback information comprises at least one of a number of repeated scheduling request (SR), or physical uplink shared channel (PUSCH) and discontinuous transmission (DTX) information.

In some embodiments, the UEs 111-116 determine a plurality of CW sizes each of which includes different values based on a level of quality of service (QoS) corresponding to the UL data and transmit, to the eNB, the UL data based on each of the plurality of CW sizes corresponding to the level of QoS.

In some embodiments, the UEs 111-116 receive, from the eNB, a plurality of DL channels that is prioritized and ordered based on a carrier scheduling operation, wherein the UL resource down-selection operation comprises at least one sub RB group in a frequency domain.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple radio frequency (RF) transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

In some embodiments, the RF transceivers 210a-210n are configured to transmit the multiplexed UL grant with the DL data transmission to the UE.

In some embodiments, the RF transceiver 210a-210n are configured to receive feedback information from the UE, wherein the feedback information comprises at least one of a number of repeated scheduling request (SR), or physical uplink shared channel (PUSCH) and discontinuous transmission (DTX) information.

In some embodiments, the RF transceiver 210a-210n are configured to transmit at least one downlink signal associated with the prioritized and ordered plurality of LBT operations. In some embodiments, the RF transceiver 210a-210n are configured to receive at least uplink signal associated with the prioritized and ordered plurality of LBT operations.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 includes at least one microprocessor or microcontroller. In some embodiments, the controller/processor 225 is configured to trigger an LBT request to transmit, to a user equipment (UE), at least one of an uplink (UL) grant or downlink (DL) data over a licensed assisted access (LAA), determine an adaptive contention window (CW) size comprising a predetermined minimum value and maximum value for transmitting the DL data, perform an DL data LBT operation in accordance with the adaptive CW size, multiplex the UL grant with the DL data based on the DL data LBT operation.

In some embodiments, the controller/processor 225 is configured to perform a UL grant LBT operation, which is more aggressive (e.g., higher priority) than DL data LBT on the same carrier, to transmit a UL grant message to the UE an suspend a transmission of the DL data to the UE when the eNB transmits the UL grant message to the UE, wherein the method of claim 15, wherein the UL grant LBT operation comprises at least one of a random backoff time, a fixed contention window size, or a variable contention window size.

In some embodiments, the controller/processor 225 is configured to determine an random backoff value with an adjustable contention window size for a UL grant LBT operation based on the feedback information, wherein the feedback information comprises at least one of a number of repeated scheduling request (SR), or physical uplink shared channel (PUSCH) and discontinuous transmission (DTX) information.

In some embodiments, the controller/processor 225 is configured to prioritize and order a plurality of LBT operations based on a transmission direction and carrier scheduling operation.

In some embodiments, the controller/processor 225 is configured to determine a plurality of groups of UEs in the LAA based on at least one of a level of QoS being served or channel conditions between at least one of the UE or a group of UEs and the eNB and allocate a different CW size to each group of UEs for at least one of the DL data LBT operation or a UL grant LBT operation.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U(LAA)), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal.

In some embodiment, the RF transceiver 310 is configured to receive multiplexed UL grant with DL data from an eNodeB (eNB) for UL transmission on a licensed assisted access (LAA).

In some embodiment, the RF transceiver 310 is configured to transmit, to the eNB, the feedback information based on the RBs that have been down-selected and the information of the UL grant message, wherein the feedback information comprises at least one of a number of repeated scheduling request (SR), or physical uplink shared channel (PUSCH) and discontinuous transmission (DTX) information.

In some embodiment, the RF transceiver 310 is configured to transmit, to the eNB, the UL data based on each of the plurality of CW sizes corresponding to the level of QoS or channel conditions between at least one of the UE or a group of UEs, wherein the transceiver is further configured to receive, from the eNB, a plurality of LBT operations that is prioritized and ordered based on a transmission direction and carrier scheduling operation.

In some embodiments, the RF transceiver 310 is configured to transmit at least one uplink signal associated with the prioritized and ordered plurality of LBT operations. In some embodiments, the RF transceiver 310 is configured to receive at least one downlink signal associated with the prioritized and ordered plurality of LBT operations.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360.

In some embodiments, the processor 340 is configured to identify a UL grant message included in the UL grant and DL data and perform UL resource down-selection operation in resource blocks (RBs) included in at least one UL channel, wherein the transceiver is further configured to transmit UL data, to the eNB, based on the RBs that have been down-selected and information of the UL grant message, and wherein the UL resource down-selection operation comprises at least one sub RB group in a frequency domain.

In some embodiments, the processor 340 is configured to determine feedback information, wherein the feedback information comprises at least one of a number of repeated scheduling request (SR), or physical uplink shared channel (PUSCH) and discontinuous transmission (DTX) information.

In some embodiments, the processor 340 is configured to determine a plurality of CW sizes each of which includes different values based on a level of quality of service (QoS) corresponding to the UL data or channel conditions between at least one of the UE or a group of UEs.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the UE 116 may include only one antenna 305 or any number of antennas 305. Also, while FIG. 3 illustrates the UE 116 configured as a mobile telephone or smartphone, UEs could be configured to operate as other types of mobile or stationary devices.

Figure 4A:
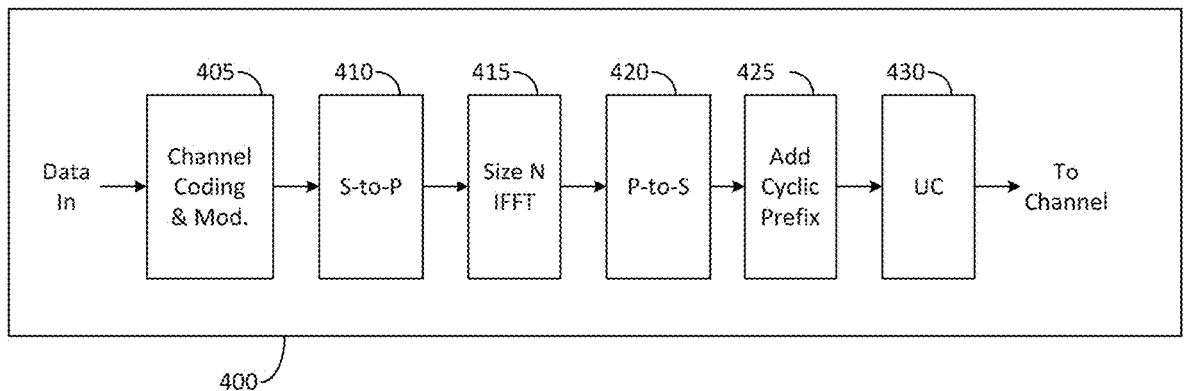
FIG. 4A illustrates a high-level diagram of an orthogonal frequency division multiple access transmit path according to embodiments of the present disclosure.
Figure 4B:
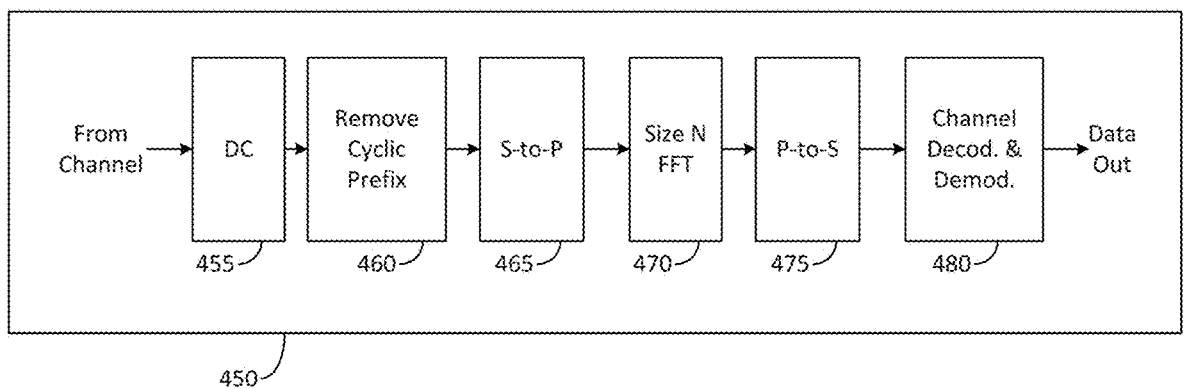
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an OFDMA communication. FIG. 4B is a high-level diagram of receive path circuitry 450. For example, the receive path circuitry 450 may be used for an OFDMA communication. In FIGS. 4A and 4B, for downlink communication, the transmit path circuitry 400 can be implemented in a base station (eNB) 102 or a relay station, and the receive path circuitry 450 may be implemented in a user equipment (such as user equipment 116 of FIG. 1). In other examples, for uplink communication, the receive path circuitry 450 can be implemented in a base station (such as 102 of FIG. 1) or a relay station, and the transmit path circuitry 400 can be implemented in a user equipment (such as user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B can be implemented in software, while other components can be implemented by configurable hardware or a mixture of software and configurable hardware. In particular, it is noted that the FFT blocks and the IFFT blocks described in this disclosure document can be implemented as configurable software algorithms, where the value of Size N can be modified according to the implementation.

In transmit path circuitry 400, channel coding and modulation block 405 receives a set of information bits, applies coding (such as low-density parity-check (LDPC) coding) and modulates (such as Quadrature Phase Shift Keying (QPSK) or Quadrature Amplitude Modulation (QAM)) the input bits to produce a sequence of frequency-domain modulation symbols. Serial-to-parallel block 410 converts (such as de-multiplexes) the serial modulated symbols to parallel data to produce N parallel symbol streams where N is the IFFT/FFT size used in base station (BS) 102 and UE 116. Size N IFFT block 415 then performs an IFFT operation on the N parallel symbol streams to produce time-domain output signals. Parallel-to-serial block 420 converts (such as multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (such as up-converts) the output of add cyclic prefix block 425 to RF frequency for transmission via a wireless channel. The signal can also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 can implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Figure 5A:
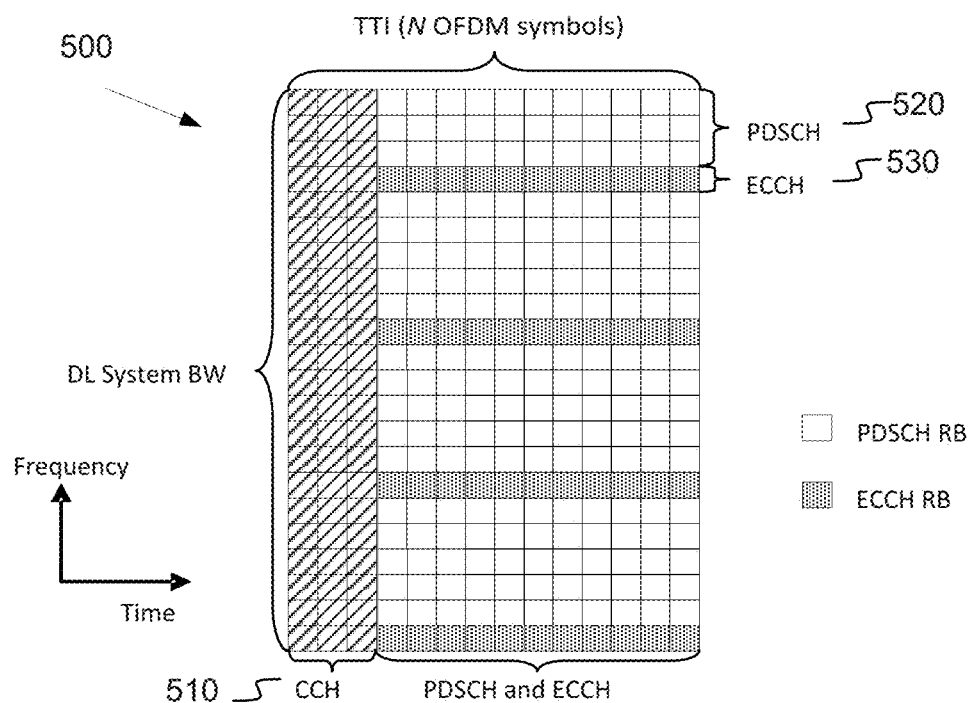
FIG. 5A illustrates an example structure for a downlink (DL) transmission time interval (TTI) according to embodiments of the present disclosure.

FIG. 5A illustrates an example structure for a DL TTI 500 according to embodiments of the present disclosure. An embodiment of the DL TTI structure 500 shown in FIG. 5 is for illustration only. Other embodiments can be used without departing from the scope of the present disclosure.

As illustrated in FIG. 5A, a DL signaling uses OFDM and a DL TTI includes N=14 OFDM symbols in the time domain and K resource blocks (RBs) in the frequency domain. A first type of control channels (CCHs) is transmitted in a first $N_1$ OFDM symbols 510 including no transmission, $N_1$=0. Remaining $N-N_1$ OFDM symbols are primarily used for transmitting PDSCHs 520 and, in some RBs of a TTI, for transmitting a second type of CCHs (ECCHs) 530.

An eNB 103 also transmits primary synchronization signals (PSS) and secondary synchronization signals (SSS), so that UE 116 synchronizes with the eNB 103 and performs cell identification. There are 504 unique physical-layer cell identities. The physical-layer cell identities are grouped into 168 unique physical-layer cell-identity groups which of each group contains three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables a UE 116 to determine the physical-layer identity as well as a slot timing of the cell transmitting the PSS. Detecting a SSS enables the UE 116 to determine a radio frame timing, the physical-layer cell identity, a cyclic prefix length as well as the cell uses ether a frequency division duplex (FDD) or a time division duplex (TDD) scheme.

Figure 5B:
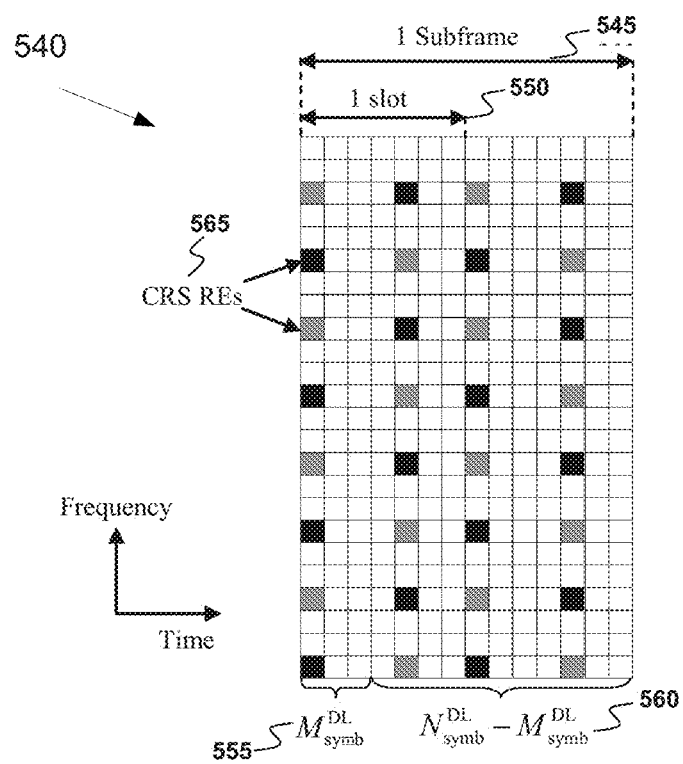
FIG. 5B illustrates an example structure for a common reference signal resource element (CRS RE) mapping according to embodiments of the present disclosure.

FIG. 5B illustrates an example structure for a CRS RE mapping 540 according to embodiments of the present disclosure. An embodiment of the CRS RE mapping 540 shown in FIG. 5B is for illustration only. Other embodiments may be used without departing from the scope of the present disclosure.

To assist cell search and synchronization, DL signals include synchronization signals such as a primary synchronization signal (PSS) and a secondary synchronization signal (SSS). Although having the same structure, the time-domain positions of the synchronization signals within a sub-frame 545 that includes at least one slot 550 differs depending on whether a cell is operating in frequency division duplex (FDD) or time division duplex (TDD). Therefore, after acquiring the synchronization signals, a UE determines whether a cell operates on the FDD or on the TDD, and a subframe index within a frame. The PSS and SSS occupy the central 72 sub-carriers, also referred to as resource elements (REs) 565, of an operating bandwidth. Additionally, the PSS and SSS inform of a physical cell identifier (PCID) for a cell and therefore, after acquiring the PSS and SSS, a UE knows the PCID of the transmitting cell.

Figure 6:
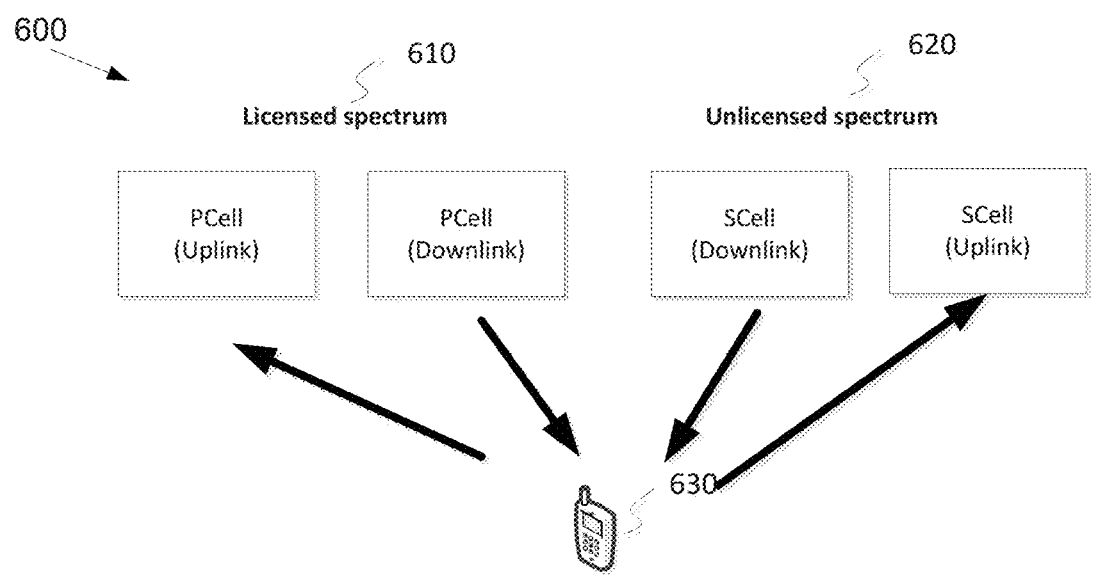
FIG. 6 illustrates an example carrier aggregation scheme on licensed and unlicensed spectrum according to embodiments of the present disclosure.

FIG. 6 illustrates an example carrier aggregation scheme on licensed and unlicensed spectrum 600 according to embodiments of the present disclosure. An embodiment of the carrier aggregation on licensed and unlicensed spectrum 600 shown in FIG. 6 is for illustration only. Other embodiments may be used without departing from the scope of the present disclosure.

A possible deployment scenario for LAA is to deploy an LAA carrier as a part of a carrier aggregation scheme, where the LAA carrier is aggregated with another carrier(s) on a licensed spectrum as illustrated in FIG. 6. In a conventional scheme, carrier(s) on the licensed spectrum 610 is assigned as a PCell and carrier(s) on the unlicensed spectrum 620 is assigned as a SCell for a UE 630. FIG. 6 shows an example where the LAA cell comprises of a downlink carrier with an uplink carrier. Since there may be other RATs operating on the same unlicensed frequency spectrum as the LAA carrier, there is a need to enable co-existence of other RAT with the LAA on an unlicensed frequency spectrum. A carrier sense multiple access (CSMA) may be applied, for example before a LE or an eNB transmits. In the CSMA operation, the UE or the eNB monitors a channel for a predetermined time period to determine whether there is an ongoing transmission in a channel. If no other transmission is sensed in the channel, the UE or the eNB may transmit data. If there is other transmission in the channel, the UE or the eNB postpones a transmission. Hereafter, the term LAA device may refer to an eNB or a UE operating on an LAA carrier.

An LAA operates in the unlicensed spectrum that needs to be fairly shared with other RATs. By implementing the listen-before-talk (LBT) mechanism which allows the eNB or UE to transmit only when the channel is sensed as idle, LAA can guarantee fair coexistence with incumbent RATs.

When a UE has UL data to transmit over the unlicensed spectrum, a UL grant can be sent from the eNB to the UE which specifies how the UE may perform UL transmission, including the time-frequency resources scheduled for UL transmissions. When LBT is required before LAA transmissions and the UL grant is sent on the unlicensed spectrum, a UE can start the LBT process for UL data after the UE's serving eNB has successfully completed the LBT process for UL grant and transmit the UL grant. In order to ensure efficient UL transmissions, it is important for the eNBs to transmit UL grants as fast as possible.

Given UL grants are relatively short messages to be transmitted over small amount of time (e.g., over physical downlink control channel (PDCCH) or enhanced PDCCH (EPDCCH)), two separate LBT processes/procedures can be applied for UL grant and DL data. In one example, the LBT process/procedure for UL grant can be configured to enable higher probability of channel access compared to that for DL data (faster LBT procedure for UL grant).

Figure 7:
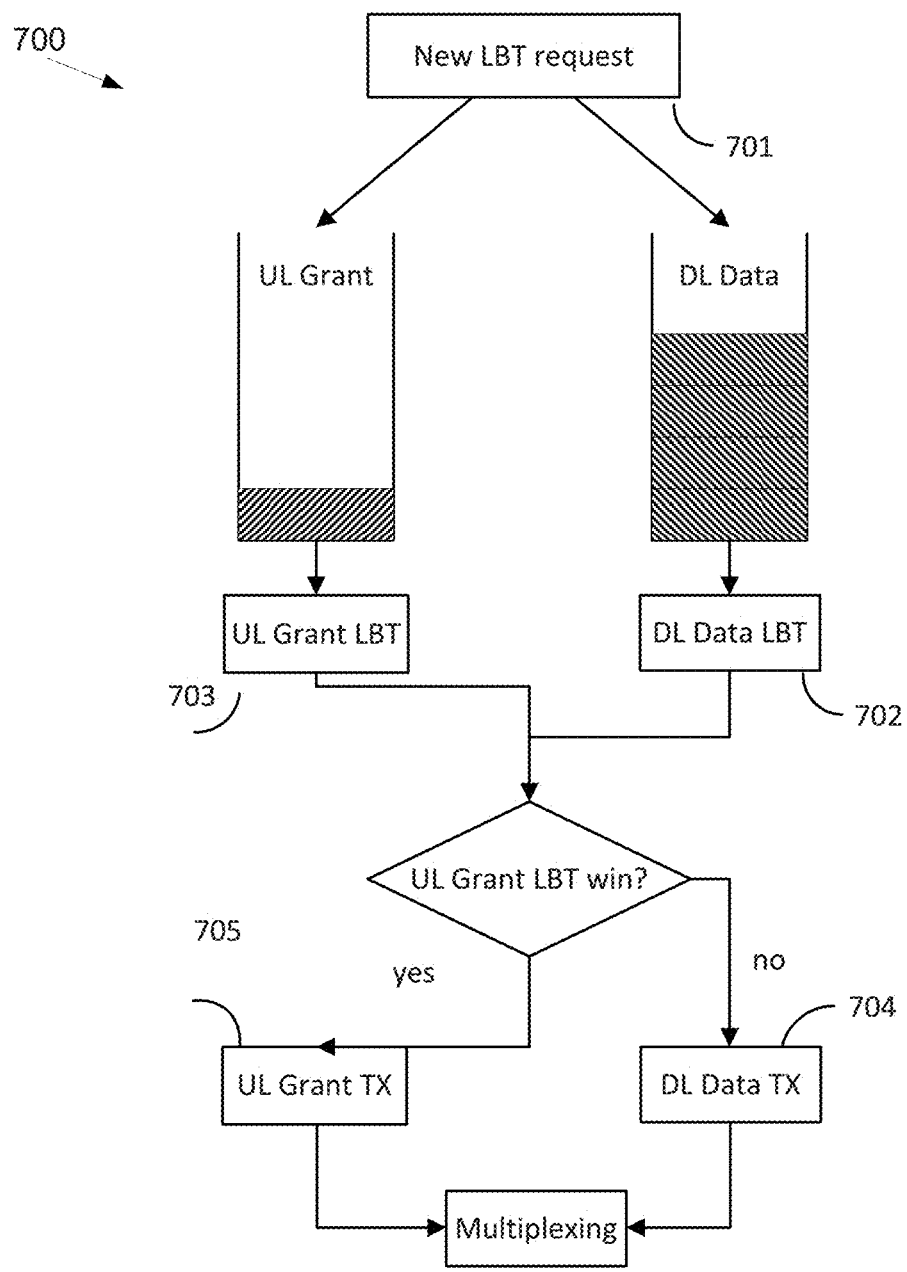
FIG. 7 illustrates an example method for separate listen-before-talk (LBT) method for uplink (UL) grant and downlink (DL) data for multiple LBT engines according to embodiments of the present disclosure.

FIG. 7 illustrates an example method 700 for separate listen-before-talk (LBT) methods for uplink (UL) grant and downlink (DL) data for multiple LBT engines according to embodiments of the present disclosure. An embodiment of the method 700 shown in FIG. 7 is for illustration only. Other embodiments may be used without departing from the scope of the present disclosure. The method 700 may be performed by an eNB, such as for example, the eNB 102 in FIG. 2.

As shown in FIG. 7, the method 700 begins at step 701. The eNB split a new LBT request 301 into the UL grant and DL data at step 703 and 702, respectively. If the UL grant LBT is allowed to be transmitted, the eNB transmit the UL grant at step 705. If not, the eNB terminates the DL data transmission at step 704.

In one embodiment, a new LBT request at the eNB is triggered to transmit either the UL grant or the DL data. The eNB can start to contend for UL grant (e.g. after the eNB receives the scheduling request (SR) from the UE over the licensed carrier). At the same time, the eNB can also contend for DL data (e.g. when the eNB's DL buffer is nonempty). The LBT procedures for UL grant and for DL data can be performed in parallel.

The eNB performs DL data LBT procedure following the LBT with adaptive contention window size adjustment protocol at step 702. For example, each eNB attempting to transmit first determines the availability of the channel by monitoring the energy on this channel for a predefined time. As soon as the eNB observes an idle channel, the eNB can apply an additional random back-off period before transmission. The number of backoff slots is chosen uniformly from 0 to the contention window (CW) size. An exponential backoff scheme is used for DL data, such that the CW size is initialized with a predefined minimum value CWmin, and increases exponentially with a successive transmission failures until the CW size reaches the maximum value CWmax. Contention window resets to the CWmin when the transmission is successful, or retransmission reaches the maximum attempts. In one example, CWmin can be chosen to be 15, whereas CWmax can be 63.

In order to achieve a faster LBT process for UL grant, there may some options adopted for LAA UL grant. In some embodiments, for example LBT without random backoff (e.g., one-shot CCA", the eNB may transmit UL grant once the channel is sensed to be idle for a predefined time. This option can enable a fast LBT process for UL grant. The duration of the sensing period can be comparable to Wi-Fi's SIFS (e.g. 16 us in IEEE 802.11n), PIFS (e.g. 25 us in IEEE 802.11n), and DIFS (e.g. 34 us in IEEE 802.11n).

In some embodiments, for example LBT with random backoff and fixed contention window size, after the channel is idle for a predefined time, the eNB can follow the random backoff procedure with a fixed contention window size. In order to achieve a fast UL grant transmission, a smaller contention window size value (e.g., 7) can be chosen for UL grant LBT.

In some embodiments, for example LBT with random backoff and contention window size adjustment, the eNB may follow the same process as the DL data but with smaller CWmin and/or CWmax values. For example, same contention window size as the video traffic (higher priority LBT class) in IEEE 802.11e standard can be used, where (CWmin, CWmax)=(7, 15). For another example, the contention window sizes corresponding to the highest priority LBT class (i.e., (CWmin, CWmax)=(3, 7)) can also be utilized for uplink grant transmission. In another example, smaller contention window size than all predefined ones in downlink data transmission can be utilized for uplink grant, e.g. (CWmin, CWmax)=(1,3).

Figure 8:
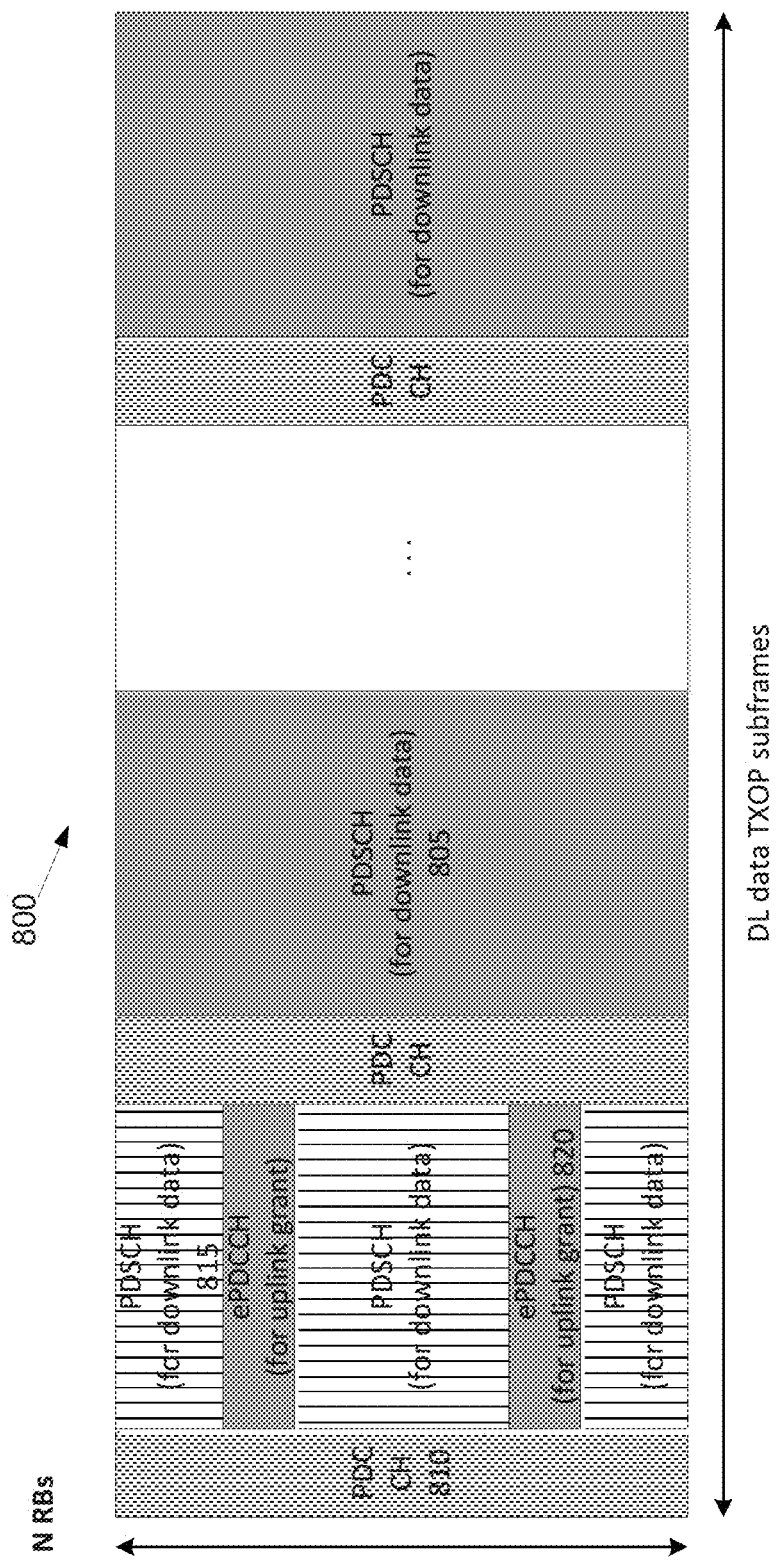
FIG. 8 illustrates an example multiplexing UL grant into a transmission of DL data according to embodiments of the present disclosure.

FIG. 8 illustrates an example multiplexing UL grant 800 into a transmission of downlink data according to embodiments of the present disclosure. An embodiment of multiplexing UL grant 800 as shown in FIG. 8 is for illustration only. Other embodiments may be used without departing from the scope of the present disclosure. As shown in FIG. 8, the multiplexing UL grant 800 comprises a plurality of PDSCHs 805, a plurality of PDCCHs 810, a plurality of PDSCHs 815, and a plurality of EPDCCHs 820.

In some embodiments, when the LBT process for DL data has successfully completed, the eNB can first examine the status of the UL grant LBT process, and multiplex UL grant (if any) with DL data for transmission (304). In particular, the UL grant messages (if any) can be transmitted in the PDCCH/EPDCCH, and the transmission opportunity (TXOP) length for DL data can be chosen up to a predefined value (e.g. 4 ms or 10 ms) as shown in FIG. 8. Since the total TXOP for DL data can be constrained by a maximum value, Wi-Fi performance may not be affected when multiplexing UL grant with LAA DL data. The LBT procedure for UL grant can be considered successfully completed if UL grant is multiplexed with DL data as a result of successful completion of the LBT procedure for DL data (e.g. if the LBT procedure for UL grant is based on random backoff, the backoff counter value can be reset or new random value for the backoff counter can be chosen).

Figure 9:
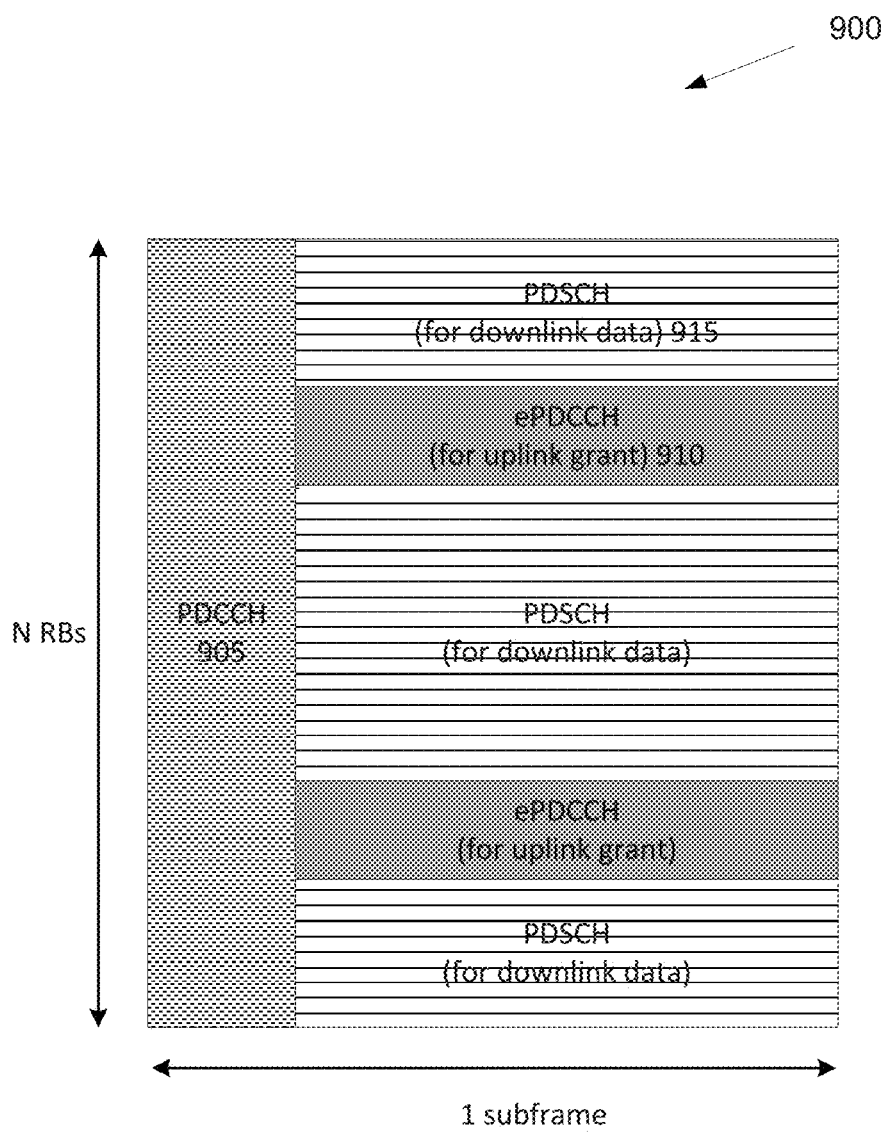
FIG. 9 illustrates an example multiplexing DL data into a transmission of UL grant according to embodiments of the present disclosure.

FIG. 9 illustrates an example multiplexing DL data 900 into a transmission of uplink grant according to embodiments of the present disclosure. An embodiment of the multiplexing DL data 900 shown in FIG. 9 is for illustration only. Other embodiments may be used without departing from the scope of the present disclosure. As shown in FIG. 9, the multiplexing downlink data 900 comprises a PDCCH 905, a plurality of EPDCCH 910, and a plurality of PDSCH 915.

In some embodiments, when UL grant LBT process is successfully completed (e.g., step 705), the eNB can transmit UL grant messages on PDCCH/EPDCCH. The LBT procedure for DL data can be suspended while UL grant is being transmitted by the eNodeB. The maximum transmission durations after successful completion of the LBT procedure corresponding to UL grant can be different than that of the LBT procedure corresponding to DL data. In one example, the maximum transmission duration after successful completion of the LBT procedure corresponding to UL grant is shorter (e.g. 1 millisecond (ms) or 2 ms) than that of the LBT procedure corresponding to DL data (e.g. 4 ms or 10 ms). Downlink data is also allowed to be multiplexed into the remaining transmission resources on PDSCH within this short duration (e.g., shown in FIG. 9).

In some embodiments, variations to the procedure illustrated are possible. In one example, either one LBT procedure can be suspended by the eNodeB at any time to enable the other LBT procedure to be successfully completed first. One example is that the LBT procedure for UL grant can be suspended when there is a more urgent DL data to be transmitted. This is because transmission of UL grant can further delay transmission of DL data since DL data may not multiplex with UL grant transmission upon successful completion of LBT procedure for UL grant.

Figure 10:
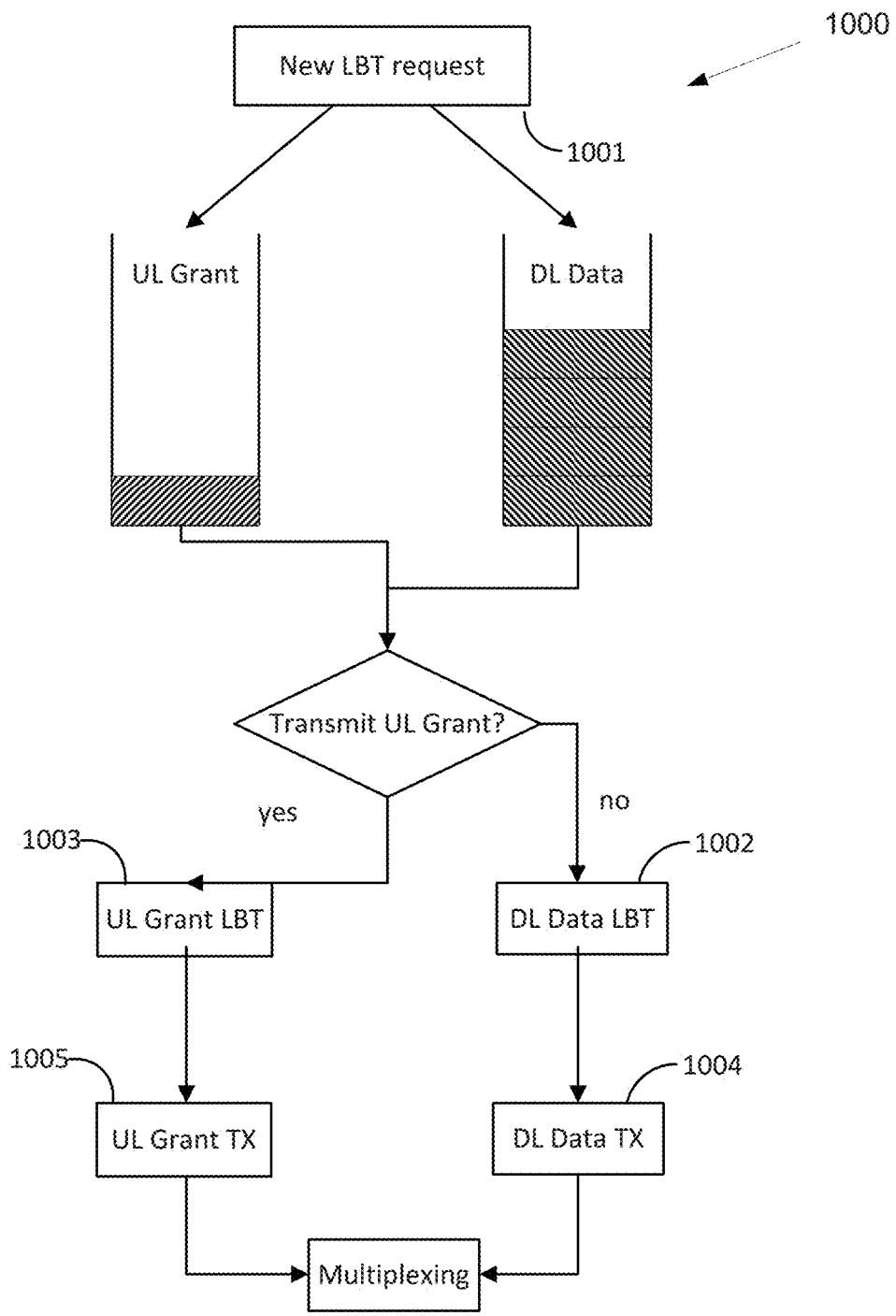
FIG. 10 illustrates an example method for separate LBT procedures for uplink grant and downlink data for single LBT engine according to embodiments of the present disclosure.

FIG. 10 illustrates an example method 1000 for separate LBT processes for UL grant and DL data for single LBT engine according to embodiments of the present disclosure. An embodiment of the method 1000 shown in FIG. 10 is for illustration only. Other embodiments may be used without departing from the scope of the present disclosure. For example, the method 1000 may be performed by an eNB, such as for example, the eNB 102 in FIG. 2.

As shown in FIG. 10, the method 1000 begins at step 1001. At step 1001, the eNB generate new LBT request. The eNB transmits DL data LBT at step 1004 if UL grant is not allowed to be transmitted. At step 1003, the eNB generates UL grant LBT. At step 1002, the eNB generates DL data LBT. At step 1005, the eNB transmits UL grant LBT. And then the eNB transmits DL data at step 1004.

In one example, a new LBT request at the eNB is triggered to transmit either the UL grant or the DL data (e.g., step 1001), instead of running multiple LBT processes for UL grant and DL data separately in the multiple LBT engines case, the eNB may choose one from uplink grant and downlink data to transmit (e.g. can be decided from higher level). Then only one LBT process (e.g., either step 1002 or step 1003) is performed either according to the chosen transmission target. If the LBT succeeds, a corresponding transmission can take place. The multiplexing of uplink grant and downlink data can be exactly the same as multiple LBT engine case.

Since the LBT process is required before transmission, it can be beneficial for LAA UL grants to be transmitted in a less frequent way compared to the conventional LTE. One option for LAA is to adopt a new UL grant format, where each UL grant schedules UL transmissions in multiple TTI, and the UL grant LBT process for a UE may be triggered if one of the following conditions happens. In one example, an eNB can make scheduling decision and initiate a new UL grant message for the UE when new UL data arrives at the UE. In another example, UL grant needs to be updated when the UE has already received a UL grant, while another UE has either new data arrivals or finished the UE's UL transmissions, such that the scheduler needs to update the UL resource allocations. In yet another example, UL grant needs to be re-transmitted, if a UE does not start UL transmission after some timeout value since the eNB has transmitted a UL grant. In such example, the eNB may attempt to re-transmit the UL grant to this UE and the eNB can potentially adjust the eNB's contention window size for UL grant re-transmissions.

LAA can schedule orthogonal resource blocks (RBs) among UEs, and each UE can perform LBT and UL transmission over the allocated RBs specified in the UL grant. The uplink scheduling may be based on the computation of one or more resource allocation metrics, such as round-robin or proportional fairness. In addition, an UE uplink activity metric, which counts the fraction of uplink transmission durations over the current scheduling period, can also be considered to account for the UL LBT process.

In one example, when an eNB assigns orthogonal resources to a UE 1 and a UE 2, and the UE 1 has high uplink activity while the UE 2 has very low uplink activity (possibly due to high interference), then the eNB can schedule uplink resources from the UE 2 to the UE 1 in order for the UE 1 to finish uplink faster. The clear channel assessment (CCA) threshold at each UE is proportional to the transmission bandwidth. For example, if an LAA UE uses −62 dBm as the CCA threshold with 20 megahertz (MHz) bandwidth, the LAA UE can use −65 dBm as CCA threshold with 10 MHz bandwidth. The UE may perform multiple LBT procedures in parallel, with each LBT procedure corresponding to a different potential bandwidth and corresponding CCA threshold.

Figure 11:
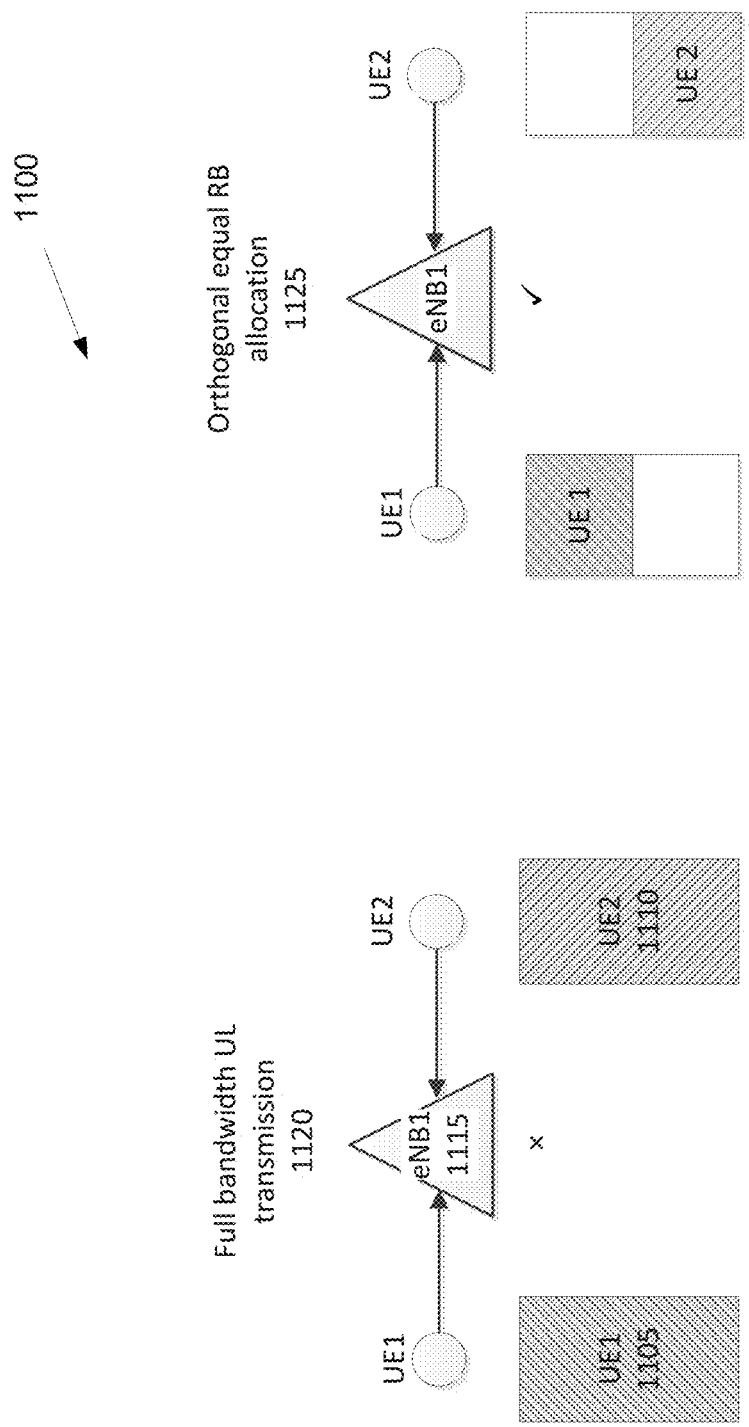
FIG. 11 illustrates an example orthogonal UL resource allocation according to embodiments of the present disclosure.

FIG. 11 illustrates an example orthogonal UL resource allocation 1100 according to embodiments of the present disclosure. An embodiment of the orthogonal UL resource allocation 1100 shown in FIG. 11 is for illustration only. Other embodiments may be used without departing from the scope of the present disclosure. As shown in FIG. 11, the orthogonal UL resource allocation 1100 comprises a plurality of UE1s 1105 and a plurality of UE2s 1110. In addition the plurality of UE1s 1105 and the plurality of UE2s 1110 communicate with an eNB1 1115 using full bandwidth UL transmission 1120. Similarly, the plurality of UE1s 1105 and the plurality of UE2s 1110 communicate with the eNB1 1115 using orthogonal equal RB allocation 1125.

Orthogonal resource allocation among UEs has some additional benefits for LAA, such as a faster UL data LBT process and alleviation of the hidden terminal problem. For example, if UE 1 (e.g., 1105) and UE 2 (e.g., 1110) are not hidden terminals, then the UE 1 and the UE 2 can still transmit simultaneously with orthogonal RB allocation, as opposed to full bandwidth transmission. If the UE 1 and the UE 2 are hidden nodes to each other, then eNB can successfully decode UL transmission from both the UE 1 and the UE 2 with orthogonal RB allocation, while collision may happen at eNB (e.g., 1115) with full bandwidth UL transmission.

Since LAA operates in the single unlicensed band, LAA may operate in a time-division duplex mode, where both uplink traffic and downlinks traffic need to follow the LBT process to obtain channel access. Therefore, the overall LAA DL and UL operation may be significantly different from (FDD) LTE.

Figure 12:
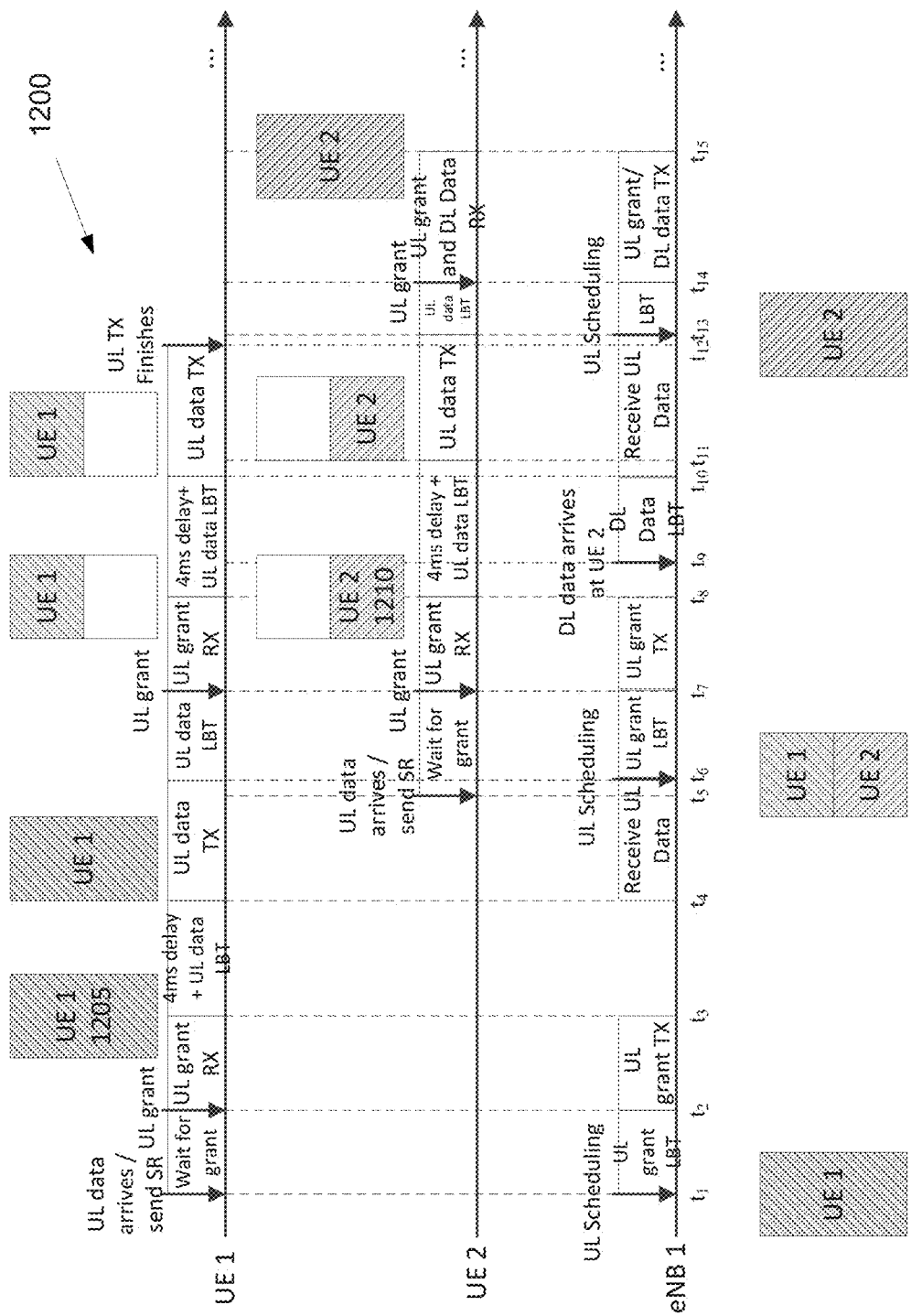
FIG. 12 illustrates an example licensed assisted access (LAA) UL procedure according to embodiments of the present disclosure.

FIG. 12 illustrates an example licensed assisted access (LAA) UL procedure 1200 according to embodiments of the present disclosure. An embodiment of the LAA UL procedure 1200 shown in FIG. 12 is for illustration only. Other embodiments may be used without departing from the scope of the present disclosure. As shown in FIG. 12, the LAA UL procedure 1200 comprises a plurality of UE1s 1205 and a plurality of UE2s 1210.

Before time instant t1, a UE 1 (e.g., 1205), a UE 2 (e.g., 1210) and an eNB1 all have empty buffer. At time instant t1, new UL data arrives at the UE1. The UE 1 sends a new scheduling request (SR) over the licensed carrier and starts to wait for UL grant. When an eNB 1 receives the SR from UE 1, the eNB schedules all the uplink resources to the UE 1 and starts the UL grant LBT process for the UE 1. At time instant t2, the eNB 1 finishes UL grant LBT and transmits to the UE 1. At time instant t3, the UE 1 successfully receives the UL grant. Then the UE1 prepares the UL transmission with 4 ms delays as LTE, and starts to contend for UL data transmissions. At time instant t4, the UE 1 finishes LBT process and transmits UL data using the UE 1's scheduled uplink resources.

In the meantime, the eNB 1 starts to receive uplink packets from the UE 1. At time instant t5, new UL data arrives at the UE 2. The UE 2 sends a new SR to the eNB1 and starts to wait for UL grant. Since the eNB1 is currently in receive state, the eNB 1 may not make scheduling decisions until the current UL transmission from the UE1 is finished. At time instant t6, the UE 1 has finished transmitting the current burst (e.g. 4 ms burst length). In this example, the UE 1 still has non-empty UL buffer, so the UE 1 can start a new UL data LBT process in order to transmit the remaining UL data. Then, the eNB 1 can allocate orthogonal resources to the UE 1 and the UE 2, and start UL grant LBT process. At time instant t7, eNB 1 finishes UL grant LBT and transmits to the UE 1 and the UE 2. The UE 1 suspends the UE 1's ongoing UL data LBT and receives the updated UL grant, while the UE 2 receives the new UL grant from the eNB 1.

At time instant t8, both the UE 1 and the UE 2 decodes each UE's UL grant and obtains each UE's corresponding UL resource locations. Both the UE 1 and the UE 2 can prepare the UL transmission with 4 ms delay. Then the UE 1 can continue the UE 1's suspended UL data LBT process, and the UE 2 can start a new UL data LBT. At time instant t9, a new DL data request from the UE 2 arrives at the eNB, which can trigger the eNB to start DL data LBT. At time instant t10, the UE 1 first finishes UL LBT process and starts UL transmission. Then the eNB 1 suspends the eNB's DL data LBT and receive UL data from the UE 1. At time instant t11, the UE 2 finishes UL LBT process and starts UL transmission. Then eNB 1 receives UL transmission from the UE 2. At time instant t12, the UE 1 finishes current UL transmission burst with an empty UL buffer. At time instant t13, the UE 2 finishes current UL transmission burst with non-empty UL buffer, and new UL data LBT process is started. Since the UE 1 has finished UL transmission, the eNB 1 can schedule all UL resources to UE 2. A new LBT process for UL grant may be triggered at the eNB 1, and the eNB may also resume the suspended DL data LBT.

At time instant t14, DL data LBT at the eNB 1 finishes while UL grant LBT still has non-zero backoff counter. This triggers the eNB 1 to multiplex UL grant with DL data, and transmit together to the UE 2 (DL data cannot be multiplexed with UL grant if UL grant LBT finishes first). The UE 2 suspends the UE2's current UL data LBT. At time instant t15, the eNB 1 finishes the eNB's current DL transmission burst with non-empty DL buffer, and new DL data LBT process may be triggered. The UE 2 has received an updated UL grant, and may continue the UE 2's suspended UL data LBT process. Similar DL and UL operation can be continued after time instant t15, which is omitted.

When LAA UL grant LBT uses random backoff with contention window size adjustment scheme, appropriate triggers for the CW adjustment need to be adopted. However, unlike DL data, an LAA UE may not send explicit UL grant ACK/NACK information to the eNB, or if such ACK/NACK signaling is possible on the licensed carrier, it may not be beneficial due to limited UL channel capacity on the licensed primary cell (PCell). As a result, an LAA eNB needs to exploit other feedbacks from a UE in order to make CW adjustment decision.

In some embodiments, an eNB adjusts contention window size based on repeated scheduling request (SR) from UE. In this option, an UE maintains a timer after the UE triggers a new scheduling request to the eNB. This timer may count down every TTI until the UE receives the UL grant or reaches 0. Once the timer expires but the UE does not receive any UL grant, the UE can transmit a repeated SR over licensed carrier to the eNB. The timer may be reset and start to count down again. If the eNB has already transmitted UL grant and has not observed any physical uplink shared channel (PUSCH) from this UE, the eNB may increase (e.g. double) the contention window size and start a new UL grant LBT process once the eNB receives the repeated SR. In one example, the initial timer value at the UE can be chosen as 5 ms to account for the fact that eNB can be transmitting or receiving (TXOP=4 ms) when the SR of this UE arrives.

In some embodiments, an eNB adjusts contention window size based on PUSCH and DTX information from a UE. After the eNB has transmitted the UL grant, the eNB receives the PUSCH transmission in the scheduled resources from the UE means the UL grant transmission is successful. In contrast, if UL grant decoding is unsuccessful, or the UE receives UL grant but has not finished UL transmission LBT, only DTX from this UE may be detected. Therefore, after N+4 ms since UL grant is transmitted (4 ms accounts for the fact that UL transmission happens after 4 ms since the UE receives UL grant in LTE), the eNB can observe the PUSCH/DTX information for the last N ms, where N is a predefined or configurable integer (e.g. N=0, 1, 2, 4 . . . etc.). In another example N may correspond to N UL grants or N potential resources for PUSCH/DTX transmission. The value of N may correspond to a TxOP duration containing both UL and DL or UL-only transmissions, or may correspond to multiple TxOP durations. If DTX is detected for at least one of the scheduled UEs, the eNB can retransmit UL grant, and the contention window size may be triggered to increase.

FIG. 13 illustrates an example single discontinuous transmission (DTX)-only UE trigger 1300 for contention window increase according to embodiments of the present disclosure. An embodiment of the single DTX-only UE trigger 1300 shown in FIG. 13 is for illustration only. Other embodiments may be used without departing from the scope of the present disclosure. As shown in FIG. 13, the single DTX-only UE trigger comprises a plurality of PUSCHs 1305 and a plurality of DTXs 1310.

In some embodiments of single DTX-only UE trigger. In such embodiments, after 4 ms since an eNB transmits the UL grant, the eNB can retransmit UL grant with doubled contention window size if any of the scheduled UEs has only transmitted DTX for the next N ms. When N is large enough such that the UE is most likely to win UL LBT process after N+4 ms since the UE receives UL grant, the eNB can determine that the UE has not successfully decoded UL grant due to congestion and may retransmit UL grant with increased CW size. For example, the PUSCH/DTX information from the 5th to 14th (i.e., N=10) ms after the eNB transmits UL grant as shown in FIG. 13. Since the UE 4 is scheduled but has only transmitted DTX, the eNB may increase CW size for UL grant LBT.

FIG. 14 illustrates an example thresholding trigger 1400 for contention window increase with θ=⅓ according to embodiments of the present disclosure. An embodiment of the thresholding trigger 1400 shown in FIG. 14 is for illustration only. Other embodiments may be used without departing from the scope of the present disclosure. As shown in FIG. 1400, the thresholding trigger 1400 comprises a plurality of PUSCCHs 1405 and a plurality of DTXs 1410.

In some embodiments of thresholding trigger, an eNB may retransmit UL grant with increased contention window size if the number of DTX-only UE over the total scheduled UE is greater than some threshold θ, e.g. ⅓. The motivation is that if all the UEs only have DTX, it is very likely that UL grant transmission is not successful due to collisions; while if all the UEs have transmitted PUSCH, then the UL grant transmission is successful for all the UEs. Therefore, the threshold θ determines how sensitive the eNB is to the DTX UEs. FIG. 14 shows the example when N=8 and θ=⅓.

In some embodiments of reference thresholding trigger, an eNB may retransmit UL grant with increased contention window size if the number of DTX-only UE over the total scheduled UE with respect to reference subframes is greater than some threshold θ. The motivation here for this embodiments is that not all the subframes contribute to the determination of contention window size adaptation, and only part of them are utilized to determine the trigger. For example, the first or first several subframes with a burst can be the reference, because the beginning of a burst may meet with more collision than the end of a burst. In another example, the end of a burst can also be utilized as references, since the references may contain more recent channel state information. Note that if all subframes within a burst are considered as references, the scheme is identical to the aforementioned embodiments.

When an LAA UE starts uplink transmission LBT, the LAA UE can have the capability to down-select within the LAA UE's scheduled PUSCH resource blocks to trigger a faster LBT process. Specifically, if an UE is scheduled more than N0 resource blocks within 1 TTI, the UE may equally allocate N sub resource block (RB) group in frequency domain. If the UE observes a busy channel over the UE's allocated resources, the UE examines the received energy at each sub RB group, and randomly select one sub RB group to continue the LBT process if any of them passes the CCA condition (CCA threshold is proportional to the bandwidth of sub RB group). There can be two alternatives after UE finds his new available transmission resources.

In one example, the UE transmits a new scheduling request which contains the CCA results (i.e. available bandwidth for transmission), and the eNB performs rescheduling using this information and transmits a new uplink grant to the UE. In this example, the overall latency may increase, but the decoding at the eNB for uplink data is easier. In another example, after completing UL LBT process, the UE transmits directly over the UE's selected sub RB group in the current burst. This example may reduce the latency as the aforementioned example, but the eNB may need to perform blind detection in order to discover the new transmission resources.

Figures 15, 16:
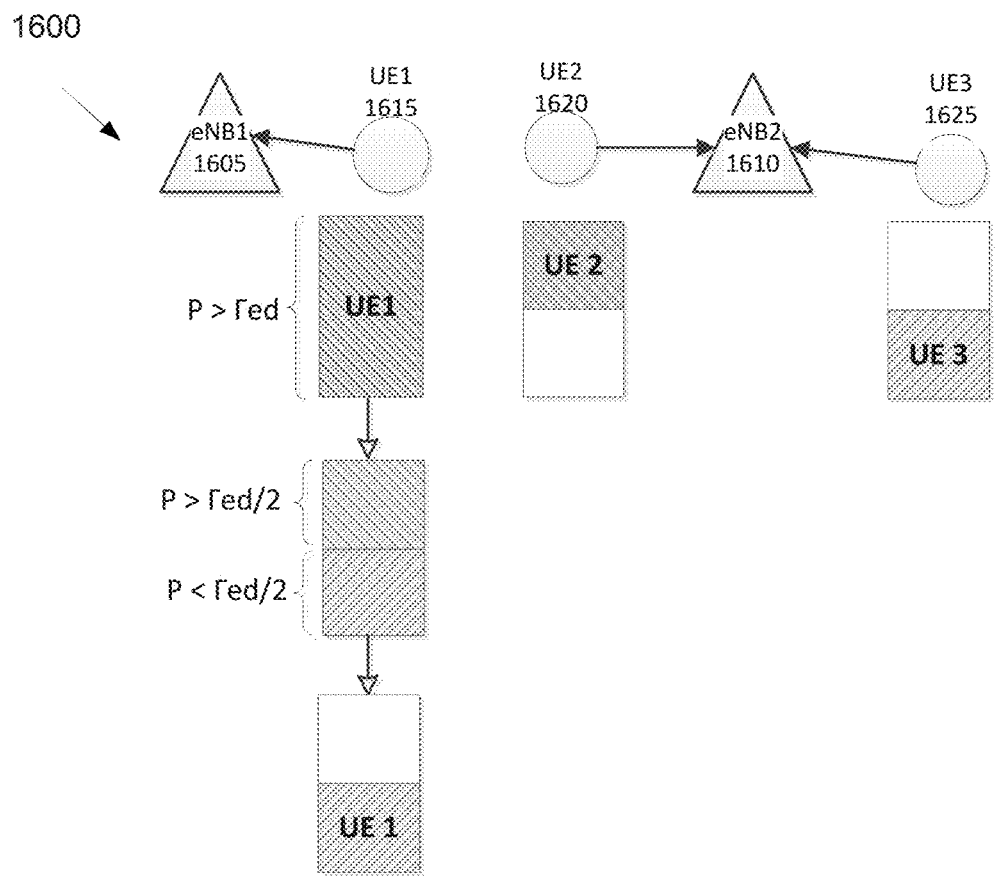
FIG. 15 illustrates an example reference thresholding trigger for contention window increase with reference as the first subframe and $\theta=\frac{1}{3}$ according to embodiments of the present disclosure.
FIG. 16 illustrates an example UE resource down-selection with N=2 according to embodiments of the present disclosure.

FIG. 15 illustrates an example reference thresholding trigger 1500 for contention window increase with reference as the first subframe and θ=⅓ according to embodiments of the present disclosure. An embodiment of the reference thresholding trigger 1500 shown in FIG. 15 is for illustration only. Other embodiments may be used without departing from the scope of the present disclosure. As shown in FIG.

15, the reference thresholding trigger 1500 comprises a plurality of PUSCHs 1505 and a plurality of DTXs 1510.

FIG. 16 illustrates an example UE resource down-selection 1600 with N=2 according to embodiments of the present disclosure. An embodiment of the UE resource down-selection 1600 shown in FIG. 16 is for illustration only. Other embodiments may be used without departing from the scope of the present disclosure. As shown in FIG. 16, the UE resource down-selection 1600 comprises an eNB 1605, an eNB 1610, a UE 1 1615, a UE 2 1620, and a UE 3 1625.

As shown in FIG. 16, the UE 1 1615 observes a busy channel over the UE's allocated resources due to the strong interference from the UE 2 1620. Instead of treating channel as busy, the UE 1 1615 down-selects to the UE 1's second sub RB group where the channel is free, and continues the LBT process and the subsequent UL transmission over the second sub RB group. This scheme is also helpful to solve the exposed terminal problem, especially in high UL traffic scenario.

In current LTE system, after the detection reception of uplink grant, a UE needs another 4 ms to perform decoding and preparation for uplink transmission. This UL grant—PUSCH timing issue introduces further transmission delay for uplink comparing to downlink.

For cross-carrier scheduling, uplink grant is transmitted over PDCCH or EPDCCH on the licensed spectrum. In contrast, for self-carrier scheduling, uplink grant is transmitted over PDCCH or EPDCCH on the unlicensed spectrum, which may further enlarge the UL grant—PUSCH timing due to failed downlink channel access.

Hence, the transmission abilities of LAA downlink, uplink self-carrier scheduling, and uplink cross-carrier scheduling can be ordered as: downlink>uplink cross-carrier scheduling>uplink self-carrier scheduling. To this end, to balance the transmission ability of downlink and uplink, the choices of contention window sizes in CAT4-based LBT can be designed as: downlink>=uplink cross-carrier scheduling>=uplink self-carrier scheduling. For example, downlink transmission with priority class 3 has contention window size {15, 31, 63}, then uplink transmission with cross-carrier scheduling can utilize {7, 15}, and uplink transmission with self-carrier scheduling can utilize {3, 7}, {1, 3}, or even shorter (e.g. CAT2-based LBT, where contention window size is 0).

In an LAA uplink, an eNB may want to align the backoff counters of all scheduled UEs, such that the chance to also align the completion of LBTs of multiple UEs can be improved. In this case, the eNB may need to maintain the contention window size and backoff counter for all serving UEs, and there are multiple ways of performing. In one example, the eNB maintains a common contention window size for all serving UEs. After generating a backoff counter based on the common contention window size, the eNB transmits the backoff counter to all scheduled UEs using downlink channel information (DCI). In another example, the eNB maintains separate contention window size for each UE. If a backoff counter is required, the eNB can generate if from all contention window sizes with respect to all scheduled UEs. For example, the eNB can use the maximum, minimum, mean, weighted mean, or other function of the target contention window sizes to generate a common contention window size, and generates the backoff counter based on that contention window size. In yet another example, the eNB can generate multiple backoff counters first based on the contention window size of each UE and then perform a maximum, minimum, mean, weighted mean, or other function to the backoff counters to generate a common backoff counter. Finally, the generated backoff counter is transmitted to all scheduled UEs using DCI.

In the aforementioned examples, the backoff counter is transmitted in uplink grant to the scheduled UEs. This procedure may increase the overhead of DCI, regarding the large range of backoff counter. In one embodiment, a scheme to cut down the resolution of backoff counter is used, such that the overhead in DCI is reduced. For example, a backoff counter is generated uniformly from 0 to the contention window size. If the contention window size is 15, the backoff counter may be uniformly distributed from 0 to 15 (16 possible values). To save the number of bits to represent the backoff counter, further limitation can be introduced to the way of generating the backoff counter. For example, if the backoff counter is limited to be odd or even, 1 bit can be saved. If the backoff counter is further limited to be multiple of 4 or to be with the same residue divided by 4, 2 bits can be saved. In another example, the values of backoff counter may not be with even spacing as well. Small values may be chosen if aiming for more aggressive LBT, and choose more large values if aiming for more conservative LBT.

Since there may be other RATs operating on the same unlicensed spectrum as the LAA carrier, there is a need to enable co-existence of other RATs, like WiFi, with LAA on an unlicensed frequency spectrum. Listen-before-talk (LBT) protocol can be applied. For example, before a UE or an eNB (or more generally, a LAA device) transmits, an LAA device monitors a channel for a predetermined time period to determine whether there is an ongoing transmission in the channel. If no other transmission is sensed in the channel, the LAA device can transmit; otherwise, the LAA device postpones transmission e.g. by random backoff. This backoff counter is generated from a range of values e.g. from 0 to a contention window (CW) size, and the CW size can be adaptively adjusted.

A WiFi LBT protocol may not be directly adopted for LAA due to some differences between WiFi and LTE system. In one example, LTE system has a longer delay to receive ACK/NACK/DTX reports (e.g., hybrid automatic repeat and request-ACK (HARQ-ACK) corresponding to the transport block received in subframe n is transmitted in subframe n+4). In another example, due to the delay of receiving ACK/NACK/DTX reports, data is typically retained in the transmitter's buffer while waiting for ACK/NACK/DTX reports. In yet another example, also due to this delay, when the LAA device adjusts the LAA device's CW size, not all HARQ-ACK reports from the most recent transmission burst may be available. In yet another example, the LTE system may multiplex multiple UEs' data in a single subframe, hence the eNB may receive multiple ACK/ANCK/DTX reports from all scheduled UEs at the same time. In yet another example, in the LTE system, there is separate ACK/ANCK/DTX report for each transport block. Consequently, the eNB may receive multiple ACK/ANCK/DTX reports corresponding to different transport blocks within a transmission burst.

In order to improve the performance of unlicensed carrier transmission, as well as to coexist with existing RATs on unlicensed spectrum, an adaptive contention window (CW) control scheme can be adopted.

Figure 17:
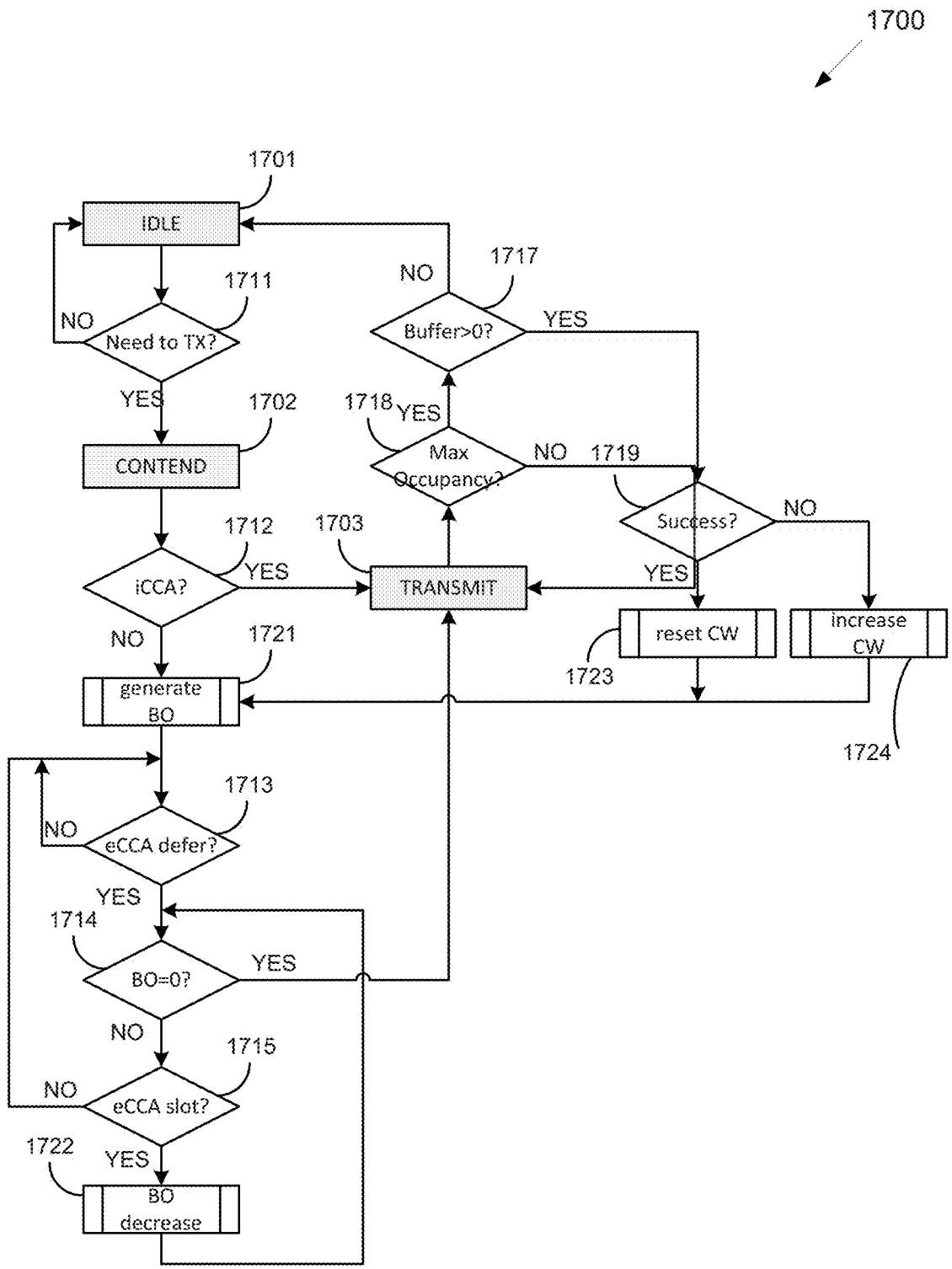
FIG. 17 illustrates an example LBT protocol for LAA downlink according to embodiments of the present disclosure.

FIG. 17 illustrates an example LBT protocol 1700 for LAA downlink according to embodiments of the present disclosure. An embodiment of the LBT protocol 1700 shown in FIG. 17 is for illustration only. Other embodiments may be used without departing from the scope of the present disclosure. As shown in FIG. 17, at a particular instant, one eNB can be in one of the three predefined states: IDLE (e.g., step 1701), CONTEND (e.g., step 1702), and TRANSMIT (e.g., step 1703). At step 1701, an eNB's downlink buffer (with respect to all served UEs) is empty. At step 1702, the eNB's downlink buffer is non-empty, and there is a need to transmit. Clear channel assessment (CCA) is performed at step 1702 to contend for the channel. At step 1703, the eNB transmits downlink signals on the channel. At step 1701 the eNB remains in IDLE state until downlink data at step 1711 request arrives. As soon as data arrives, the state of corresponding eNB transfers to step 1702 (e.g., CONTEND).

Initial CCA (iCCA) (e.g., step 1712) using e.g. energy detection is performed for an eNB to detect the interference on the target channel. The eNB keeps sensing the operating channel for duration (e.g. 34 microseconds (μs)). The operating channel may be considered occupied if the energy level in the channel exceeds a predefined threshold (e.g. −62 dBm, −72 dBm, −82 dBm). If the equipment finds the channel to be clear, the eNB may transfer to TRANSMIT state (e.g., step 1703) and transmit immediately. Otherwise, the eNB may not transmit on that channel, and may perform an extended CCA (eCCA) check in which the operating channel is observed for the duration of a random factor (the number of backoff counter slots) multiplied by the extended CCA slot time (e.g. 9 μs).

At the beginning of eCCA, the eNB generates a backoff counter at step 1721, which is uniformly and randomly selected from a range of value from 0 to contention window size. The contention window size is variable via dynamic variable backoff or semi-static backoff between two configurable parameters, for example CW min and CW max.

A defer in which the eNB keeps sensing the channel at step 1713 (can be similar duration as iCCA) is performed before decreasing the backoff counter. If the eNB senses the channel to be clear for the delay duration, the eNB can proceed to decrease the backoff counter; otherwise, the eNB maintains sensing of the channel until a period of the delay duration is sensed to pass the CCA. At step 1714, the eNB determine whether the backoff counter is set to zero. If the backoff counter is set to zero, the eNB performs transmission at step 1703. If the backoff counter is not set to zero, the eNB performs eCCA slot determination at step 1715.

The eNB backoff counter can decrease by 1 at step 1722 only if the channel is sensed to be clear for a period of extended CCA slot time at step 1715. If the countdown process is interrupted, the eNB has to go back to defer of eCCA at step 1713 and keep sensing the channel until the channel is clear. In this defer period, the backoff counter does not decrease and remains the same until next opportunity to countdown. When the backoff counter decreases to 0, the eNB can transfer to TRANSMIT at step 1703 and start transmission immediately.

A total of time that the eNB can make use of an operating channel is the "maximum channel occupancy time" at step 1718 (e.g. 4 ms or 10 ms). After transmission, the eNB transfers to IDLE state (e.g., step 1701) if the buffer for all served UEs are empty. Otherwise, the eNB transfers to CONTEND state (e.g., step 1702) and keeps contending for occupying the channel. A contention window (CW) size can be adjusted at step 1723 (e.g., reset CW) and step 1724 (e.g., increase CW) based on the ACK/NACK/DTX or CSI report by the UE at step 1719. At step 1717, if the eNB determines that the buffer is not empty, the eNB moves to step 1701. If the buffer is empty (e.g., buffer is set to zero), the eNB resets CW size at step 1723.

Figure 18:
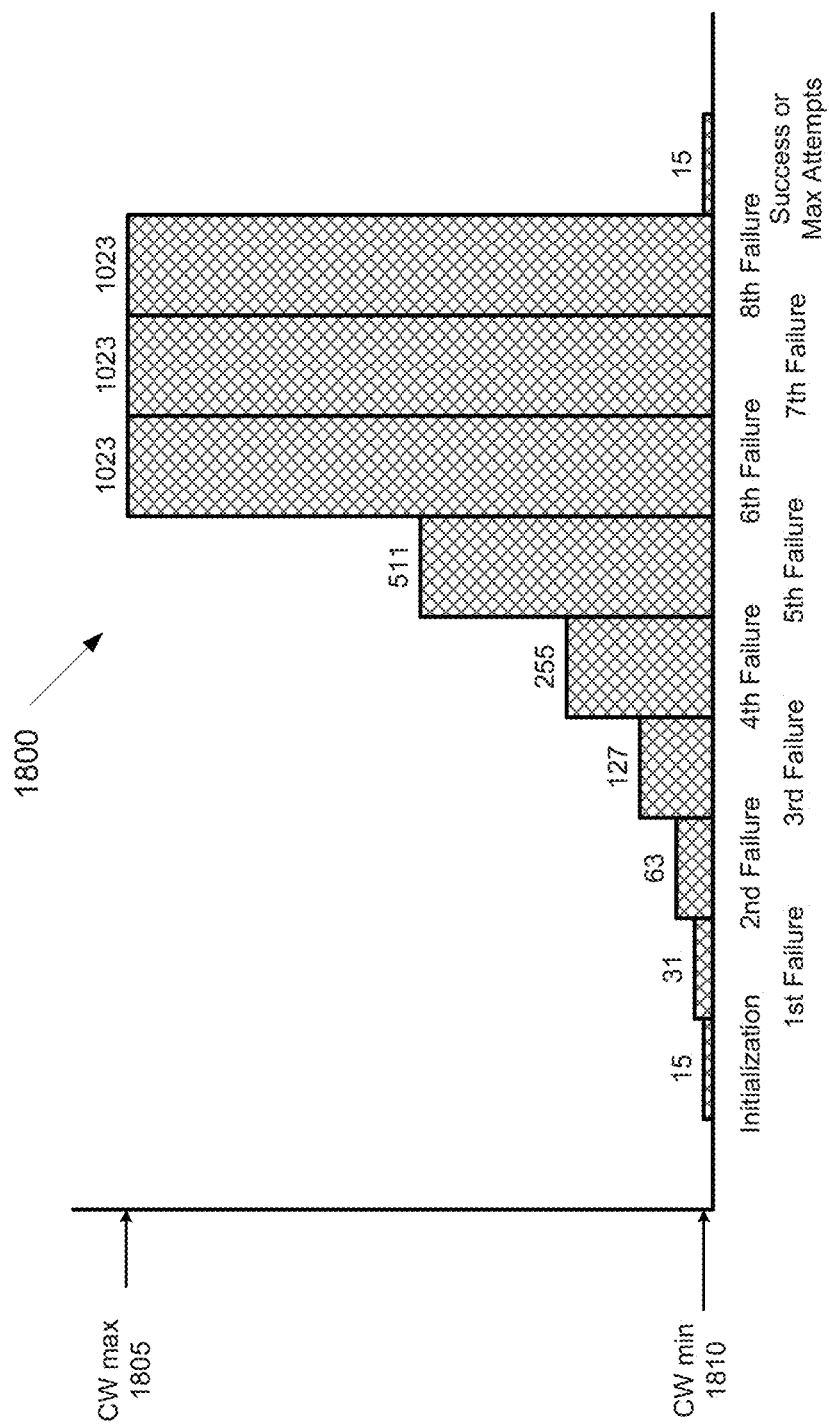
FIG. 18 illustrates an example exponential backoff scheme on contention window adaptation according to embodiments of the present disclosure.

FIG. 18 illustrates an example exponential backoff scheme 1800 on contention window adaptation according to embodiments of the present disclosure. An embodiment of the exponential backoff scheme 1800 shown in FIG. 18 is for illustration only. Other embodiments may be used without departing from the scope of the present disclosure. As shown in FIG. 18, the exponential backoff scheme 1800 comprises a CW max 1805 and a CW min 1810.

One the contention window adaptation scheme is exponential backoff. In this backoff scheme, contention window size initializes with a predefined minimum value CW min and increases exponentially with a successive transmission failures. After reaching the predefined maximum value CW max, contention window size remains the same for the following transmission failures. Contention window resets to the minimum value whenever the transmission is successful, or retransmission reaches a maximum attempt. This exponential adjustment scheme is illustrated in FIG. 18.

Figure 19:
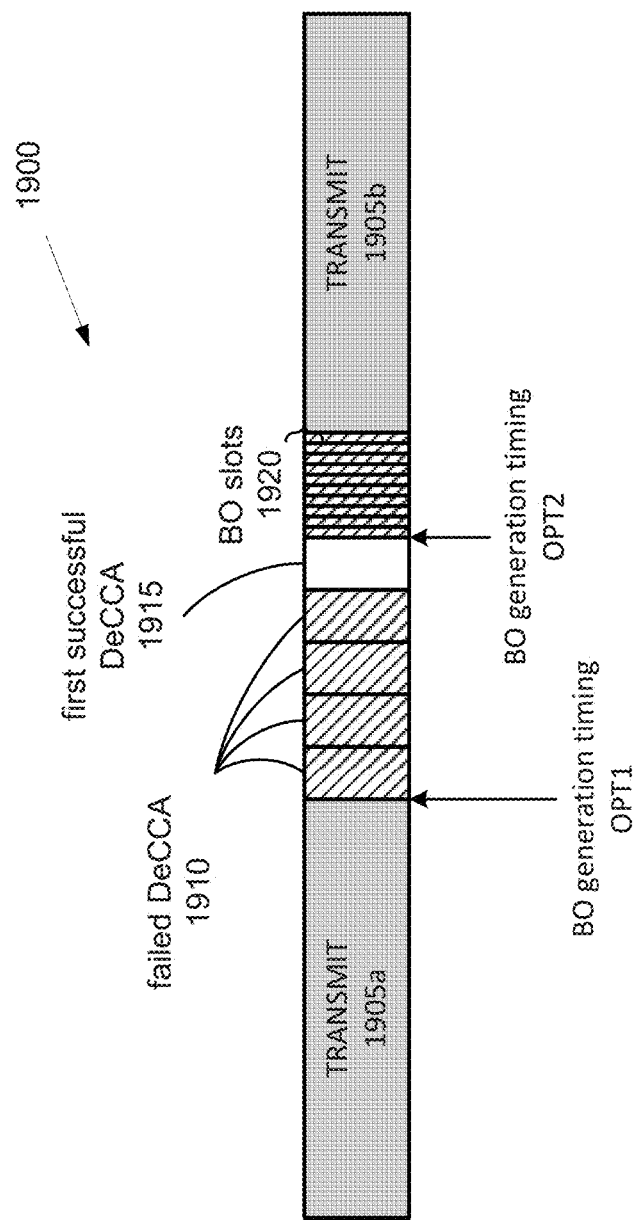
FIG. 19 illustrates example options for backoff counter generation timing according to embodiments of the present disclosure.

FIG. 19 illustrates example options for backoff counter generation timing 1900 according to embodiments of the present disclosure. An embodiment of the options for backoff counter generation timing 1900 shown in FIG. 19 is for illustration only. Other embodiments may be used without departing from the scope of the present disclosure. As shown in FIG. 19, the backoff counter generation 1900 comprises a plurality of transmit 1905a and 1905b, a failed DeCCA 1910, a first successful DeCCA 1915, and a BO (backoff) slots 1920.

In some embodiments, a backoff counter is generated based on CW size at the beginning of each eCCA stage (OPT1 in FIG. 19). In some embodiments, considering the 4 ms latency of ACK/NACK/DTX reports, a random backoff counter can be generated a later time so that more HARQ-ACK reports can be considered for CW size adaptation. For instance, the generation of backoff counter can be at the end of first successful DeCCA 1915 (OPT2 in FIG. 19).

Generating backoff counter at the beginning of eCCA (OPT1 in FIG. 19) may not utilize the latest available HARQ-ACK report for CW size adaptation, but may include the latest available HARQ-ACK report at the end of first successful DeCCA 1915 (OPT2 in FIG. 19). For instance, if the eNB has experienced a large number of successive failed DeCCA, the delay time may exceed 4 ms (i.e. the delay of receiving ACK/NACK/DTX reports), then, the eNB can utilize the ACK/NACK/DTX reports from the previous burst to adjust contention window size and generate backoff counter.

Figure 20:
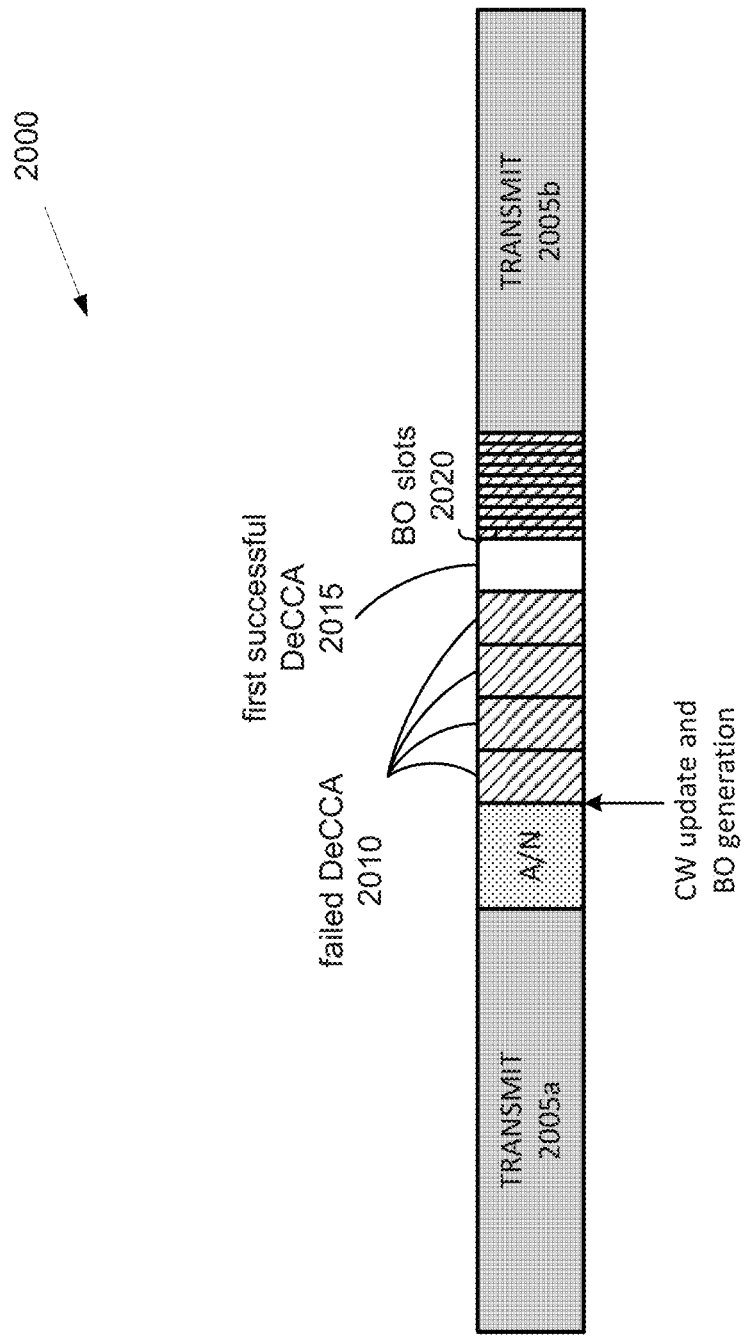
FIG. 20 illustrates an example contention window size update timing for WiFi according to embodiments of the present disclosure.

FIG. 20 illustrates an example contention window size update timing 2000 for WiFi according to embodiments of the present disclosure. An embodiment of the contention window size update timing 2000 shown in FIG. 20 is for illustration only. Other embodiments may be used without departing from the scope of the present disclosure. As shown in FIG. 20, the contention window size update timing 2000 comprises a plurality of transmit 2005a and 2005b, a failed DeCCA 2010, a first successful DeCCA 2015, and a BO (backoff) slots 2020.

In WiFi LBT scheme, a contention window size update instant is right after receiving ACK/NACK report from served target UE (e.g., the same as backoff generation timing). As shown in FIG. 20, at the end of TXOP, the access point (AP) terminates transmission and waits for ACK/NACK report (A/N) from corresponding served UE. After acquiring the request from the AP, the served UE completes receiving and decodes with respect to the TXOP. An ACK/NACK report is sent back to the AP after a short delay (e.g. a SIFS time). On the instant of receiving the ACK/NACK report, if the AP needs another transmission, the AP updates the AP's contention window size and generates the next backoff counter. If this TXOP transmission is successful (e.g. receive an ACK), a contention window is reset to a minimum value; if this TXOP transmission is unsuccessful (e.g. does not receive an ACK), the contention window is doubled (if not achieving the maximum value) and retransmission is scheduled. In this way, the contention window is always updated before the generation of the next applicable backoff counter, such that the backoff counter can reflect the channel condition in time.

However, this LBT contention window size update scheme may not be directly utilized for LTE system, because the later communication system has much larger ACK/NACK/DTX report delay. The delay of current LTE system can be comparable to the transmission period (e.g. 4 ms), such that starting new contention or transferring to IDLE until the receipt of all ACK/NACK/DTX report is inefficient and unnecessary. In this sense, for LAA LBT scheme, the adjustment of contention window size, and even the generation of new backoff counter, can happen before acquiring the ACK/NACK/DTX reports.

Figure 21:
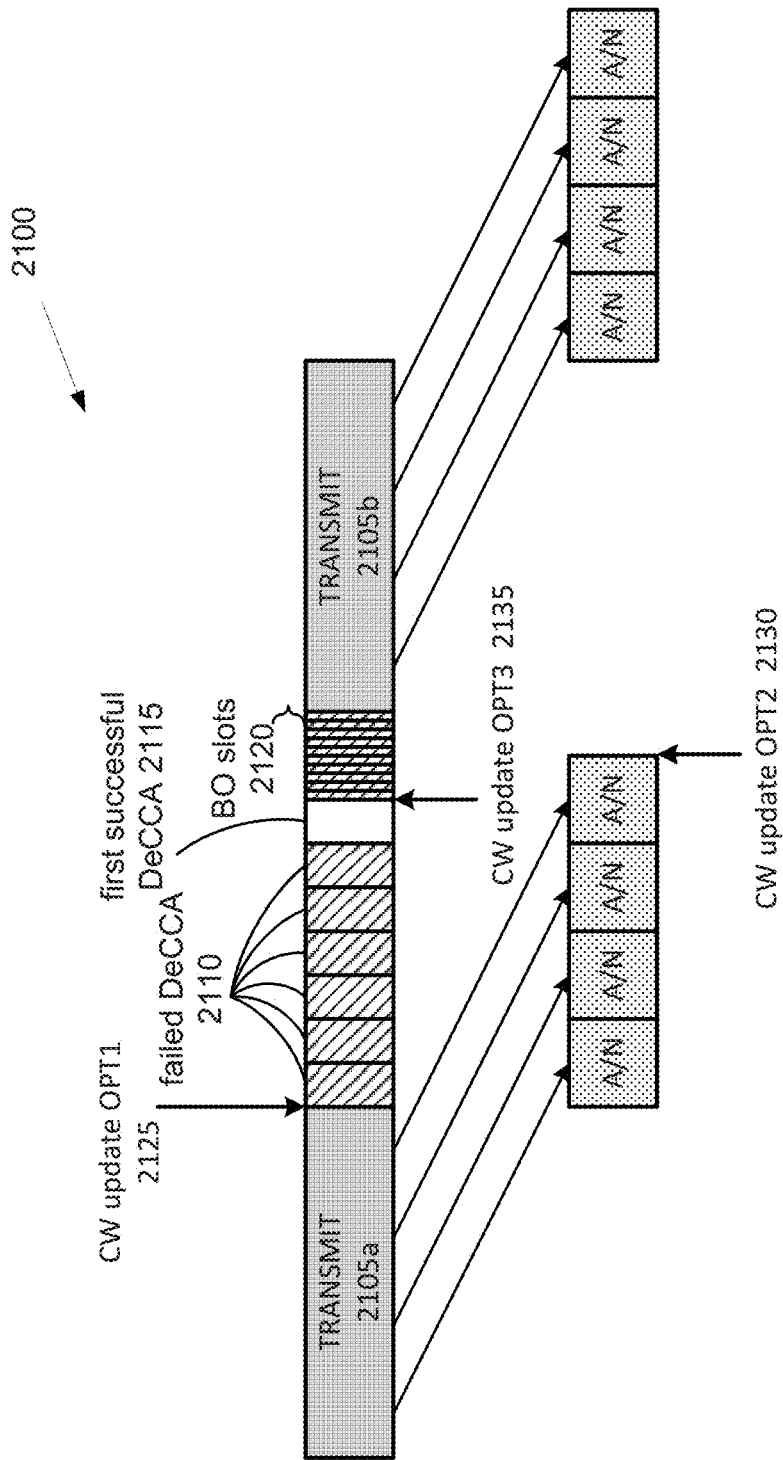
FIG. 21 illustrates example options for contention window size update timing for LAA according to embodiments of the present disclosure.

FIG. 21 illustrates example options for contention window size update timing 2100 for LAA according to embodiments of the present disclosure. An embodiment of the options for contention window size update timing 2100 shown in FIG. 21 is for illustration only. Other embodiments may be used without departing from the scope of the present disclosure. As shown in FIG. 21, the options for contention window size update timing 2100 comprises a plurality of transmit 2105a and 2105b, a failed DeCCA 2110, a first successful DeCCA 2115, and a BO (backoff) slots 2120, a CW update OPT1 2125, a CW update OPT2 2130, and a CW update OPT3 2135.

In some embodiments of CW update OPT 1 (e.g., update at the end of transmission burst), the transport block decoding results (ACK/NACK/DTX reports) for the transmission burst may not have been received from served UE(s) yet. In this case, the eNB can update the eNB's contention window size using previous ACK/NACK/DTX reports that are available (e.g., CW update OPT1 2125). Sometimes, previous ACK/NACK/DTX reports may not be available, e.g. the transmission burst is the first transmission burst. Based on these different transmission scenarios at the end of transmission burst, the contention window update schemes. In one example, at the end of transmission burst, if there are remaining data in the buffer to be transmitted as initial transmission of a HARQ process, or if the next transmission burst includes initial transmission(s), the eNB can keep contending the channel to start a new transmission. In this example, the contention window size can be increased (e.g. exponentially) if previous ACK/NACK/DTX reports indicate a transmission and decoding failure. In another example, the contention window size can be reset to the minimum value if previous ACK/NACK/DTX reports indicate a successful transmission and decoding. In yet another example, the contention window size can remain the existing value if no previous ACK/NACK/DTX information is available.

In some embodiments of CW update OPT2 (e.g., update at the receipt of ACK/NACK/DTX reports), for WiFi case, the AP can always wait for the ACK/NACK report before initializing the next transmission. In this sense, at the receipt of ACK/NACK reports, the AP has not generated a new backoff counter for next transmission yet (even has not started sensing the channel yet), and the ACK/NACK reports are always in time to be utilized to adjust the contention window. However, for LAA case, the delay of receiving ACK/NACK/DTX reports is much longer, and the eNB may not wait for the HARQ-ACK reports to start contending for the next transmission. Hence, at the receipt of ACK/NACK/DTX reports, the eNB can be within any state, either IDLE, or CONTEND, or TRANSMIT (e.g., CW update OPT2 2130 in FIG. 21). However, the principle of contention window size adjustment can be consistent for different eNB's states. In one example, the contention window size can be increased (e.g. exponentially) if previous ACK/NACK/DTX reports indicate a transmission and decoding failure. In another example, the contention window size can be reset to the minimum value if previous ACK/NACK/DTX reports indicate a successful transmission/decoding. Note that in this case, ACK/NACK/DTX reports are always available, so the situation of maintaining the contention window in the CW update OPT1 2125 does not apply here.

In some embodiments of CW update OPT3 (e.g., update at the end of first successful DeCCA) that is the same as the operation of generating backoff counter aforementioned, the end of first successful DeCCA can be considered as the last time instant to generate the backoff counter with respect to a transmission burst. For the same reason, this can also be the last time instant to update the contention window size. Delay the update of contention window size to the last instant is beneficial for including the impact from latest available ACK/NACK/DTX reports, so as to reduce the influence from the receiving delay (see OPT3 in FIG. 7). Similar to the CW update OPT1 2125, at this time instant, the eNB can update the eNB's contention window size using previous ACK/NACK/DTX reports that are available (sometimes, previous ACK/NACK/DTX reports may not be available). The contention window size can be increased (e.g. exponentially) if previous ACK/NACK/DTX reports indicate a transmission and decoding failure. In one example, the contention window size can be reset to the minimum value if previous ACK/NACK/DTX reports indicate a successful transmission and decoding. In yet another example, the contention window size can remain the existing value if no previous ACK/NACK/DTX information is available.

Regarding the timing relationship among these three options, the CW update OPT2 2130 and the CW update OPT3 2135 are both later than the CW update OPT1 2125, but there is no deterministic relation between the CW update OPT2 2130 and the CW update OPT3 2135. In one example, if the channel is contended by multiple nodes, the first successful DeCCA may happen later than the receipt of ACK/NACK/DTX reports. In another example, if only one eNB is trying to occupy the channel, the first successful DeCCA may happen very soon after the previous transmission burst, such that the first successful DeCCA is earlier than the receipt of ACK/NACK/DTX reports.

In the CW update OPT1 2125, the eNB may not rely on the ACK/NACK/DTX reports from current transmission burst to update the contention window size, but only utilize the ones in the previous burst. In the CW update OPT2 2125, the delay of waiting for ACK/NACK/DTX reports may exceed the entire counting down process such that the adjusted contention window size may only be utilized for the next transmission. To this end, the CW update OPT3 2135 is more preferable to make a tradeoff between these two extreme schemes and to utilize the up-to-date reports in time.

Figure 22:
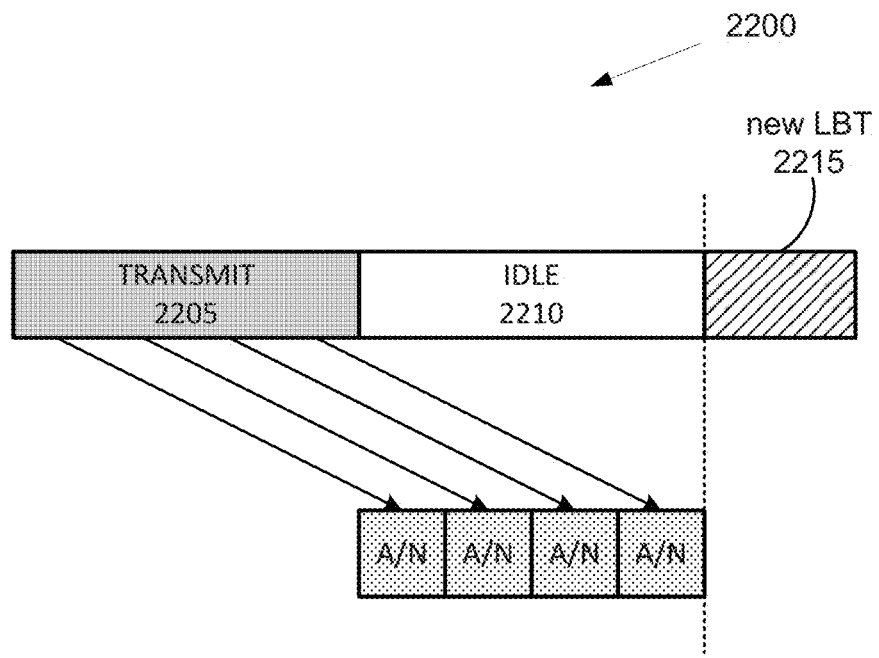
FIG. 22 illustrates an example option for operations after transmission of last bit of a file according to embodiments of the present disclosure.

FIG. 22 illustrates an example option for operations after transmission of last bit of a file 2200 according to embodiments of the present disclosure. An embodiment of the option for operations after transmission of last bit of a file 2200 shown in FIG. 22 is for illustration only. Other embodiments may be used without departing from the scope of the present disclosure. As shown in FIG. 22, the option for operations after transmission of last bit of a file 2200 comprises a transmit 2205, an IDLE 2210, and a new LBT 2215.

In LTE system, due to HARQ mechanism, after transmission of the last transport block, the LTE system still needs 4 ms to wait for the decoding result from serving UE(s). Two options for the eNB's operation and the maintenance of contention window size are considered. In one embodiment of assuming transmission is successful, assuming the current transmission is successful, corresponding state transfer is performed and contention window size is adjusted as shown in FIG. 22.

For instance, the eNB can reset the eNB's contention window size and transfer to IDLE 2210. Then, at the receipt of all decoding reports with respect to this transmission burst, if the remaining data in the burst are not transmitted successfully, retransmission is considered as a new transmission (e.g., a new LBT procedure with iCCA is performed (contention window size is already reset to the minimum value)). If all the remaining data in the burst are transmitted successfully, no further operation is needed.

In one embodiment, if a retransmission is needed, the contention window size can resume the previously used value. In another embodiment, the contention window size can be increased compared to the previous used value (e.g. doubled) due to the failed transmission. In the aforementioned embodiments, the new LBT procedure is eCCA.

Figure 23:
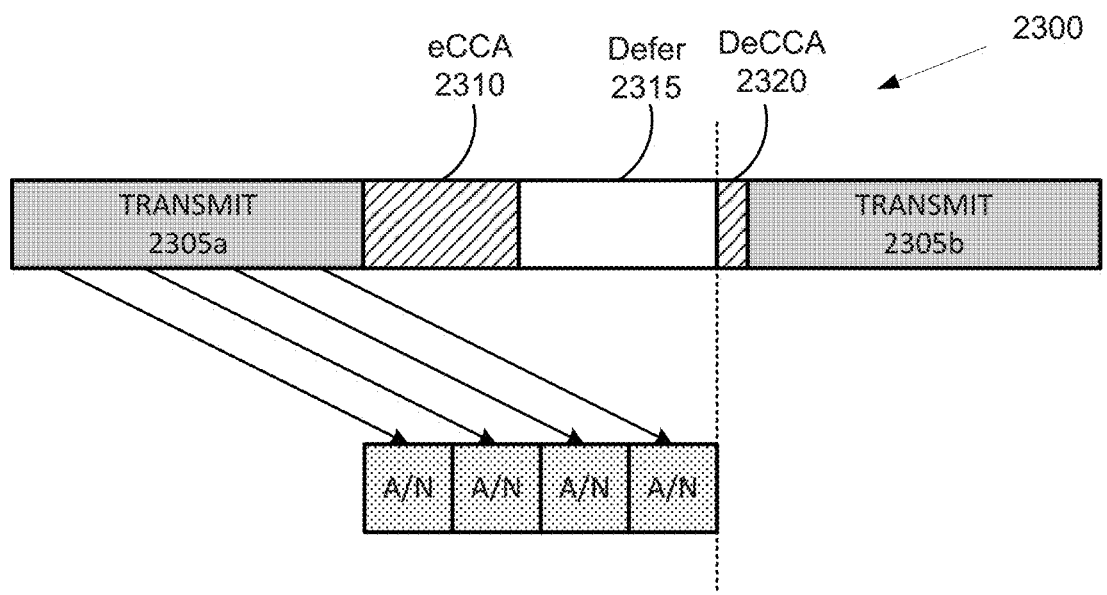
FIG. 23 illustrates another example option for operations after transmission of last bit of a file according to embodiments of the present disclosure.

FIG. 23 illustrates example another option for operations after transmission of last bit of a file 2300 according to embodiments of the present disclosure. An embodiment of another option for operations after transmission of last bit of a file 2300 shown in FIG. 23 is for illustration only. Other embodiments may be used without departing from the scope of the present disclosure. As shown in FIG. 23, the option for operations after transmission of last bit of a file 2300 comprises a plurality of transmit 2305a and 2305b, an eCCA 2310, a defer 2315, and a DeCCA 2320.

In some embodiments of assume transmission is failed. In such embodiments, it is assumed that the current transmission is failed. The eNB can remain in CONTEND state and prepare for retransmission (the worst case assumption) as shown in FIG. 23. In one embodiment, the contention window size is increased (e.g. exponentially) and eCCA procedure is performed to try to capture the channel again. In another embodiment, the contention window size can remain the same and unchanged as that used to the last channel access. However, the retransmission may not start when the backoff counter decreases to zero, e.g. when the ACK/NACK/DTX reports are not yet received by the eNodeB. There are two cases with respect to the occurrence order of these two events.

If the countdown completes earlier than the receipt of ACK/NACK/DTX reports, the eNB cannot start transmission when backoff counter decreases to zero, but can defer this transmission opportunity until the receipt of ACK/NACK/DTX reports. If a retransmission is indeed needed, the eNB can perform channel sensing for an extended CCA defer time (e.g., DeCCA 2320) and start transmission if eCCA defer time is idle. If no retransmission is needed, the eNB can clear the buffer and transfer to IDLE state.

If the receipt of ACK/NACK/DTX reports happens earlier than the countdown process, the eNB cannot start retransmission immediately if the ACK/NACK/DTX reports indicate a failed transmission. The eNB may wait until backoff counter decreases to zero. If no retransmission is needed, the eNB can clear the buffer and terminate the backoff process immediately.

Figure 24:
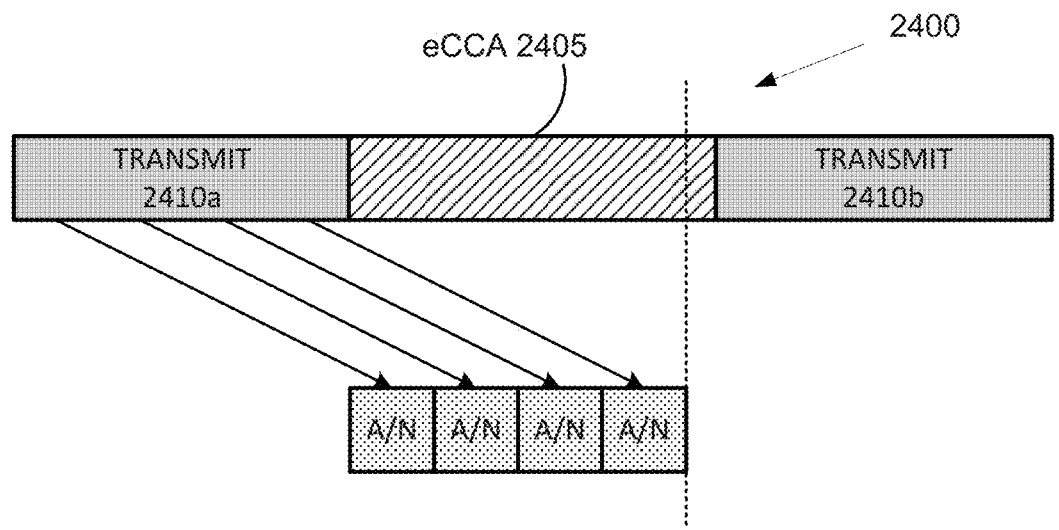
FIG. 24 illustrates yet another example option for operations after transmission of last bit of a file according to embodiments of the present disclosure.

FIG. 24 illustrates an example yet another option for operations after transmission of last bit of a file 2400 according to embodiments of the present disclosure. An embodiment of yet another option for operations after transmission of last bit of a file 2400 shown in FIG. 24 is for illustration only. Other embodiments may be used without departing from the scope of the present disclosure. As shown in FIG. 24, the option for operations after transmission of last bit of a file 2400 comprises a plurality of transmits 2410a and 2410b, and eCCA 2405.

In general, the waiting time for ACK/NACK/DTX report (e.g. 4 ms) is much longer than backoff duration (e.g. tens to hundreds μs), if the channel is not contended by too many nodes. Hence, the countdown typically completes earlier than the receipt of ACK/NACK/DTX reports.

In the aforementioned embodiments, the last bit transmission for a file can capture the changing of contention window size in time before the retransmission is started. For instance, on the receipt of ACK/NACK/DTX report, an eNB adopting the aforementioned embodiments that has already started the backoff process by assuming the worst case of retransmission, such that the retransmission can start much earlier than other embodiments. However, there may be a waste of performing CCA is no retransmission is needed. Based on this observation, the hybrid scheme of choosing proper alternatives is more adaptive in practice. The choice between two options depends on the anticipation of a transmission failure report, and this anticipation can either come from previous ACK/NACK/DTX report, or most recent channel state information (CSI) report.

WiFi LBT scheme updates contention window based on the ACK/NACK reports of current TXOP. Basically, a single decoding error triggers the contention window increase. However, this simple trigger condition cannot be directly utilized for LAA system. There are two issues. In first issue, LTE system is capable of serving multiple UEs in the same subframe, such that eNB may get multiple ACK/NACK/DTX reports from different served UEs at the same time. In second issue, in LAA system, ACK/NACK/DTX reports are generated for every subframe, such that the update condition may rely on a sequence of ACK/NACK/DTX reports.

In some embodiments, different contention window update conditions are considered. The decision that whether a transmission burst is successful depends on a sequence of previous ACK/NACK/DTX reports. The choice of target ACK/NACK/DTX reports for a contention window adaptation can be determined from three alternative schemes. In one example, predefined or configured number of previous (available) ACK/NACK/DTX reports is performed. In another example, predefined or configured time duration of previous (available) ACK/NACK/DTX reports is performed. In yet another example, all available ACK/NACK/DTX reports between two neighboring contention window update instants are performed.

Figure 25:
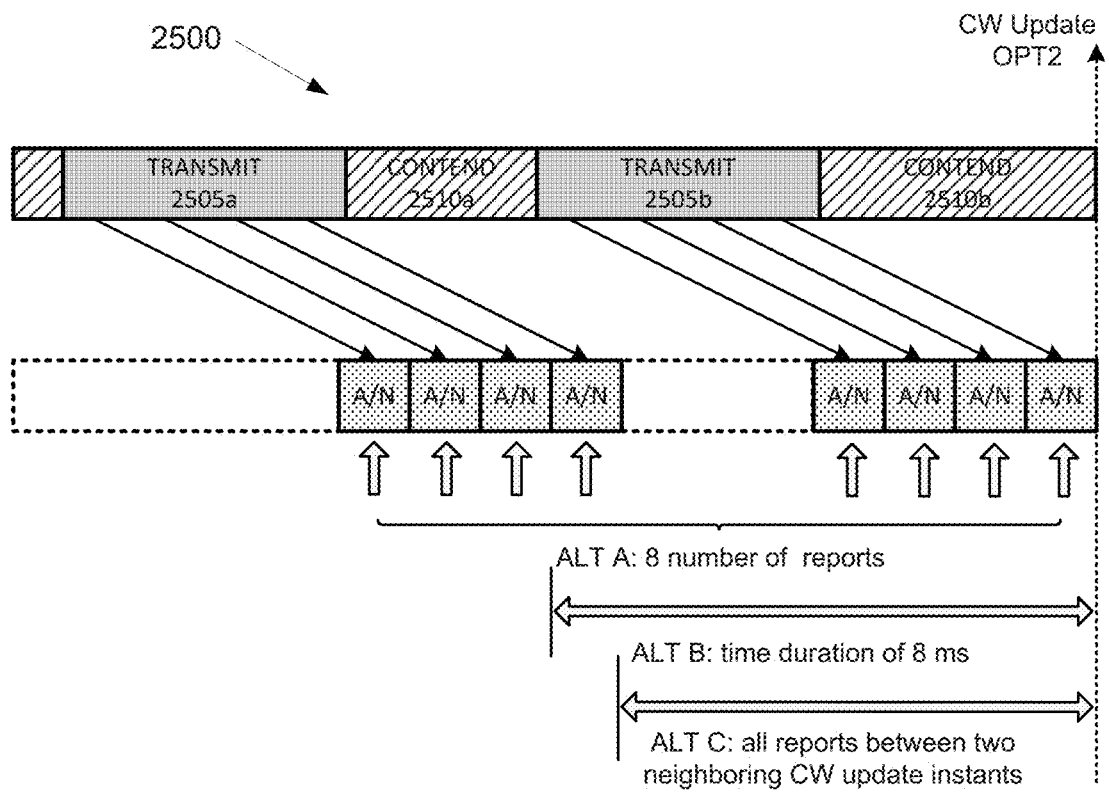
FIG. 25 illustrates example alternatives for choices of target acknowledgement/negative acknowledgement/discontinuous transmission (ACK/NACK/DTX) reports to generate an update trigger according to embodiments of the present disclosure.

FIG. 25 illustrates example alternatives for choices of target acknowledgement/negative acknowledgement/discontinuous transmission (ACK/NACK/DTX) reports 2500 to generate an update trigger according to embodiments of the present disclosure. An embodiment of the alternatives for choices of target ACK/NACK/DTX reports 2500 shown in FIG. 2500 is for illustration only. Other embodiments may be used without departing from the scope of the present disclosure. As shown in FIG. 25, the alternatives for choices of target (ACK/NACK/DTX) reports 2500 comprise a plurality of transmits 2505a and 2505b, and a plurality of CONTENDs 2510a, 2510b.

In general, the aforementioned examples differ from each other, but may produce the same outcome under a certain condition. For example, consider a contention window update at the receipt of ACK/NACK/DTX reports as shown in FIG. 25. ALT A chooses 8 previous (available) ACK/NACK/DTX reports, ALT B chooses all available ACK/NACK/DTX reports within the previous 8 ms (only 5 reports in this case) and ALT C chooses all available ACK/NACK/DTX reports between two neighboring contention window update instants (4 reports in this case). In another example, if we consider 4 reports for ALT A and 4 ms time duration for ALT B at this particular contention window update timing as shown in FIG. 25, these three alternatives produce (e.g., ALT A, ALT B, ALT C) the same outcome. In addition, all alternatives can be configured to include ACK/NACK/DTX reports from one or more transmission bursts.

Figure 26:
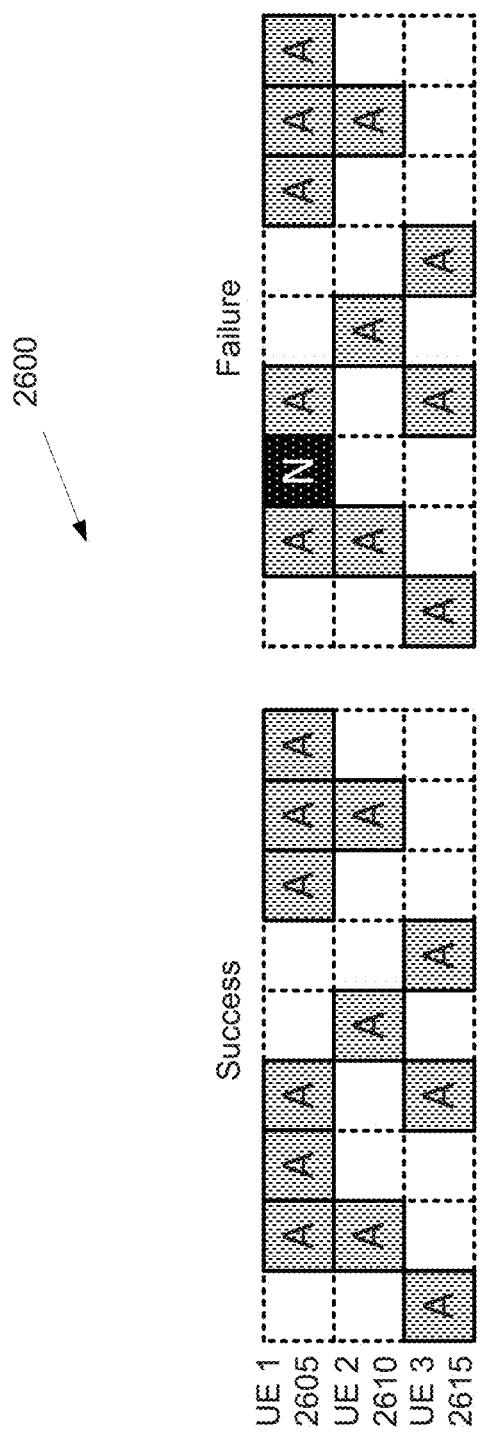
FIG. 26 illustrates an example single NACK/DTX trigger for contention window increase according to embodiments of the present disclosure.

FIG. 26 illustrates an example single NACK/DTX trigger 2600 for contention window increase according to embodiments of the present disclosure. An embodiment of the single NACK/DTX trigger 2600 shown in FIG. 26 is for illustration only. Other embodiments may be used without departing from the scope of the present disclosure. As shown in FIG. 26, the single NACK/DTX trigger 2600 comprises a plurality of UEs 2605, 2610, 2615.

In some embodiments of a single NACK/DTX trigger (e.g. this is one of the most conservative schemes for determining the trigger), within all target ACK/NACK/DTX reports for determining the contention window increase trigger, a single NACK/DTX report can lead to a failed transmission and contention window can be increased (e.g. doubled), regardless of the number of ACK reports received as shown FIG. 26. In other words, only the receipt of all ACK reports may lead to a successful transmission. If denote the number of ACK and NACK/DTX reports as # ACK and # NACK, respectively, then the trigger for contention window increase can be described as # NACK>0.

Figure 27:
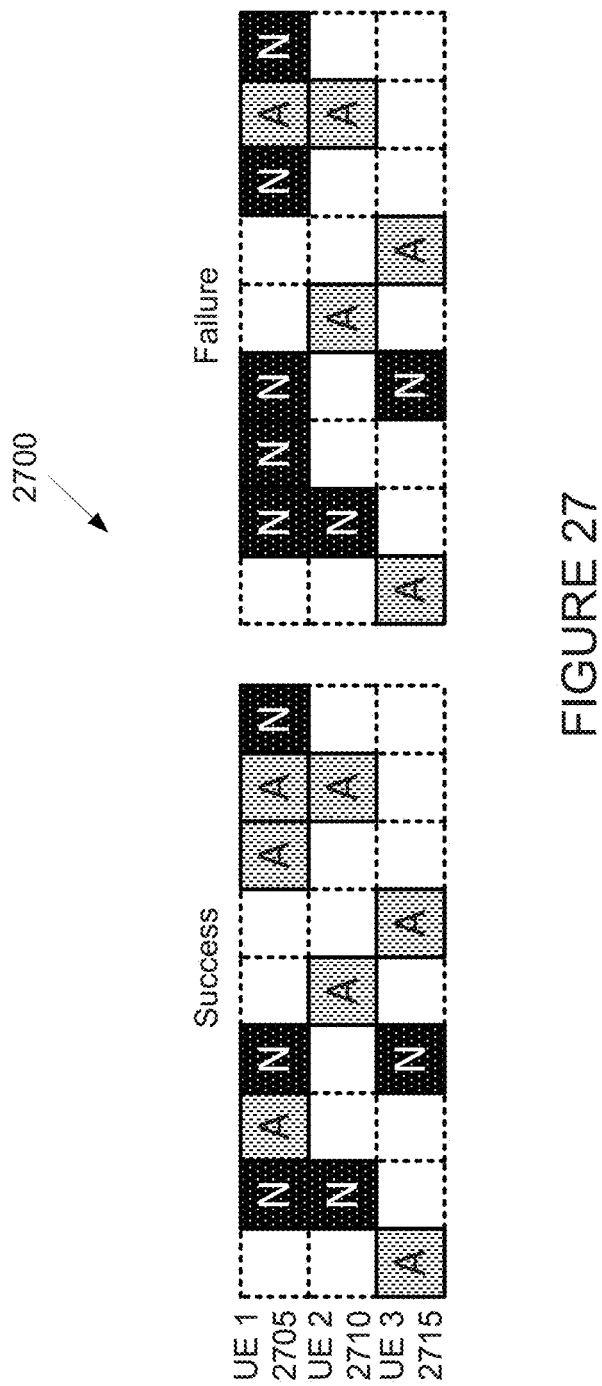
FIG. 27 illustrates an example majority NACK trigger for contention window increase according to embodiments of the present disclosure.

FIG. 27 illustrates an example majority NACK trigger 2700 for contention window increase according to embodiments of the present disclosure. An embodiment of the majority NACK trigger 2700 shown in FIG. 27 is for illustration only. Other embodiments may be used without departing from the scope of the present disclosure. As shown in FIG. 27, the majority NACK trigger 2700 comprises a plurality of UEs 2705, 2710, 2715.

In some embodiments of majority NACK/DTX trigger, when the number of NACKs/DTXs exceeds the number of ACKs, a contention window increase (e.g. double) can be triggered, i.e., # NACK># ACK as shown in FIG. 27.

Figure 28:
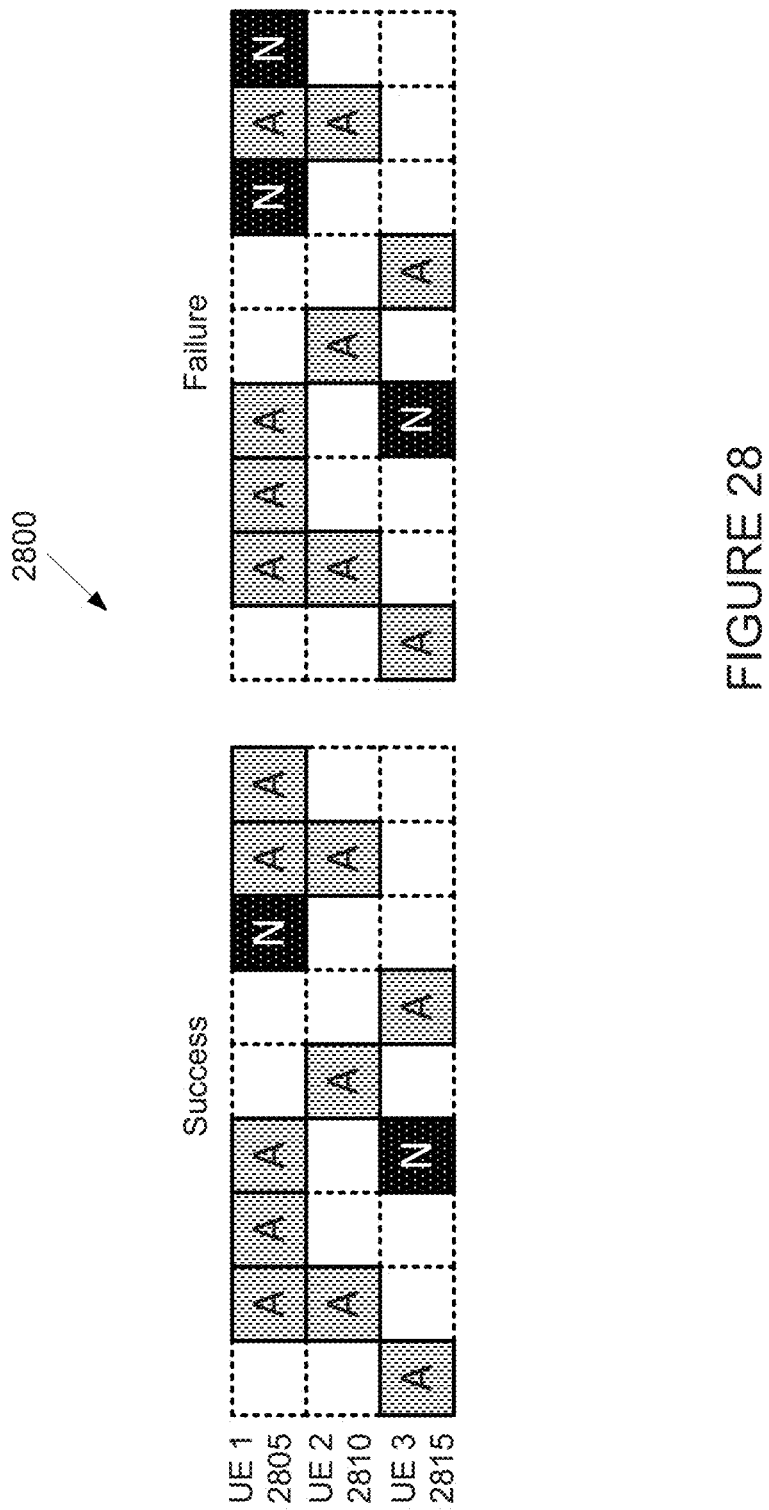
FIG. 28 illustrates an example thresholding trigger for contention window increase (θ=0.2) according to embodiments of the present disclosure.

FIG. 28 illustrates an example thresholding trigger 2800 for contention window increase ($\theta$=0.2) according to embodiments of the present disclosure. An embodiment of the thresholding trigger 2800 shown in FIG. 28 is for illustration only. Other embodiments may be used without departing from the scope of the present disclosure. As shown in FIG. 28, the thresholding trigger 2800 comprises a plurality of UEs 2805, 2810, 2815.

In some embodiments of thresholding trigger, basically, a predefined threshold is chosen, and the contention window size can be increased if the ratio of NACK/DTX over the total ACK/NACK/DTX exceeds the threshold. Denote the threshold as $\theta$, then this rule of determining an effective trigger for contention window increase can be given by # NACK/(# NACK+# ACK)>$\theta$ as shown in FIG. 28.

In some embodiments of reference subframes trigger, within a transmission burst, different subframes may not have the same statistics with respect to the ACK/NACK/DTX distribution. Only part of the subfames may contribute more significantly to the decision on contention window increase trigger. In this sense, reference subframes are configured or predefined to represent all the ACK/NACK/DTX reports, and the decision from these reference subframes is adopted as the decision from all subframes. Receiving any single NACK/DTX report or predefined ratio of NACK/DTX reports corresponding to the reference subframes can cause a contention window increase.

Figure 29:
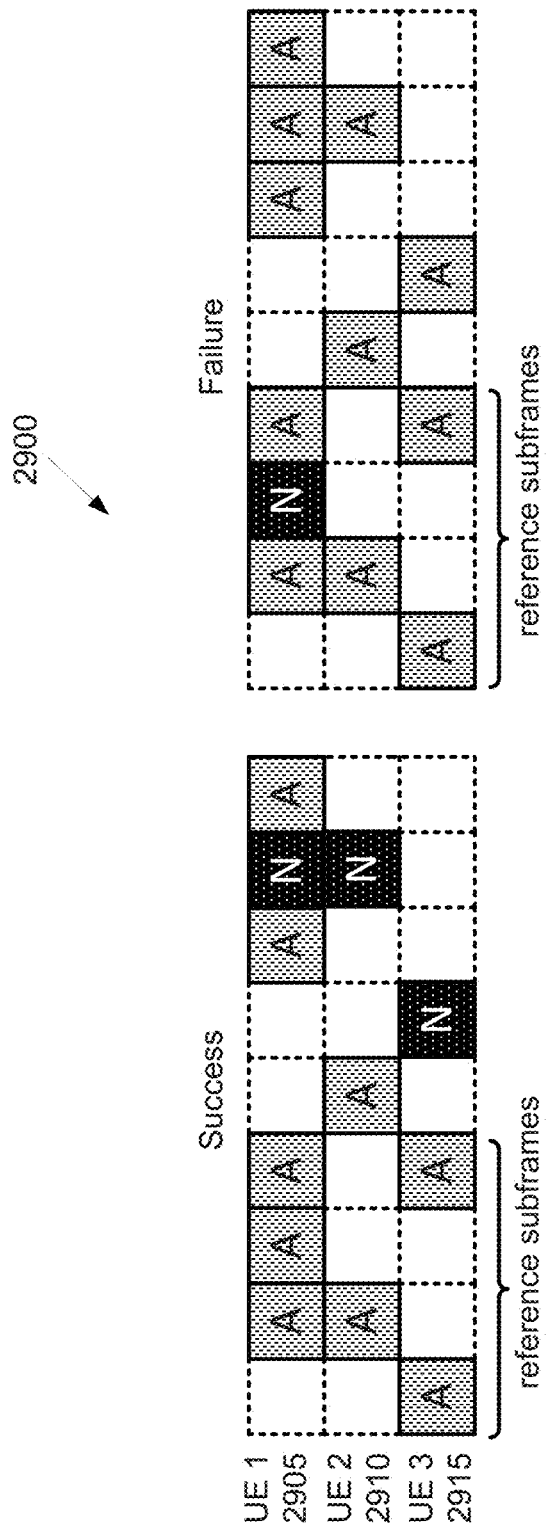
FIG. 29 illustrates an example reference subframes trigger for contention window increase according to embodiments of the present disclosure.

FIG. 29 illustrates an example reference subframes trigger 2900 for contention window increase according to embodiments of the present disclosure. An embodiment of the reference subframes trigger 2900 shown in FIG. 29 is for illustration only. Other embodiments may be used without departing from the scope of the present disclosure. As shown in FIG. 29, the reference subframes trigger 2900 comprises a plurality of UEs 2905, 2910, 2915.

The most significant benefit from this trigger scheme is to save delay time for waiting further ACK/NACK reports. For instance, as shown in FIG. 29, if the first subframe or the first multiple subframes are configured or predefined as reference, then eNB does not need to wait until acquiring the ACK/NACK/DTX reports from all subframes, and can perform contention window update earlier. For another instance, the latest subframe or the latest multiple subframes may also be considered as reference. The number of reference subframes can be a function of the transmission burst length or the maximum channel occupancy time. For example, if the transmission burst duration is 4 ms, the reference subframe can be the first subframe of the burst; whereas if the transmission burst duration is 10 ms, the reference subframes can include the first subframe to the fourth, or the fifth or the sixth subframes. The aforementioned embodiments can be generalized to include trigger based on ACK/NACK/DTX corresponding to a reference frequency domain resource or to a reference time and frequency resource.

Figure 30:
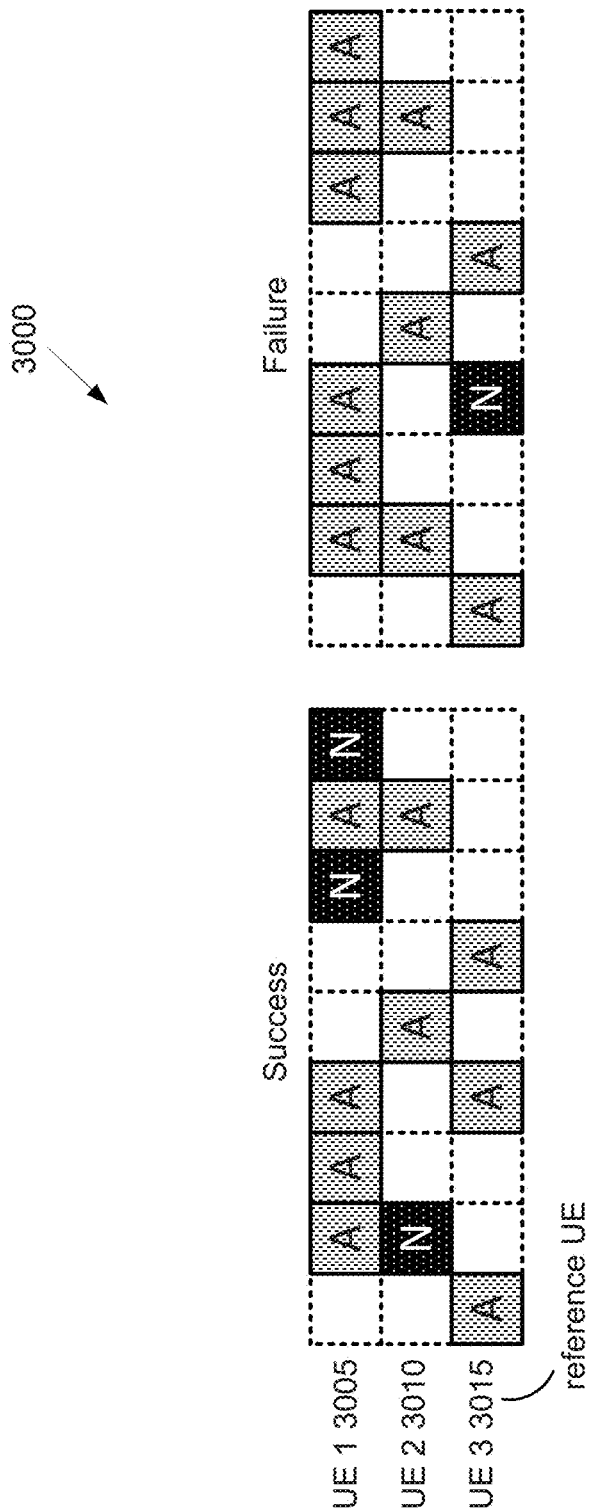
FIG. 30 illustrates an example reference UE trigger for contention window increase according to embodiments of the present disclosure.

FIG. 30 illustrates an example reference UE trigger 3000 for contention window increase according to embodiments of the present disclosure. An embodiment of the reference UE trigger 3000 shown in FIG. 30 is for illustration only. Other embodiments may be used without departing from the scope of the present disclosure. As shown in FIG. 30, the reference UE trigger 3000 comprises a plurality of UEs 3005, 3010, 3015.

In some embodiments of reference UE trigger, UE(s) scheduled with lowest modulation and coding scheme (MCS) or associated with the most recently CSI report(s) could be considered as a candidate of reference UEs. The utilization of reference UE can help to reduce the complexity of trigger condition. The eNB does not need to collect ACK/NACK/DTX reports from all UEs for contention window update, but only needs to collect the ones from reference UE(s). Then, receiving single NACK/DTX report or predefined ratio of NACK/DTX reports from reference UE(s) may indicate a transmission failure for the whole transmission burst, and the contention window can be increased (e.g. doubled) correspondingly, while NACK reports from other UEs do not contribute to the contention window update as shown in FIG. 30.

In some embodiments of weighted thresholding trigger, all previous schemes can be included into the scope of the weighted thresholding trigger scheme by carefully choosing the weights. For instance, a weight matrix W_ACK for ACKs and another weight matrix W_NACK for NACKs/DTXs are predefined to indicate the contribution of each ACK/NACK/DTX report on the final decision of contention window update. Weight matrices can also be defined for NACKs and DTXs separately. Matrix I_ACK is the indicator matrix of ACK (e.g. an element on $i^{th}$ row and $j^{th}$ column which equals to one indicates an ACK is received for $i^{th}$ UE in the $j^{th}$ subframe). Similarly, matrix I_NACK is the indicator matrix of NACK/DTX. Then, the ratio of weighted sum for NACK/DTX is compared with a predefined threshold θ to judge whether the contention window increase is triggered or not. More formally, the contention window increase trigger condition is given by equation (1):

$$\frac{\sum_{i,j} W_{NACK}^{i,j} \cdot I_{NACK}^{i,j}}{\sum_{i,j} W_{NACK}^{i,j} \cdot I_{NACK}^{i,j} + \sum_{i,j} W_{ACK}^{i,j} \cdot I_{ACK}^{i,j}} > \theta \quad \text{Equation (1)}$$

The weights here reflect the ACK and NACK/DTX's contribution from different subframes and different UEs to the ratio, and their particular implementation could cover all previous options. For instance, to address the role of reference subframes or UEs, corresponding weights can be set to large values and the weights on non-reference ones are minor; to address the role of single NACK/DTX trigger, the weights of NACK/DTX can be set much larger than the ones of ACK and the threshold is chosen to be small.

In some embodiments of QoS-specific trigger, HARQ-ACK reports considered to generate the contention window size update trigger can be chosen to correspond to a specific QoS, e.g. corresponding to the LBT engine concerned. For example, when there are multiple LBT engines, each for a particular QoS, and data of a higher QoS can be multiplexed with transmission of data with a lower QoS, the HARQ-ACK reports of data of the lower QoS can used to adjust the CW window size. Moreover, all the options described above can be generalized to consider the QoS aspect. For example, the reference subframe can be the first and last "valid" reference subframe, where "valid" reference subframe can be the one that is used to transmit data of appropriate QoS.

Note that the combinations of above options are not excluded from this proposal. For example, a combination of the aforementioned embodiments can give contention window update trigger based on reference UEs and reference subframes at the time.

Different contention window update timings may not fully eliminate the impact of the 4 ms delay of receiving ACK/NACK/DTX reports, since the ACK/NACK/DTX reports may not fully utilize the ACK/NACK/DTX information of the current burst. The up-to-date ACK/NACK/DTX reports may not be available when an eNB updates the eNB's contention window size. To resolve this problem, a backoff counter adjustment scheme is considered. For example, the increase and decrease of backoff counter value can be allowed to accelerate and decelerate the counting process. Note that the time granularity to update contention window size and backoff counter may not be the same. In general, contention window size can be increased (e.g. doubled) or reset every transmission burst to keep fair coexistence with WiFi. However, backoff counter update can be performed more frequently, e.g. for every ACK/NACK/DTX report received by eNB in the counting down process.

Figure 31:
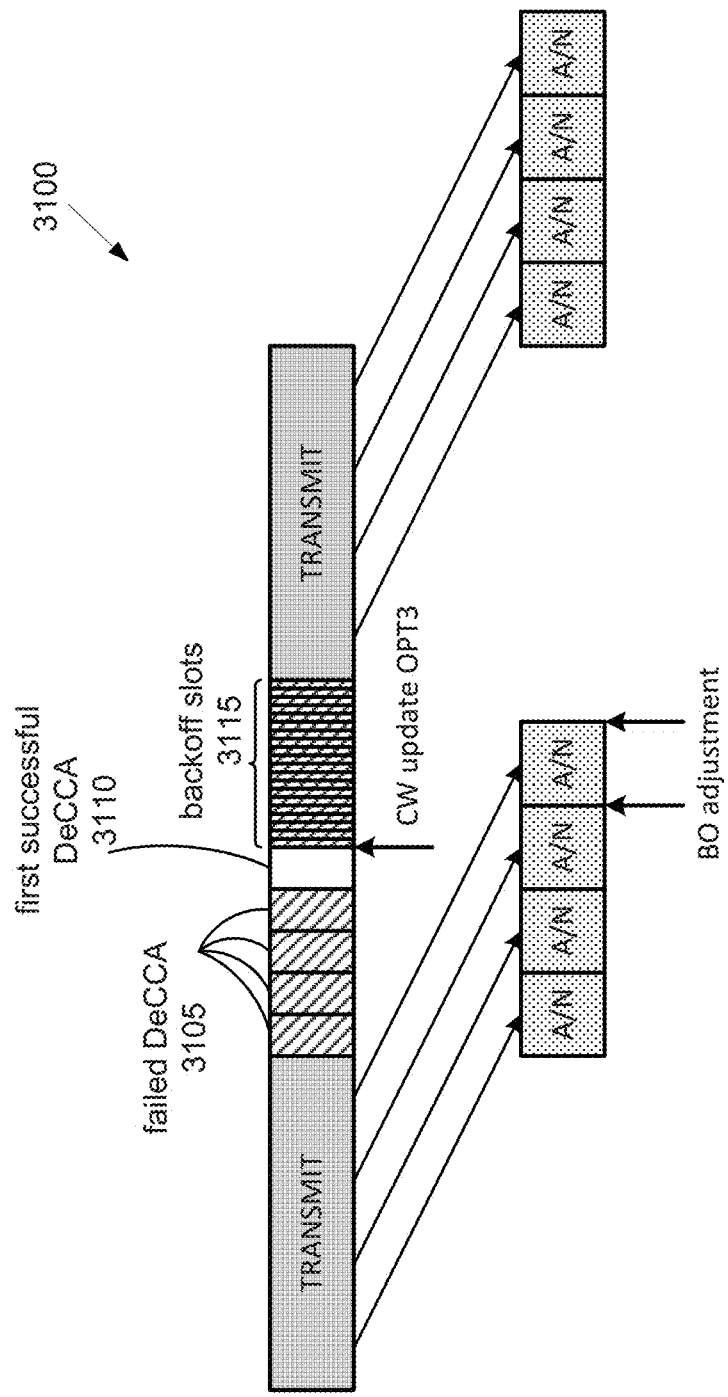
FIG. 31 illustrates an example backoff counter adjustment timing according to embodiments of the present disclosure.

FIG. 31 illustrates an example backoff counter adjustment timing 3100 according to embodiments of the present disclosure. An embodiment of the backoff counter adjustment timing 3100 shown in FIG. 31 is for illustration only. Other embodiments may be used without departing from the scope of the present disclosure. As shown in FIG. 31, the backoff counter adjustment timing 3100 comprises a failed DeCCA 3105, first successful DeCCA 3110, and a set of backoff slots 3115.

At the instant of receiving the ACK/NACK/DTX reports as shown in FIG. 31, if a eNB's backoff counter has already been generated and has not decreased to zero yet (i.e., in eCCA procedure), the eNB can update the eNB's backoff counter value based on the received ACK/NACK/DTX reports. Multiple acceleration and deceleration schemes can be adopted. For instance, if ACK/NACK/DTX reports indicate a successful transmission (e.g. all ACKs from serving UEs), backoff counter can be adjusted from the following alternatives.

In one embodiment, the backoff counter is linearly decreased by a predefined or configurable value until achieving a predefined minimum value. In another embodiment, the backoff counter is exponentially deceased (e.g. set to half of current value) until achieving a predefined minimum value. In yet another embodiment, the backoff timer is reset to a predefined minimum value (if current is larger than the minimum value). In yet another embodiment, the backoff timer is set to zero (e.g., transmission immediately started). Application of the aforementioned embodiments can be subject to additional condition(s) (e.g., the initial backoff counter value was greater than the predefined minimum value).

If ACK/NACK/DTX reports indicate a failed transmission (e.g. at least one NACK from serving UEs), the backoff counter can be adjusted from the following alternative choices. In one embodiment, the backoff counter is linearly increased by a predefined or configurable value until achieving a predefined maximum value. In another embodiment, the backoff counter i exponentially increased (e.g. double the current value) until achieving a predefined maximum value. In yet another embodiment, the backoff counter is set to the predefined maximum value. Reasonable choices for the predefined minimum value could be half of minimum contention window size (average value) or the entire minimum contention window size (worst case), and reasonable choices for the predefined maximum value could be half of current contention window size (average value) or the entire current contention window size (worst case).

Further rules could be considered when combining the aforementioned embodiments in order to guarantee fair coexistence with WiFi. For instance, for each transmission opportunity, a contention window size can be enlarged (e.g. doubled) at most once, and can be directly reset to minimum value is the previous transmission is successful. To this end, the increase of backoff counter could also be limited to once, and the decrease could be multiple to help accelerating the counting down process. All of acceleration and deceleration schemes aim to coordinate the backoff counter such that the backoff counter matches the contention window size in time.

In some embodiments, a contention window adaptation scheme with respect to multiple QoS and multiple UEs is considered. The key idea is to maintain a separate contention window adaptation and LBT procedure for each UE and each QoS.

As in WiFi's LBT protocol, different contention window sizes can be defined for LAA. Higher QoS has smaller contention window size, i.e., smaller predefined minimum and maximum contention window size. In this way, higher QoS takes smaller range to generate a relatively smaller backoff counter value, such that it is easier to win the competition and capture the channel. Then, in the LBT procedure, different QoS runs the different QoS's own counting down process. The one winning the LBT procedure may be transmitted on the target channel. Especially, it is allowed to transmit data with higher QoS multiplexed into the transmission of data with lower QoS, but do not allow the reversed operation. Note that the QoS based LBT and contention window adaptation helps to support uplink transmission by consider uplink grant with higher QoS comparing to regular downlink data.

LTE supports multiplexing multiple UEs data on different orthogonal resource blocks in one subframe. Hence, it is unfair for the UEs with better transmission opportunity (clear channel sensing) to share the same contention window size with the UEs with worse transmission opportunity. For instant, one of the serving UEs may be far from the center of the cell and easily be interfered (e.g., bad transmission opportunity), while all the other UEs may be quite close to the center. Then, if the distant UE is scheduled in the transmission, with higher chance the eNB may fail this transmission burst so as to increase the contention size. At this point, all nearby UEs all have a longer backoff time if scheduled in the next burst. To overcome this problem, a scheduling based LBT scheme with a separate contention window size for each UE or a group of the UEs is proposed. For example, the eNB can maintain a separate contention window size for every UE or a group of UEs (could be initialized equally), and the grouping rule can be based on similar QoS or similar channel condition. Then, two alternatives for contention window adaptation and LBT process are considered.

In one embodiment, although every UE or group of the UE has a separate contention window size, an eNB has only one backoff counter generated (e.g. only one LBT procedure). In one example, the eNB generates one contention window size from UEs' contention window sizes and use the contention window size to generate a backoff counter. For instance, the eNB's contention window size can be the maximum, mean, weighted mean (e.g. weights could reflect group size), or other function of all scheduled UEs' contention window sizes.

In another example, the eNB generates a backoff counter for each UE or group of UEs according to the UE's own contention window size. Then, the eNB generates a backoff counter from the UEs' backoff counters using particular rules, e.g. using the maximum, mean, weighted mean, or other function of the UEs' backoff counters.

After generating the backoff counter, an eNB follows an LBT procedure (CCA is over the whole bandwidth) until the backoff counter decreases to zero. On receiving the ACK/NACK/DTX reports, the eNB can adjust the contention window size separately for each UE or group of UEs.

In yet another example, the eNB can perform LBT procedures for each scheduled UE or group of UEs separately. In each of the LBT procedure, a separate backoff counter is generated from the UE's own contention window size, and a CCA procedure can be the UE or UE-group specific. For instance, the eNB can only sense the bandwidth scheduled to target UE or group of UEs and compare the received power to a predefined threshold (changeable with number of RBs) to judge whether the spectrum is clear or not. In this multiple LBT procedure, the eNB has multiple options to determine whether to start transmission or not.

In one example, the eNB can use self-defer to wait until all scheduled UEs complete counting down and start transmission for all scheduled UEs at the same time. For example, the scheduled UEs completes the countdown earlier, the eNB can delay their channel occupancy opportunity. After all scheduled UEs' or groups of UEs' counters decrease to zero, an extra DeCCA may be performed for all of them to make sure the target channel is still clear.

In another example, the eNB can start transmission immediately for the UE or group of UEs whose backoff counter decreases to zero, and suspend the LBT process for the UE or group of UEs whose backoff counter has not decreased to zero. After the transmission for the UE or group of UEs with backoff counter zero, the eNB may resume the suspended LBT for the UE or group of UEs with non-zero backoff counter. In such example, if the eNB is capable of transmitting to a UE or a group of UEs and sensing the channel for another UE or a group of UEs (e.g., these UEs are not in the same direction) at the same time, then the uncompleted LBT may not be suspended when starting the transmission for another UE or group of UEs. The eNB can maintain the LBT procedure for the UE or group of UEs with non-zero backoff counter, and start transmission when their backoff decreases to zero. After transmission, the eNB can update the contention window size independently for every scheduled UE or group of UEs, using the timing and condition described in the aforementioned embodiments.

The aforementioned embodiments can maintain separate contention window for scheduled UE or group of UEs, such that the LBT procedure is fair with respect to the UEs in different QoS or channel conditions. For example, collision situation for one UE doesn't need to affect the others if beamforming can be done to the others which avoid interference to the UEs suffering from collision.

HARQ ACK/NACK based contention window adjustment scheme is criticized for incapability of distinguishing decoding error from collision. In this instance, a random contention window size increase scheme is introduced to alleviate the impact of decoding error.

In WiFi LBT, when contention window size increase condition is satisfied (e.g. receiving a NACK), a contention window size is deterministic to be doubled. Here, a random increase scheme is introduced for LAA LBT. For example, when the contention window size increase condition is satisfied (e.g. the trigger in Embodiment V is satisfied), an eNB can increase (e.g. double) the eNB's contention window size according to a predefined or configurable probability (e.g. $p\_CW$). If a randomly drawn number is smaller than $p\_CW$, the eNB increases the eNB's contention window size; otherwise, the eNB maintains the current contention window size. In this sense, the contention window size may not be increased surely each time a trigger is satisfied, but based on a probability $p\_CW$, where $p\_CW$ reflects the pure impact from collision.

The contention window size increase probability $p\_CW$ can be predefined and fixed for particular eNB, or the contention window size can also be configurable based on certain metric. For example, an eNB may record the chance (e.g. probability $p\_NACK$) of receiving a NACK report when traffic is low (e.g. low collision opportunity), and use it as an estimate of the impact of decoding error in high traffic case. In this way, the contention window size increase probability can be simply chosen as $p\_Cw=1-p\_NACK$. More complicated schemes can be also utilized to determine the choice of contention window size increase probability, e.g. Bayesian interference and graphical model, where more statistics may be needed.

A UE can be configured with multiple LAA serving cells in carrier aggregation or dual connectivity. A UE capable of carrier aggregation or dual connectivity of multiple LAA carriers can receive and/or transmit on the multiple LAA carriers simultaneously. There is a need to define an LBT procedure to enable transmissions on multiple LAA carriers simultaneously.

In a first approach of multi-carrier LBT, there can be one LBT procedure performed for each possible combination of LAA carriers that can be configured for an LAA node. An LAA carrier can be associated with one or more of the LBT procedures. The channel sensing and CCA bandwidth for a LBT procedure for initial CCA and extended CCA is performed over the combined and aggregated bandwidth of the corresponding set of the LAA carriers. The multiple LBT procedures are performed in a parallel. When an LBT procedure is successfully completed (gain channel access or win channel contention), the LAA node performing the LBT procedure can transmit on the set of carriers associated with the LBT procedure. The concept of multiple LBT procedure for multi-carrier transmissions is illustrated in FIG. 32.

Figure 32:
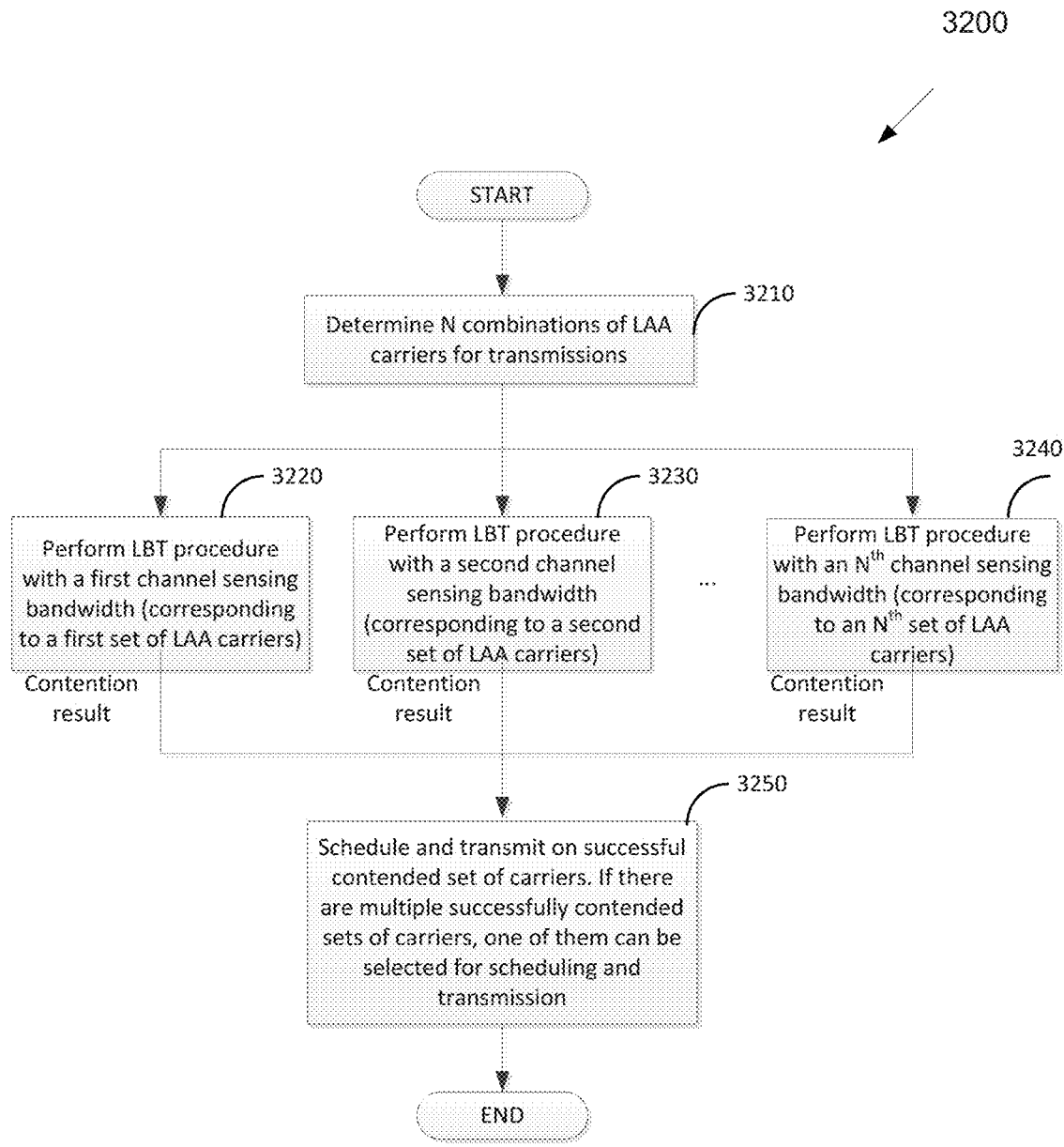
FIG. 32 illustrates an example LBT procedure for multi-carrier transmissions according to embodiments of the present disclosure.

FIG. 32 illustrates an example LBT procedure 3200 for multi-carrier transmissions according to embodiments of the present disclosure. An embodiment of the LBT procedure 3200 shown in FIG. 32 is for illustration only. Other embodiments may be used without departing from the scope of the present disclosure. For example, the LBT procedure may be performed by an LAA node, such as for example, the eNB 102 in FIG. 2.

The LBT procedure 3200 begins at step 3210. At step 3210, an LAA node determines the N sets of LAA carriers for transmissions (can include a set of 1 carrier only). For each set of the LAA carriers, the LAA node performs a separate LBT procedure at step 3220, 3230, and 3240, respectively. For example, if the LAA node can operate on carrier 1, carrier 2 and carrier 3, and any combination thereof, there can be a separate LBT procedure for each of carrier 1, carrier 2, carrier 3, carriers {1, 2}, carriers {1, 3}, carriers {2, 3} and carriers {1, 2, 3}. The number of possible combinations can be decreased for implementation and signal processing complexity reduction. In one example, the subset of carriers in a combination may correspond to a group of carriers configured for (grouped) channel state indication (CSI) and radio resource management (RRM) measurement reporting.

In another example, the subset of carriers in a combination may correspond to a group of carriers where SCell activation and deactivation signaling is utilized, where the activation and deactivation signaling can be physical layer signaling (e.g. PDCCH/EPDCCH) or MAC layer signaling (e.g. MAC channel element (CE)).

In yet another example, the subset of carriers in a combination may correspond to carriers with relatively lower channel collision rate or lesser interference, e.g. carriers with the larger ratios of ACK over NACK/DTXs reported in the past, or carriers with smaller average contention window size, or carriers with the lower RSSI measurements, or carriers with the higher reference signal received quality (RSRQ) measurements.

In yet another example, the subset of carriers in a combination may correspond to carriers with higher rate of successful channel contention, e.g. carriers with shorter contention period on average.

For the LBT procedure of the $n^{th}$ set of carriers, a CCA slot is determined to be idle if the energy (or other metrics) sensed over the nth set of carriers is below a predetermined CCA threshold. When the LBT procedure for a set of carriers win contention (e.g. backoff counter reaches zero for LBT cat 4 procedure), the LAA node can schedule and transmit on the corresponding set of carriers at step 3250. If the LAA node defers transmission (self-deferral) despite winning contention, an initial CCA or an additional sending over a time interval (e.g. 34 µs) can be performed over the corresponding set of carriers before transmission.

When there are more than one set of carriers that win contention at the same time, the UE can select one of the sets for transmission. The selection criterion can be one or a combination of some factors. In one example, the set with the largest combined bandwidth is selected for maximizing cell throughput. In another example, the set with the largest sum of scheduled transport block bits over the transmission burst is selected for maximizing cell throughput. In yet another example, the set that contains traffic of highest QoS for minimizing latency of the corresponding data is selected. In yet another example, the set that does not contain known primary channels of neighboring Wi-Fi nodes is selected, if exists, for mitigating impact to neighboring Wi-Fi nodes. In yet another example, the detection of primary channels may be based upon decoding a WiFi beacon or probe response. In yet another example, the set that does not contain a negotiated WiFi channel bonding bandwidth is selected. In yet another example, detection of request to send/clear to send (RTS/CTS) messages between a WiFi AP and station (STA) can be used to infer the configured channel bonding bandwidth and associated carriers. In yet another example, the set with the largest contention window value is selected for minimizing latency of the corresponding data. In yet another example, the set with the lowest CCA or received signal strength indication (RSSI) measurement is selected to avoid introducing congestion on the carriers and avoid hidden nodes. In yet another example, the set that does not contain system information broadcast information from one or more LTE-U/LAA nodes of the same or different operator is selected. In yet another example, the set that is configured for transmitting system information broadcast (e.g. carrier configured as the primary cell/secondary cell (PCell/SCell)) is selected.

A LAA node may defer transmission despite winning contention for a first set of carriers, e.g. in anticipation of an impending successful channel access event for a second carrier set that is preferred over the first set. When the more preferred second carrier set does not successfully complete channel contention within a time period, the LAA node can terminate the transmission deferral of the first carrier set, perform an initial CCA procedure or an additional channel sensing over a time interval (e.g. 34 µs) for the first carrier set before transmission. The maximum self-deferral time may be fixed or may be a function of multiple factors, include the total bandwidth of a carrier set, or other associated scheduling metrics.

For example, the maximum self-deferral time may increase for larger bandwidth carrier sets than the current set of carriers which have successfully contended for the channel or may decrease if latency sensitive traffic is being considered for transmission on the current set of carriers. Additionally, the LAA node may utilize one or more metrics in determining whether to start and continue deferral or proceed with transmission on the set of carriers which successfully completed the contention procedure.

In one example a counter and timer can be configured for each of the remaining sets of carriers which are continuing the contention procedure during the self-deferral period (the counter can also be common for all the remaining sets). The counter and timer decrements with time. Before the counter and timer reaches zero, if any of the remaining contending sets have also successfully completed contention the LAA node may determine whether to end the self-deferral and start transmission based on the updated set of carriers which have successfully completed the contention procedure, or wait until the counter reaches zero before making the decision about which set of carriers may transmit.

In another example, the counter and timer can be configured based on the maximum value of the contention window counters of the remaining sets of carriers performing contention. In yet another example, the decision to start and continue self-deferral may be based upon whether the contention window counter of a given carrier set (e.g. any carrier set where the corresponding LBT procedure contention window counter is yet to reach zero) is below a configured threshold T_contend. The threshold T_contend may be fixed or may be a function of multiple factors, include the total bandwidth of a carrier set, or other associated scheduling metrics. For example the T_contend threshold may increase for larger bandwidth carrier sets than the current set of carriers which have successfully contended for the channel or may decrease if latency sensitive traffic is being considered for transmission on the current set of carriers.

The initial backoff counter value for each of the parallel LBT procedure can be independently selected from a range determined by the contention window size. However, it can also be beneficial for facilitating the self-deferral procedure as described before selecting a common initial backoff counter value for the parallel LBT procedures when the parallel LBT procedure are started at the same time. This can increase the probability of the parallel LBT procedure successfully completed around the same time.

When transmission is occurring for a set of LAA carriers, the LBT procedure for the other sets of LAA carriers are suspended (e.g. backoff counter is frozen for LBT cat 4 procedure). In one embodiment, only a subset of the other LBT procedure is suspended, for example the LBT procedure for the rest of the set can continue. In one embodiment, the subset that is suspended can correspond to those where one or more of the carriers are also associated with the LBT procedure that won the contention and are transmitting. In one embodiment, the subset can correspond to those where all the carriers are sufficiently separated in frequency from the transmitting carriers such that the energy leakage or interference from the transmitting carriers is below a certain threshold.

Apart from the channel sensing and CCA bandwidth, other LBT parameters such as the CCA threshold can also depend on the set of carriers (but the CCA threshold per MHz can still be fixed). For example, if the CCA threshold for a single 20 MHz carrier is X dBm (e.g. X=−62, −72), then the CCA threshold for LBT procedure for n number of carriers can be X+3(n−1) dBm assuming there can be a fixed total transmit power independent of the number of aggregated carriers.

For a LBT procedure corresponding to a set of carriers, there can be multiple channel sensing and CCA bandwidths for a CCA slot, with channel sensing performed separately for each carrier. The CCA slot is considered busy if one or more of the carriers are sensed to be busy. The CCA threshold can be the same as that applied for single-carrier LBT or can be higher (e.g. X+3(n−1) dBm) to increase chance of passing CCA. This criterion can be beneficial for detecting and avoiding collision with frequency-selective interference.

For an LBT procedure corresponding to a set of carriers, a CCA slot is determined to be idle if CCA is passed based on channel sensing over the combined bandwidth of the nth set of carriers and CCA is passed based on channel sensing over one or more of carriers within the nth set of carriers.

The CCA thresholds used for criterion b can be the same as that applied for single-carrier LBT or can be higher (e.g. X+3(n−1) dBm) to improve chance of passing CCA. This example is beneficial if there is one or more carriers within the set that may be more sensitive to collisions by the LAA transmission due to the presence of another node operating on the carrier(s). For instance, a carrier for applying criterion b can be that determined to be a primary channel of a Wi-Fi node.

There is also a need to define procedures for contention window adaptation. In one example, contention window adaptation can be performed independently and separately for each LBT procedure. For example, the trigger for contention window adaptation for LBT procedure for an $n^{th}$ set of carriers is based on HARQ-ACK information and reports corresponding to the previous transmissions on the nth set of carriers. Alternatively, the HARQ-ACK information and reports can correspond to the previous transmissions on a subset of the nth set of carriers. A reference carrier can also be defined such that only the HARQ-ACK information and reports corresponding to the reference carrier are used for contention window adaptation. The reference carrier can be semi-statically or dynamically configured.

In one example, the reference carrier may be defined as the carrier with the largest number of NACK/DTX reports or the largest ratio of NACK/DTX-to-ACK reports. In another example, the reference carrier may be defined as the carrier with CSI/RRM measurements configured.

The parameters of each LBT procedure for multiple-carrier transmissions, such as the initial contention window size and the backoff mechanism, can be according to the traffic type, which can be defined by the traffic's QoS that is scheduled to be transmitted on the corresponding carriers. When there are multiple traffic types multiplexed in a set of carriers, the corresponding LBT parameters can be in accordance with the traffic type with the lowest QoS. For example, if the LBT procedure for a set of carriers can correspond to that for QoS of best effort traffic if data of best effort traffic as well as voice over internet protocol (VoIP) is to be transmitted in one or more of the set of carriers after gaining channel access.

More generally, the LBT procedure for multiple-carrier transmissions as described and illustrated in FIG. 32 can be extended to take into account traffic with multiple QoS classes. In particular, a group of the LBT procedure for the different carrier combinations as described and illustrated in FIG. 32 correspond to data transmissions of a QoS class. There can be multiple groups of LBT procedures where different group corresponds to data transmissions for different QoS classes. When a channel contention is won for a given group, data from the corresponding QoS class can be transmitted. In another example, the data from the corresponding QoS class as well as the data from the higher QoS class can be transmitted.

Figure 33:
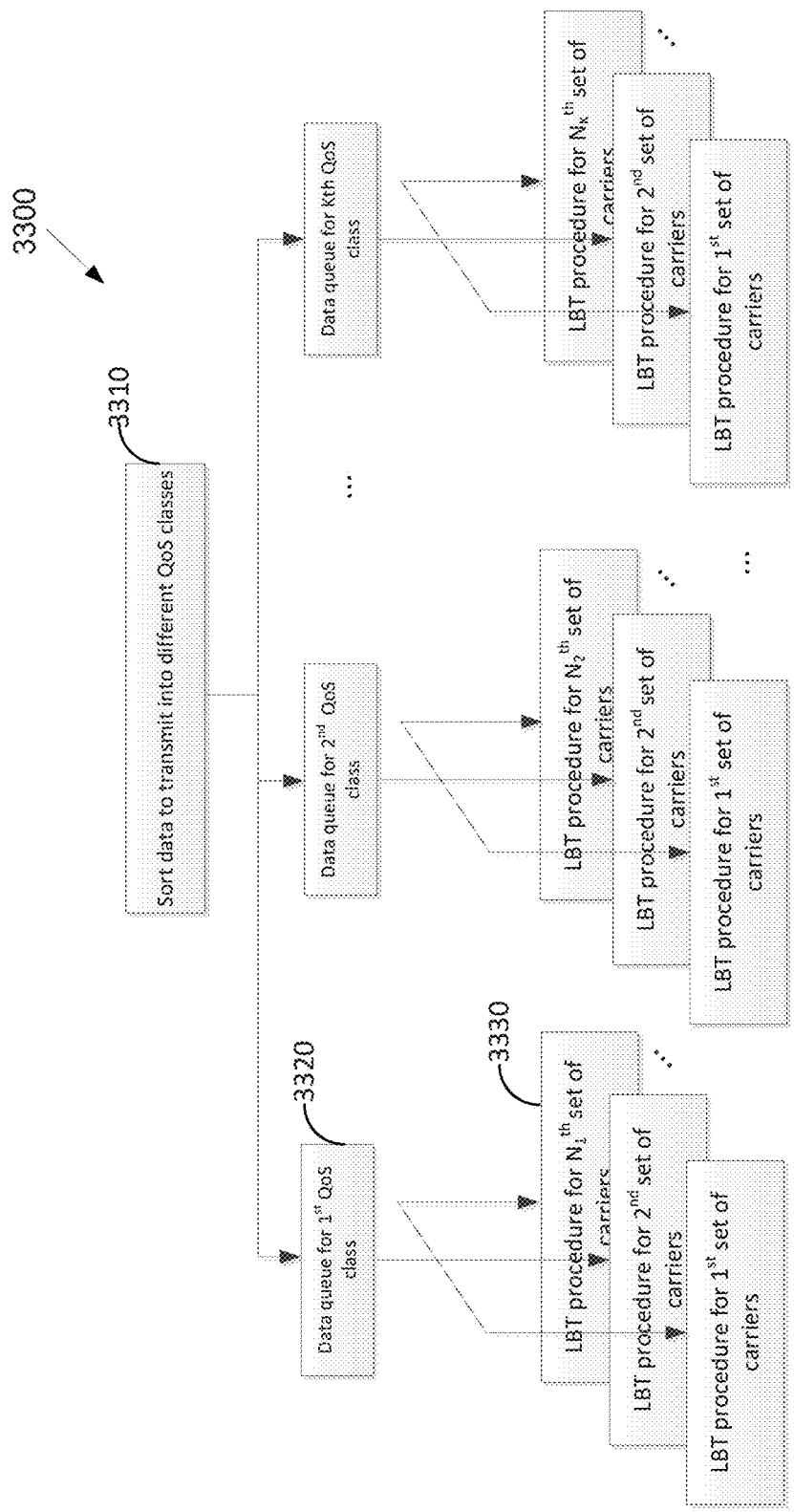
FIG. 33 illustrates example different LBT procedure for different quality of service (QoS) classes according to embodiments of the present disclosure.

FIG. 33 illustrates example different LBT procedure 3300 for different quality of service (QoS) classes according to embodiments of the present disclosure. An embodiment of the different LBT procedure groups 3300 shown in FIG. 33 is for illustration only. Other embodiments may be used without departing from the scope of the present disclosure. The framework of LBT procedure for different carrier combinations and QoS classes is illustrated in FIG. 33. As shown in FIG. 33, the different LBT procedure groups 3300 comprises a function 3310 sorting data to transmit into different QoS classes, a data queue 3320 for $1^{st}$ QoS class, and a set of carriers 3330. For, example, the LBT procedure 3300 may be performed by an LAA node, such as for example, the eNB 102 in FIG. 2.

In some embodiment, there can be multiple LBT procedure performed for each carrier. Each LBT procedure assumes channel sensing and CCA bandwidth corresponding to the carrier bandwidth. If there are U carriers and V LBT procedure per carrier, the total number of LBT procedure running in parallel can be (up to) U×V. For a carrier, each LBT procedure for the carrier is configured with different CCA threshold, which can be a function of the transmit power to be used for the carrier when the corresponding LBT procedure is successfully completed. The number of transmit power levels per carrier or the number of the CCA thresholds per carrier can depend on the total possible number of carriers that can be aggregated (with total transmit power sharing) with the carrier. For example, assuming the carrier can only be aggregated (with total transmit power sharing) with one other carrier (may not be unique carrier), the number of CCA thresholds is two (one carrier (e.g. X=−62 dBm), two-carrier aggregation (e.g. X+3=−59 dBm)). In another example, assuming the carrier be aggregated (with total transmit power sharing) with one or two other carriers (again, may not be unique set of carriers), the number of CCA threshold is three (one carrier (e.g. X=−72 dBm), two-carrier aggregation (e.g. X+3=−69 dBm) and three-carrier aggregation (e.g. X+6=−66 dBm)).

Denote N as the total number of carriers that can be transmitted simultaneously by the LAA node. When M LBT procedure(s) (M=1 . . . N) with a CCA threshold corresponding to an n carrier(s) (n=1, . . . , N) are successfully completed at the same time (gain channel access or win channel contention), the LAA node can transmit on (up to) n carrier(s) simultaneously with the transmit power corresponding to the CCA threshold used for the successful LBT procedure. When M is less than n, transmission deferral can be employed. If more LBT procedures with the same CCA threshold are successfully completed during the self-deferral period, such that the total number of successful LBT procedure are now P>M, the LAA node can transmit on (up to) min(P, n) carriers simultaneously with the transmit power corresponding to the CCA threshold used for the successful LBT procedure.

For carriers that are involved in self-deferral, initial CCA or additional channel sensing over a time interval (e.g. 34 μs) can be performed before transmission. The procedures of starting and continuing transmission deferral can be straightforward extensions and modifications from the procedures as described for the first approach of multiple-carrier LBT. The principles of the second approach of multiple-carrier LBT can also be applied to multi-carrier DRS transmissions.

For the purpose of downlink reference signal (DRS) transmission, the eNodeB can configure DRS measurement timing configurations (DMTC) comprising DMTC window size or duration and DMTC periodicity. In one embodiment, the LBT procedure can be different than the procedure for data transmission. For example, the DRS can be transmitted over a carrier combination if the channel corresponding to the carrier combination is sensed to be idle for a single time interval before transmission timing. The procedure for DRS transmission can be applied during a DMTC occasion. The LBT procedure can be terminated outside of a DMTC occasion and can be restarted when the next DMTC occasion arrives. Alternatively, the LBT procedure can be suspended outside of DMTC occasion and can be resumed again when the next DMTC occasion arrives. It can be beneficial at least for RRM measurement purpose to keep the transmit power for DRS per carrier constant or at least unchanged for a long period of time. When only DRS is transmitted, the total transmit power increases proportionally with the number of carriers. Hence, the CCA threshold when only DRS is transmitted can be unchanged with the number of carriers.

When the LBT procedure for DRS transmission wins contention of the channel, DRS is transmitted but not the unicast data; whereas when the LBT procedure for unicast data transmission wins contention of the channel, transmission can be performed with unicast data and DRS multiplexed.

Figure 34:
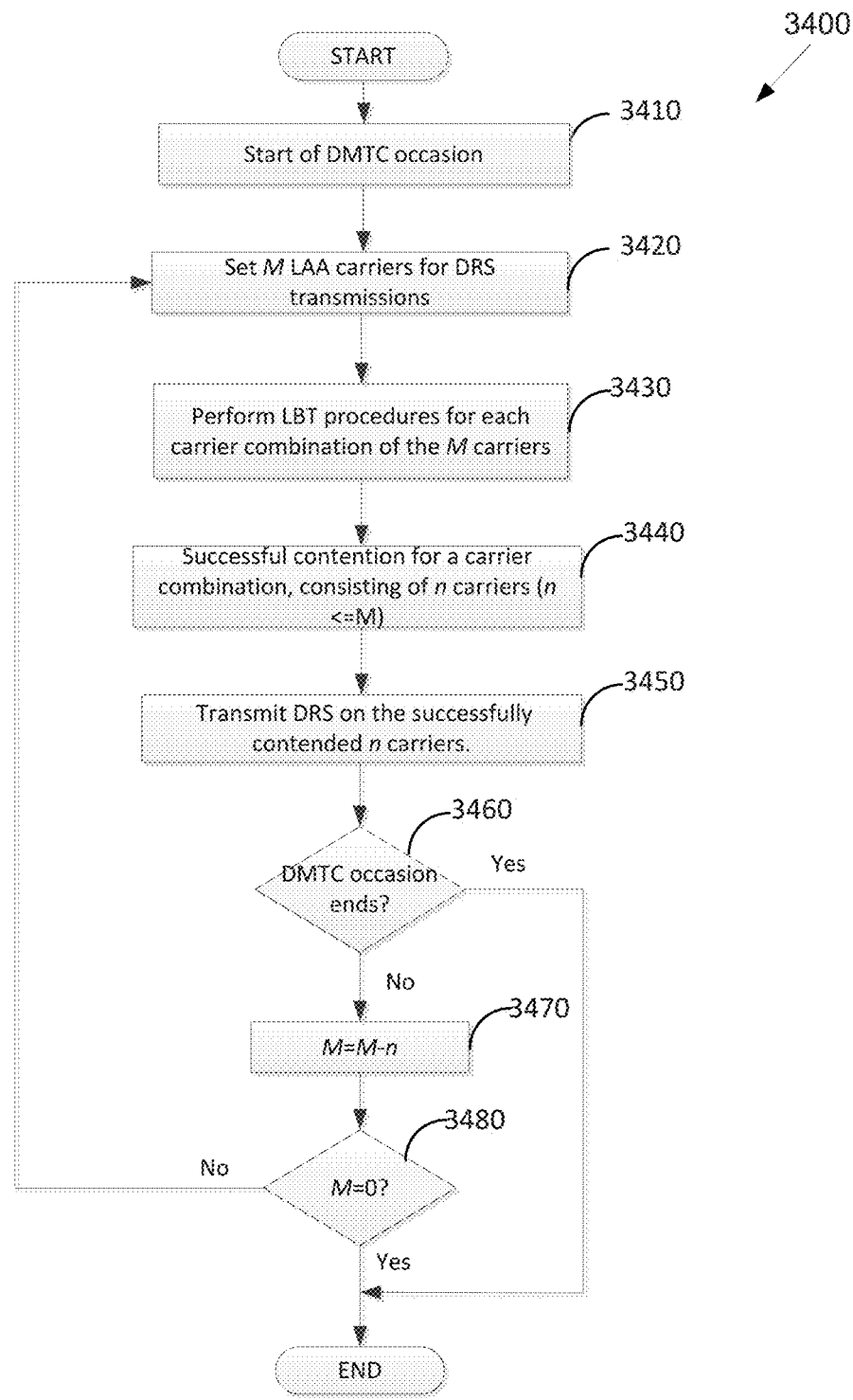
FIG. 34 illustrates an example LBT procedure for downlink reference signal (DRS) transmissions according to embodiments of the present disclosure.

FIG. 34 illustrates an example LBT procedure 3400 for downlink reference signal (DRS) transmissions according to embodiments of the present disclosure. An embodiment of the LBT procedure 3400 shown in FIG. 34 is for illustration only. Other embodiments may be used without departing from the scope of the present disclosure. An example process for performing LBT procedure for DRS on a set of carriers is illustrated in FIG. 34, which is an iterative process of LBT procedure performed during a DMTC occasion where the objective is to transmit DRS over all the operating carriers of the eNodeB. For example, the LBT procedure 3400 may be performed by an eNB, such as for example, the eNB 102 in FIG. 2.

As shown in FIG. 34, the LBT procedures 3400 begins step 3410. At step 3410, the eNB determine an arrival of a DMTC occasion and initial M carriers can be configured for DRS transmission during the DMTC occasion, e.g. M can be the total number of operating carriers for an LAA eNodeB at step 3420. The eNB performs each carrier combination of the M carriers at step 3430. One or more LBT procedure may win channel contention. If multiple LBT procedure wins channel contention at the same time, one of them can be chosen for DRS transmissions (assumed to correspond to n carriers (n≤M)), e.g. the one with the largest number of carriers. The eNB transmit DRS on the n carriers at step 3440. After transmission of DRS over n carriers at step 3450, if the DMTC occasion has come to an end at step 3460, the eNB terminate the LBS procedure 3400, else the eNB calculates a next M carriers for DRS transmission as M=M−n at step 3470. If M is zero at step 3480, the eNB terminates the LBT procedure 3400, else the eNB repeats the LBT procedure from step 3420.

In addition, if carrier is contending for the channel to transmit a DRS-only burst successfully contends for the channel within a configured DMTC, it may apply self-deferral until one or more carriers contending for the channel to transmit a DRS-only burst complete their contention procedure for the given contention window and CCA slot. If one or more sets of the DRS-only carriers successfully complete contention the non-DRS carrier may end the deferral and align transmission with the start of the DRS transmission (provided initial CCA or additional channel sensing over a time interval (e.g. 34 μs)), otherwise if the DRS-only contention sets are not successfully completed the non-DRS carrier may continue deferral to the start of the next DRS CCA occasion, or transmit immediately (e.g. after initial CCA).

Since there may be other RATs operating on the same unlicensed spectrum as the LAA carrier, there is a need to enable co-existence of other RATs, like WiFi, with LAA on an unlicensed frequency spectrum. Listen-before-talk (LBT) protocol can be applied. For example, before a UE or an eNB (or more generally, a LAA device) transmits, the eNB monitors a channel for a predetermined time period to determine whether there is an ongoing transmission in the channel. If no other transmission is sensed in the channel, the LAA device can transmit; otherwise, the LAA device postpones transmission e.g. by random backoff. This backoff counter is generated from a range of values e.g. from 0 to a contention window (CW) size, and the CW size can be adaptively adjusted.

In some embodiments, based on feedback and report of UE(s) (e.g. HARQ ACK/NACK), the contention window size can be increased (e.g. doubled) if the feedback and report of UE(s) satisfies certain predefined conditions. For one example, the condition can be seeing a NACK within the received feedback and reports with respect to certain observation window or the ratio of NACKs exceeds a predefined threshold. For another example, the condition can be seeing a NACK in the predefined reference position or the ratio of NACKs with respect to that reference position exceeds predefined threshold.

In some embodiments, based on eNB's assessment (e.g. sensing based adjustment), the contention window size can be increased (e.g. doubled) if the eNB's sensing statistic satisfies certain predefined conditions. For one example, the condition can be the number of failed CCA slots within an observation period exceeds a predefined threshold. For another example, the condition can be the number of successful CCA slots within an observation period does not exceed a predefined threshold.

In the HARQ ACK/NACK based scheme, NACK report may not result from transmission collision only, other causes, e.g. MCS mismatch and decoding error, may also result in a NACK report at eNB. It may not be easy for eNB to separate the impact of collision only when receiving an NACK, and this observation is usually criticized for this type of scheme to update contention window size. In the eNB's sensing based scheme, the eNB may not be capable to fully detect the hidden nodes, especially when the CCA energy detection threshold is high (e.g. −62 dBm). The incapability of sensing hidden nodes may result in more chance to see collisions in transmission, such that the contention window size may not be adapted properly. To eliminate the drawback of both schemes, hybrid schemes of utilizing both contention window size update approaches are considered.

In some embodiments, an adaptively switching scheme between the eNB's sensing based and HARQ ACK/NACK feedback based contention window size update approaches is considered. The eNB can initially choose the eNB's contention window size update scheme with the eNB's sensing based approach when CCA threshold is low (e.g. −82 dBm), and does not received many NACK reports from serving UEs. Then, the eNB may switch to HARQ ACK/NACK based scheme based on certain criteria. The criteria to enable the switch can be one of the following options or their combinations.

In some embodiments, the eNB can switch to HARQ ACK/NACK based scheme if the CCA energy detection threshold is increased for some particular reason (e.g. the eNB adaptively increases the channel access opportunity, or the eNB changes the CCA energy detection threshold to stop sensing the WiFi's preamble). In this case, when CCA energy detection threshold is increased, it is harder for the eNB to sense the hidden node such that the eNB's sensing based contention size adjustment scheme is more unreliable for potential collision detection. Hence, switching to HARQ ACK/NACK based scheme may help to alleviate the hidden node problem.

In some embodiments, the eNB can switch to HARQ ACK/NACK based scheme if the eNB received a large number of NACK reports within a predefined observation window. A large number of NACK reports from serving UEs imply a great chance of collision, which may be caused by hidden nodes. Thus, a HARQ ACK/NACK based scheme may be more capable of characterizing the contention window size adaptation. The particular number of NACK reports can be predefined or configurable with respect to different observation window size. A thresholding scheme for the ratio of NACK reports within a predefined observation window can also be adopted for the trigger to switch to HARQ ACK/NACK based scheme. Correspondingly, eNB can switch back to the sensing based scheme if the criteria are no longer satisfied.

In some embodiments, the eNB can switch to sensing based scheme if the CCA energy detection threshold is reduced to a low value, e.g. −82 dBm. If the CCA energy detection threshold is low, hidden node problem can be alleviated to some extent, such that HARQ ACK/NACK based scheme may be criticized for the HARQ ACK/NACK's incapability of separating the impact of decoding error.

In some embodiments, the eNB can switch to sensing based scheme if the eNB does not receive many NACK reports from serving UEs. In this case, the channel can be considered as clean or as with lower chance of collision. Then, switching to the eNB's sensing based scheme may help to alleviate the impact of decoding error as in the HARQ ACK/NACK based scheme. In such embodiments, alternatively utilizing the eNB's sensing based scheme and HARQ ACK/NACK based scheme may help to alleviate the drawback of both schemes.

In some embodiments, both of the schemes are utilized simultaneously to adaptively control the contention window size. The eNB can maintain sensing based metric as well as HARQ ACK/NACK metric. For instance, before each transmission, the eNB can sense the number of busy CCA slots within a predefined observation window, and collect HARQ ACK/NACK reports within another predefined observation window at the same time. The two observation window sizes can be predefined as the same value. If either of these two criteria to trigger contention window adjustment are satisfied, the eNB's contention window size is increased (e.g. doubled), and the other one is terminated. If neither of the criteria is satisfied, the eNB's contention window size can be reset to the minimum value. For example, if the eNB observes the HARQ ACK/NACK based trigger (e.g. high NACK-to-ACK ratio within a predefined observation window) before the eNB's sensing based trigger (large number of busy slots within a predefined observation window), the eNB can increase the eNB's contention window size and terminate counting the number of busy slots. If the triggers for both schemes are not satisfied, the eNB can reset the eNB's contention window size at the end of the predefined observation window.

Further constraints can be considered to perform onto the hybrid scheme for particular design purpose. For example, the sizes of observation window and thresholds for trigger can be carefully chosen such that both schemes have comparable chance to adjust the contention window size under the same channel condition. This constraint guarantees fairness between two adjustment schemes. For another instance, between the neighboring transmission bursts, no matter which scheme is utilized to adjust the contention window size, the window size may only be adjusted once.

After the adjustment, the metrics for both the adopted and unadopted schemes are reset. This constraint may help to guarantee fair co-existence with other RATs on the unlicensed spectrum, e.g. WiFi. In one example, the hybrid scheme of utilizing both adjustment approaches is more conservative comparing to either of the two schemes (i.e., easier to double the contention window size). Hence, parameters for the two adjustment approaches in the hybrid scheme can be chosen differently to obtain a more aggressive backoff process, in order to guarantee fairness to either of the two approaches.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) for listen-before-talk (LBT) operation in a wireless communication network, the UE comprising:
    a transceiver configured to receive a multiplexed uplink (UL) grant on a physical downlink control channel/enhanced physical downlink control channel (PDCCH/EPDCCH) with downlink (DL) data on a physical downlink shared channel (PDSCH) in a same subframe (SF) from an eNodeB (eNB); and
    at least one processor configured to:
        identify an UL grant message and the DL data from the multiplexed UL grant and DL data; and
        perform, based on a clear channel assessment (CCA) result, a UL resource down-selection operation on resource blocks (RBs) included in at least one UL channel and indicated by the UL grant message, wherein to perform the UL resource down-selection operation, the processor is configured to select a subset of the RBs included in the at least one UL channel and indicated by the UL grant message,
    wherein the transceiver is further configured to transmit UL data, to the eNB, based on the RBs that have been down-selected and information of the UL grant message.

2. The UE of claim 1, wherein:
    the at least one processor is further configured to determine feedback information for adaptively controlling of a contention window (CW) size for UL grant LBT, wherein the feedback information comprises at least one of a number of repeated scheduling request (SR), or a physical uplink shared channel (PUSCH) and discontinuous transmission (DTX) information.

3. The UE of claim 1, wherein:
    the at least one processor is further configured to determine a plurality of CW sizes each of which includes different values based on a level of quality of service (QoS) corresponding to at least one of UL data or channel conditions between at least one of the UE or a group of UEs and the eNB; and
    the transceiver is further configured to perform LBT procedures and transmit to the eNB the at least one of the UL data, based on each of the plurality of CW sizes corresponding to at least one of the level of QoS or the channel conditions between at least one of the UE or a group of UEs and the eNB.

4. The UE of claim 1, wherein the at least one processor is further configured to:
    perform a plurality of LBT operations that are prioritized and ordered based on a transmission direction and carrier scheduling operation, and wherein,
    the transceiver is further configured to:
        transmit at least one UL signal associated with the prioritized and ordered plurality of LBT operations; and
        receive at least one DL signal associated with the prioritized and ordered plurality of LBT operations.

5. An eNodeB (eNB) for listen-before-talk (LBT) operation in a wireless communication network, the eNB comprising:
    at least one processor;
    a memory operably connected to the at least one processor, the memory storing program code that, when executed by at least one processor, causes the at least one processor to:
        trigger an LBT request to transmit, to a user equipment (UE), at least one of an uplink (UL) grant or downlink (DL) data;
        determine an adaptive contention window (CW) size comprising a predetermined minimum value and maximum value for transmitting the DL data;
        perform a DL data LBT operation in accordance with the adaptive CW size;
        perform a UL grant LBT operation to transmit a UL grant message to the UE, wherein the UL grant LBT operation comprises a higher priority than the DL data regardless of a level of quality of service (QoS) of the DL data; and
        multiplex the UL grant with the DL data in a same subframe (SF); and
    a transceiver configured to transmit the multiplexed UL grant with the DL data to the UE.

6. The eNB of claim 5, wherein the UL grant LBT operation comprises at least one of a random backoff time, a fixed CW size, or a variable CW size.

7. The eNB of claim 5, wherein:
    the transceiver is further configured to receive feedback information from the UE; and
    the at least one processor is further configured to adjust the CW size for the UL grant LBT operation based on the feedback information.

8. The eNB of claim 7, wherein the feedback information comprises at least one of a number of repeated scheduling request (SR), or a physical uplink shared channel (PUSCH) and discontinuous transmission (DTX) information.

9. The eNB of claim 5, wherein:
    the at least one processor is further configured to:
        prioritize and order a plurality of LBT operations based on a transmission direction and carrier scheduling operation; and
        perform the prioritized and ordered plurality of LBT operations; and
    the transceiver is further configured to:
        receive at least one uplink signal associated with the prioritized and ordered plurality of LBT operations; and
        transmit at least one downlink signal associated with the prioritized and ordered plurality of LBT operations.

10. The eNB of claim 5, wherein the at least one processor is further configured to:
    determine a plurality of groups of UEs based on at least one of the level of QoS being served or channel conditions between at least one of the UE or a group of UEs and the eNB; and
    allocate a different CW size to each group of UEs for at least one of the DL data LBT operation or the UL grant LBT operation.

11. The eNB of claim 5, wherein:
the at least one processor is further configured to perform LBT procedures on subsets of available DL carriers; and
the transceiver is further configured to transmit at least one downlink signal over the subsets of available DL carriers sensed to be clear from the LBT procedures.

12. A method for listen-before-talk (LBT) operation by an eNodeB (eNB) in a wireless communication network, the method comprising:
triggering, by the eNB, an LBT request to transmit, to a user equipment (UE), at least one of an uplink (UL) grant or downlink (DL) data;
determining an adaptive contention window (CW) size comprising a predetermined minimum value and maximum value for transmitting the DL data;
performing a DL data LBT operation in accordance with the adaptive CW size;
performing a UL grant LBT operation to transmit a UL grant message to the UE, wherein the UL grant LBT operation comprises a higher priority than the DL data regardless of a level of quality of service (QoS) of the DL data;
multiplexing the UL grant with the DL data in a same subframe (SF); and
transmitting the multiplexed UL grant with the DL data to the UE.

13. The method of claim 12, wherein the UL grant LBT operation comprises at least one of a random backoff time, a fixed CW size, or a variable CW size.

14. The method of claim 12, further comprising:
receiving feedback information from the UE; and
adjusting the CW size for the UL grant LBT operation based on the feedback information.

15. The method of claim 14, wherein the feedback information comprises at least one of a number of repeated scheduling request (SR), or a physical uplink shared channel (PUSCH) and discontinuous transmission (DTX) information.

16. The method of claim 12, further comprising:
prioritizing and ordering a plurality of LBT operations based on a transmission direction and carrier scheduling operation; and
performing the prioritized and ordered plurality of LBT operations.

17. The method of claim 12, further comprising:
determining a plurality of groups of UEs based on at least one of the level of QoS being served or channel conditions between at least one of the UE or a group of UEs and the eNB; and
allocating a different CW size to each group of UEs for at least one of the DL data LBT operation or the UL grant LBT operation.

18. The method of claim 12, further comprising:
performing LBT procedures on subsets of available DL carriers; and
transmitting at least one downlink signal over the subsets of available DL carriers sensed to be clear from the LBT procedures.

* * * * *